(12) United States Patent
Shimizu et al.

(10) Patent No.: US 10,856,535 B2
(45) Date of Patent: Dec. 8, 2020

(54) SPINNING REEL FOR FISHING

(71) Applicant: GLOBERIDE, Inc., Tokyo (JP)

(72) Inventors: Yoshihito Shimizu, Tokyo (JP);
Kazuyuki Matsuda, Tokyo (JP);
Wataru Tsutsumi, Tokyo (JP);
Masashi Fujioka, Tokyo (JP); Hironori Horie, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 258 days.

(21) Appl. No.: 16/063,058

(22) PCT Filed: Dec. 16, 2016

(86) PCT No.: PCT/JP2016/087656
§ 371 (c)(1),
(2) Date: Jun. 15, 2018

(87) PCT Pub. No.: WO2017/104837
PCT Pub. Date: Jun. 22, 2017

(65) Prior Publication Data
US 2018/0368377 A1 Dec. 27, 2018

(30) Foreign Application Priority Data

Dec. 18, 2015 (JP) .................................. 2015-247472
Dec. 18, 2015 (JP) .................................. 2015-247473
(Continued)

(51) Int. Cl.
*A01K 89/01* (2006.01)
(52) U.S. Cl.
CPC ........ *A01K 89/01082* (2015.05); *A01K 89/01* (2013.01); *A01K 89/01086* (2015.05); *A01K 89/011221* (2015.05); *A01K 89/01126* (2015.05)

(58) Field of Classification Search
CPC .... A01K 89/011221; A01K 89/011223; A01K 89/01126; A01K 89/01121; A01K 89/0114
See application file for complete search history.

(56) References Cited

U.S. PATENT DOCUMENTS 2,726,052 A 12/1955 Pons
4,402,469 A * 9/1983 Stiner .................. A01K 89/027
242/245
(Continued)

FOREIGN PATENT DOCUMENTS

CN 1513309 A 7/2004
CN 104823931 A 8/2015
(Continued)

OTHER PUBLICATIONS

International Search Report PCT/JP2016/087656 dated Mar. 7, 2017 w/English translation.
(Continued)

*Primary Examiner* — Emmanuel M Marcelo
(74) *Attorney, Agent, or Firm* — DLA Piper LLP (US)

(57) ABSTRACT

The present invention provides a fishing spinning reel including a reel unit and a rotor that is rotatably supported by the reel unit. The reel unit includes: a body that has a side opening portion and in which a spool reciprocating device is housed and supported; a lid that closes the side opening portion; and a cover member mounted on a rear portion of the body. A handle shaft is rotatably supported by the body and the lid. In the rear portion of the body, a rear opening portion for receiving at least a part of a component of the spool reciprocating device and disposing the component on the rear side is formed. The cover member covers the rear opening portion and the component.

23 Claims, 84 Drawing Sheets

(30) Foreign Application Priority Data

| Dec. 18, 2015 | (JP) | 2015-247474 |
|---|---|---|
| Dec. 18, 2015 | (JP) | 2015-247475 |
| Dec. 18, 2015 | (JP) | 2015-247476 |
| Dec. 18, 2015 | (JP) | 2015-247477 |
| Jul. 29, 2016 | (JP) | 2016-150534 |
| Jul. 29, 2016 | (JP) | 2016-150535 |
| Jul. 29, 2016 | (JP) | 2016-150536 |
| Jul. 29, 2016 | (JP) | 2016-150537 |

(56) References Cited

U.S. PATENT DOCUMENTS

| | | | | |
|---|---|---|---|---|
| 5,350,130 | A * | 9/1994 | Hitomi | A01K 89/0114 242/241 |
| 6,176,446 | B1 * | 1/2001 | Sato | A01K 89/01122 242/319 |
| 2003/0136866 | A1 * | 7/2003 | Kitajima | A01K 89/0111 242/307 |
| 2003/0146322 | A1 * | 8/2003 | Kitajima | A01K 89/0114 242/249 |
| 2004/0227028 | A1 * | 11/2004 | Nishikawa | A01K 89/01 242/249 |
| 2004/0251362 | A1 * | 12/2004 | Myojo | A01K 89/01 242/310 |
| 2005/0127221 | A1 | 6/2005 | Morise | |
| 2013/0327870 | A1 * | 12/2013 | Hiraoka | A01K 89/01 242/234 |
| 2015/0048192 | A1 * | 2/2015 | Matsuo | A01K 89/0114 242/241 |
| 2015/0048193 | A1 | 2/2015 | Matsuo et al. | |
| 2015/0216155 | A1 | 8/2015 | Matsuda | |

FOREIGN PATENT DOCUMENTS

| EP | 0712573 A1 | 5/1996 |
|---|---|---|
| JP | 01-127465 U | 8/1989 |
| JP | 01-127465 U1 | 8/1989 |
| JP | 05-034862 U | 5/1993 |
| JP | 07-000062 U | 1/1995 |
| JP | 07-007443 U | 2/1995 |
| JP | 8-191650 A | 7/1996 |
| JP | 2004-121048 A | 4/2004 |
| JP | 2004-129571 A | 4/2004 |
| JP | 2005-168343 A | 6/2005 |
| JP | 2010-063434 A | 3/2010 |
| JP | 2015-035987 A | 2/2015 |

OTHER PUBLICATIONS

Notification of Reasons for Refusal dated Feb. 8, 2019 issued in corresponding Japanese Patent Application No. 2015-247472 with English translation.

Notification of Reasons for Refusal dated Feb. 8, 2019 issued in corresponding Japanese Patent Application No. 2015-247473 with English translation.

Notification of Reasons for Refusal dated Feb. 8, 2019 issued in corresponding Japanese Patent Application No. 2015-247474 with English translation.

Notification of Reasons for Refusal dated Feb. 8, 2019 issued in corresponding Japanese Patent Application No. 2015-247475 with English translation.

Notification of Reasons for Refusal dated Feb. 8, 2019 issued in corresponding Japanese Patent Application No. 2015-247477 with English translation.

European Search Report dated Jun. 3, 2019, of counterpart European Application No. 16875811.8.

Notice of Reasons for Refusal dated Aug. 13, 2019, of counterpart Japanese Application No. 2016-150535, along with an English translation.

The First Office Action dated Jun. 29, 2020, of counterpart Chinese Application No. 201680073937.9, along with an English translation.

\* cited by examiner

SPINNING REEL FOR FISHING

CROSS-REFERENCE TO RELATED APPLICATIONS

This is the U.S. National Stage of PCT/JP2016/087656, filed Dec. 16, 2016, which in turn claims priority to Japanese Patent Application No. 2015-247472, filed Dec. 18, 2015, Japanese Patent Application No. 2015-247473, filed Dec. 18, 2015, Japanese Patent Application No. 2015-247474, filed Dec. 18, 2015, Japanese Patent Application No. 2015-247475, filed Dec. 18, 2015, Japanese Patent Application No. 2015-247476, filed Dec. 18, 2015, Japanese Patent Application No. 2015-247477, filed Dec. 18, 2015, Japanese Patent Application No. 2016-150534, filed Jul. 29, 2016, Japanese Patent Application No. 2016-150535, filed Jul. 29, 2016, Japanese Patent Application No. 2016-150536, filed Jul. 29, 2016, and Japanese Patent Application No. 2016-150537, filed Jul. 29, 2016, the contents of each of these applications being incorporated herein by reference in their entireties.

TECHNICAL FIELD

The present invention relates to a spinning reel for fishing.

BACKGROUND

A reel unit of a fishing spinning reel includes a body that rotatably supports a handle shaft. The body also serves as a case for accommodating a driving unit that includes a drive gear, a spool reciprocating device and the like. To this end, the body has a bottomed-box shape that opens in the lateral direction. Through this opening provided on the side of the body (hereunder referred to as a side opening portion), a winding operation mechanism such as a drive gear that integrally with a handle, the spool reciprocating device and the like are assembled inside the body and the opening is then closed with a lid.

Further, inside the body, the spool reciprocating device for winding a fishing line on a spool in parallel is engaged with a gear on the handle shaft in a well-known manner. An interlocking gear provided with an eccentric protrusion is disposed at the bottom of the lower part (on the side opposite to a rod mounting portion) of the body away from the center part of the body to convert rotations of the handle shaft into back-and-forth motions of the spool shaft (see Patent Literature 1).

RELEVANT REFERENCES

Patent Literature

Patent Literature 1: Japanese Patent Application Publication No. 2004-121048

SUMMARY

In recent years, reduction in the size of the reel unit is one of the key challenges for development of fishing spinning reels in order to improve fishing operability and portability. However, when the reel unit is downsized, naturally the space inside the body becomes small and narrow. Accordingly, a space for accommodating parts of the spool reciprocating device, for example, the interlocking gear and a slider, becomes also small, which leads to reduction in the diameter of the interlocking gear. As a result, the length of stroke of the slider in the spool reciprocating device is shortened, and the capabilities of the spool reciprocating device are limited, for example, a predetermined wound volume cannot be secured.

The invention is made in view of the above drawbacks, and it is an object of the invention to provide a fishing spinning reel in which such a functional limitation on the spool reciprocating device is avoided while the size of the reel unit can be reduced.

In view of the above, a fishing spinning reel according to one aspect of the invention includes a reel unit and a rotor that is rotatably supported by the reel unit. The reel unit includes: a body that has a side opening portion and in which a spool reciprocating device is housed and supported; a lid that closes the side opening portion; and a cover member mounted on a rear portion of the body. A handle shaft is rotatably supported by the body and the lid. In the rear portion of the body, a rear opening portion for receiving at least a part of a component of the spool reciprocating device and disposing the component in the rear of the body is formed. The cover member covers the rear opening portion and the component.

According to the aspect of the invention, it is possible to receive at least a part of the component from the rear opening portion and place the component in the rear of the body. Thus, it is possible to use a desired sized component without being limited to the size of the space inside the reel unit. Further, since the cover member covers the component and the rear opening portion, seawater or dusts are unlikely to adhere to the component and to enter into the reel unit.

In the fishing spinning reel described above, the body preferably has a bridge portion that extends between the side opening portion and the rear opening portion and forms edges of apertures of the side opening portion and the rear opening portion, and the side opening portion and the lid are preferably formed in circular shapes.

With such a configuration, the strength of the body can be enhanced with the bridge portion. Moreover, by forming the bridge portion, it is possible to make the side opening portion continuous in the circumferential direction, in other words, to form the side opening portion in a circular shape. Further, since the lid and the side opening portion are made in circular shapes, the load acting from the lid to the side opening portion (for example, the load generated at the time of handle operation) is distributed uniformly in the entire circumference of the side opening portion. Consequently, the load (stress) will not be concentrated on some portion of the body (the side opening portion) and it is possible to obtain the body with a fine durability.

In the fishing spinning reel described above, it is preferable that a female screw portion be provided in the side opening portion, a male screw portion be provided in the lid, and the lid be detachably fastened to the side opening portion by screwing.

With this configuration, the lid is fixed to the side opening portion with a uniform fastening force in the circumferential direction. Furthermore, a plurality of screws for fastening the lid to the body can be made unnecessary. In this way, it is possible to reduce the number of components and improve ease of assembling and disassembling of the reel. Moreover, it is possible to prevent breakage of the screws.

In the fishing spinning reel, it is preferable that the lid have an abutting portion abutting an inner peripheral surface of the side opening portion to obtain the concentricity between the side opening portion and the lid.

With this configuration, a high concentricity between the lid and the side opening portion can be obtained so that the center of the lid that supports one end of the handle shaft corresponds to the center of the body that supports the other end of the handle shaft. Consequently, it is possible to rotate the handle shaft smoothly and the operability of the handle is improved.

In the above spinning reel, at least a part of an outer peripheral edge portion of the lid is preferably situated in front of the rear most surface of the rotor.

With this configuration, even if the side opening portion and the lid are made larger in size, a part of the outer peripheral edge of the lid is placed closer to the front than the rear most surface of the rotor (for example, the rear surface of the cylindrical portion and the arm portion) so that the dimension of the reel unit in the front-rear direction (the axial direction) is reduced. In this way, size increase of the reel unit is avoided.

In the fishing spinning reel, the reel unit preferably includes a body front portion disposed in front of the body. The body front portion preferably includes a flange that closes the rear opening portion of the rotor, and the flange has a concave portion that corresponds to the side opening portion.

With this configuration, even when a part of the outer peripheral edge of the lid is situated closer to the front than the rear most surface of the rotor, the lid does not interfere with the flange. Consequently, it is possible to reduce the dimension of the reel unit in the front-rear direction (the axial direction).

In the fishing spinning reel, a spool shaft supported by the reel unit slidably in the front-rear direction is provided. A rear portion of the spool shaft is situated inside the body. The spool reciprocating device includes a slider that moves in the front-rear direction together with the spool shaft in conjunction with rotation of the handle shaft, and a guide shaft that slidably guides the slider in the front-rear direction. The side opening portion and the lid are formed in circular shapes, the rear portion of the spool shaft and the guide shaft are preferably disposed on an upper side and a lower side respectively with reference to the handle shaft, and a concave portion that receives at least a part of the handle shaft is formed in a portion of the slider that faces the handle shaft.

With this configuration, when the handle shaft is disposed at the center portion of the internal space of the body in which the circular side opening portion is formed, the internal space is divided by the handle shaft into upper and lower spaces. Therefore the guide shaft that slidably guides the slider of the spool reciprocating device and the spool shaft that is coupled to the slider to reciprocate the spool are well-proportionally disposed in the upper interior space and the lower interior space respectively. Consequently it is possible to secure a sufficient stroke of the spool in the front-rear direction while reducing the size of the reel unit. Moreover, since a drive gear that has a similar shape and outer diameter as those of the circular side opening portion can be accommodated, the diameter of the drive gear can be increased as much as possible and it is possible to maintain a high speed gear ratio and strength.

In the fishing spinning reel, a gear support member separately formed from the reel unit and supporting a gear of the spool reciprocating device is preferably provided. The gear support member is preferably mountable on a mounting portion provided on an inner side portion or an outer side portion of the reel unit.

With this configuration, the gear that is the component of the spool reciprocating device can be supported by mounting the gear support member on the mounting portion provided on the inner or outer side of the reel unit. In other words, since the gears support member is formed separately from the reel unit, it is possible to change the support position of the gear by changing the gear support member to another gear support member with a different design. In this way it is possible to provide a fishing spinning reel of which specification can be modified at a low cost.

In the fishing spinning reel, the gear is preferably mounted on the reel unit through the side opening portion.

With this configuration, the gear can be easily mounted through the rear opening portion.

In the fishing spinning reel, the gear support member is preferably inserted together with the gear into the reel unit through the rear opening portion and mounted on a mounting portion provided on an inner side portion of the reel unit.

With this configuration, the gear and the gear support member can be mounted together through the rear opening portion.

In the fishing spinning reel, the spool reciprocating device preferably includes: an interlocking gear meshing and rotating with a gear provided on the handle shaft; and a slider mounted on a rear end portion of a spool shaft and engaged with an eccentric protrusion that is provided eccentrically from the rotation center of the interlocking gear. Here, the gear is preferably the interlocking gear.

With this configuration, it is possible to support the interlocking gear with different specifications by changing the specification of the gear support member. In this way, it is possible to provide a fishing spinning reel of which specification can be easily modified at a low cost.

In the fishing spinning reel, the side opening portion and the lid are preferably formed in circular shapes. The fishing spinning reel further include a female screw portion provided on an inner peripheral portion of the side opening portion: a male screw portion provided on an outer peripheral portion of the lid to be engaged with the female screw portion; a fitting receiving portion provided on a peripheral edge of the opening of the side opening portion; and a fitting portion provided on an outer peripheral edge of the lid and spigot fitted in the fitting receiving portion.

With this configuration, it is possible to fasten the lid to the side opening portion by screwing the lid itself, and therefore it is easy to perform attachment of the lid. Moreover, since the fitting portion provided on the outer peripheral edge of the lid is spigot fitted in the fitting receiving portion provided on the opening peripheral edge of the side opening portion, the abutting surfaces of them are not exposed to the outside. Therefore, even if a gap is formed between the abutting surfaces, the spigot fitting can prevent the gap from being exposed so that entanglement or pinching of the fishing line can be prevented. Further, it is possible to prevent sea water, water, sand in the water, foreign substances and the like from entering inside. That is, it is possible to prevent a fishing line, seawater, foreign substances and the like from entering inside by the spigot fitting. In addition, since the cover member is threadably fixed to the side opening portion with a uniform fastening force over the circumferential direction, it is possible to sufficiently secure the affixing strength of the lid. Consequently, durability of the reel unit and the lid and also a support strength of the handle shaft can be expected to be enhanced.

The fishing spinning reel may further include an attachment member attached to an opening portion provided in the reel unit, and an annular sealing member disposed between the opening portion and the attachment member. It is preferable that a projecting portion that bites the sealing member be provided on at least one of a peripheral edge of the opening portion or a peripheral edge of the attachment member.

With this configuration, when the attachment member is attached to the opening portion with the sealing member interposed therebetween, the projecting portion provided on at least one of the peripheral edge of the opening portion or the peripheral edge of the attachment portion contacts and bites the sealing member. In this way, displacement and deformation of the sealing member are adequately prevented. Consequently the sealing member is retained at an appropriate position between the opening portion and the attachment member and therefore it is possible to appropriately fulfill the protection property of the sealing member to prevent seawater, dusts and the like from entering inside.

In the fishing spinning reel, a restricting portion that restricts the sealing member from moving relative to the opening portion and the attachment member is preferably provided on at least one of the opening portion, the attachment member, and the sealing member.

With this configuration, the sealing member is adequately retained on the opening portion and the attachment member by the restriction portion so that it is possible to appropriately fulfill the protection property of the sealing member to prevent seawater, dusts and the like from entering inside.

In the fishing spinning reel, the opening portion is preferably the rear opening portion, and the attachment member is preferably the cover member.

With this configuration, the sealing property between the rear opening portion and the cover member is adequately retained so that it is possible to appropriately fulfill the protection property at the rear opening portion to prevent seawater, dusts and the like from entering inside.

In the fishing spinning reel, the opening portion is preferably the side opening portion, and the attachment member is preferably the lid.

With this configuration, it is possible to adequately prevent displacement and deformation of the sealing member disposed between the side opening portion of the reel unit and the cover member. As a result, the sealing property between the side opening portion of the reel unit and the cover member is secured.

In the fishing spinning reel, the lid is preferably fastened to the body by threadably mounting the lid itself on the side opening portion. The spool reciprocating device preferably includes: a slider coupled to a rear portion of a spool shaft; and a driving member with which the slider is engaged and rotated by rotation of the handle shaft to cause the slider to reciprocate in a front-rear direction. A rotation center of the driving member is disposed closer to a rod attaching portion of the body than a rotation center of the handle shaft.

In this configuration, since the lid itself is screwed in the side opening portion, the coupling portion between the lid and the side opening portion has a circular shape as viewed from the handle shaft direction. This means that the load generated at the time of handle operation acts uniformly on the entire circumference of the side opening portion, and therefore the side opening portion is less likely to be deformed. Accordingly, it is possible to prevent the lid threadably mounted on the side opening from being loosed and therefore the mounting strength of the lid is improved. Moreover, the strength of the body with which the lid is integrated by threadably fastened thereto is further improved. Moreover, in this configuration, screws and the female screw of the body are not necessary. Therefore it is possible to make the body thinner and smaller. Since the driving member occupies the space above the handle shaft which was a dead space in a conventional reel unit, there is little dead space in the body. Consequently it is possible to further reduce the size of the body.

The fishing spinning reel preferably includes a rear support member formed separately from the cover member and mounted on the body to support a rear portion of a stick-like member of the spool reciprocating device.

With this configuration, the rear support member for supporting a stick-like member and the protective cover for covering the rear portion of the body are formed by separate members, so that it is possible to select an appropriate shape and material specific to the respective functions required. Therefore, it is possible to enhance the flexibility of design and the stable performance of the spool reciprocating device.

In the fishing spinning reel, the rear support member is preferably made of metal and the cover member is preferably made of synthetic resin.

With this configuration, the rear support member can be made with a high precision and has a high stiffness so that it is possible to stabilize the performance of the spool reciprocating device. Further, it is possible to increase the design freedom such as a color and the profile of the cover member.

In the fishing spinning reel, the body and the lid preferably have threaded portions that are formed circumferentially to be fitted to the side opening portion and threadably engaged to each other. The lid is fastened to the body by threadably mounting the lid itself on the side opening portion. An annular insert-molded metal member is preferably provided on at least one of the side opening portion or the lid, and the threaded portion is formed on the metal member. In the fishing spinning reel, the lid is preferably made of metal. The body and the side opening portion preferably have threaded portions that are formed circumferentially to be fitted in the side opening portion and threadably engaged to each other. The lid is fastened to the body by threadably mounting the lid itself on the side opening portion.

In this configuration, since the lid itself is screwed in the side opening portion, the coupling portion between the lid and the side opening portion has a circular shape as viewed from the handle shaft direction. Therefore the load generated at the time of handle operation is distributed uniformly over the entire circumference of the side opening portion, and thereby the attachment strength of the lid is increased. In addition, since at least one of the screw portion provided on the side opening portion of the screw portion provided on the lid is made of metal (as for claim 21, since the screw portion of the lid is made of metal), there is no possibility that a sink mark is formed on the screw portion. More specifically, the meshing accuracy of the screw portions is very high so that the attachment strength of the lid can be enhanced. Moreover, since parts except for the screw portions are made of resin (as for claim 21, the body is made of resin), the weight of the reel unit can be reduced. More specifically, as for the reel unit in which the lid is threadably integrated to the resin body, the screwing portion is made of metal and has a circular shape. Therefore it is possible to realize the lightweighted reel unit (housing structure) that is formed with a high precision and less likely deformed at a reduced cost.

In the fishing spinning reel a reduction gear mechanism that transmits rotation of the handle shaft to the spool reciprocating device at a reduced speed is preferably disposed between the handle shaft and the spool reciprocating device.

With this configuration, the displacement in the front-rear direction per turn of the handle is reduced by the reduction gear mechanism.

In the fishing spinning reel, the spool reciprocating device preferably includes a slider that is attached on a rear portion of the spool shaft. The slider is supported by guide shafts that extend in a front-rear direction of the body, and the guide shafts are preferably disposed on an upper side and a lower side of the handle shaft respectively as a pair.

In this configuration, the slider slides smoothly so that it is possible to stabilize the performance of the spool reciprocating device.

According to the above aspects of the invention, it is possible to provide a fishing spinning reel in which a functional limitation on the spool reciprocating device can be avoided while the size of the reel unit is reduced.

BRIEF DESCRIPTION OF THE DRAWINGS

FIG. 12 is an enlarged view of the portion XII of the reel enclosed by the dashed line in FIG. 6a.

FIG. 16a is a left side view of the reel unit from which the lid is removed, and FIG. 16b is a left side view of the gear support member.

FIG. 18b is an enlarged sectional view of the portion surrounded by the broken line in FIG. 18a.

FIG. 19b is an enlarged sectional view of the portion surrounded by the broken line in FIG. 19a.

FIG. 20b is an enlarged sectional view of the portion surrounded by the broken line in FIG. 20a.

FIG. 21b is an enlarged sectional view of the portion surrounded by the broken line in FIG. 21a.

FIG. 38b is an enlarged sectional view of the portion surrounded by the broken line in FIG. 38a.

FIG. 47a is a front view, FIG. 47b is a left side view, FIG. 47c is a rear view, FIG. 47d is a plan view corresponding to the left side view, FIG. 47e is a bottom view corresponding to the left side view, FIG. 47f is a right side view, FIG. 47g is a perspective view as viewed from the rear upper side, and FIG. 47h is a perspective view as viewed from the front upper side.

FIG. 52a is a front view, FIG. 52b is a plan view, FIG. 52c is a bottom view, FIG. 52d is a right side view, FIG. 52e is a left side view, FIG. 52f is a rear view, FIG. 52g is a perspective view as viewed from the front upper side, and FIG. 52h is a perspective view as viewed from the rear upper side.

DESCRIPTION OF THE PREFERRED EMBODIMENTS

First Embodiment

Embodiments of a fishing spinning reel now be described with reference to the drawings. As used herein, "front and rear" and "upper and lower" directions refer to the directions shown in FIG. 1, and "left and right" directions refer to the directions shown in FIG. 4.

Figure 1:
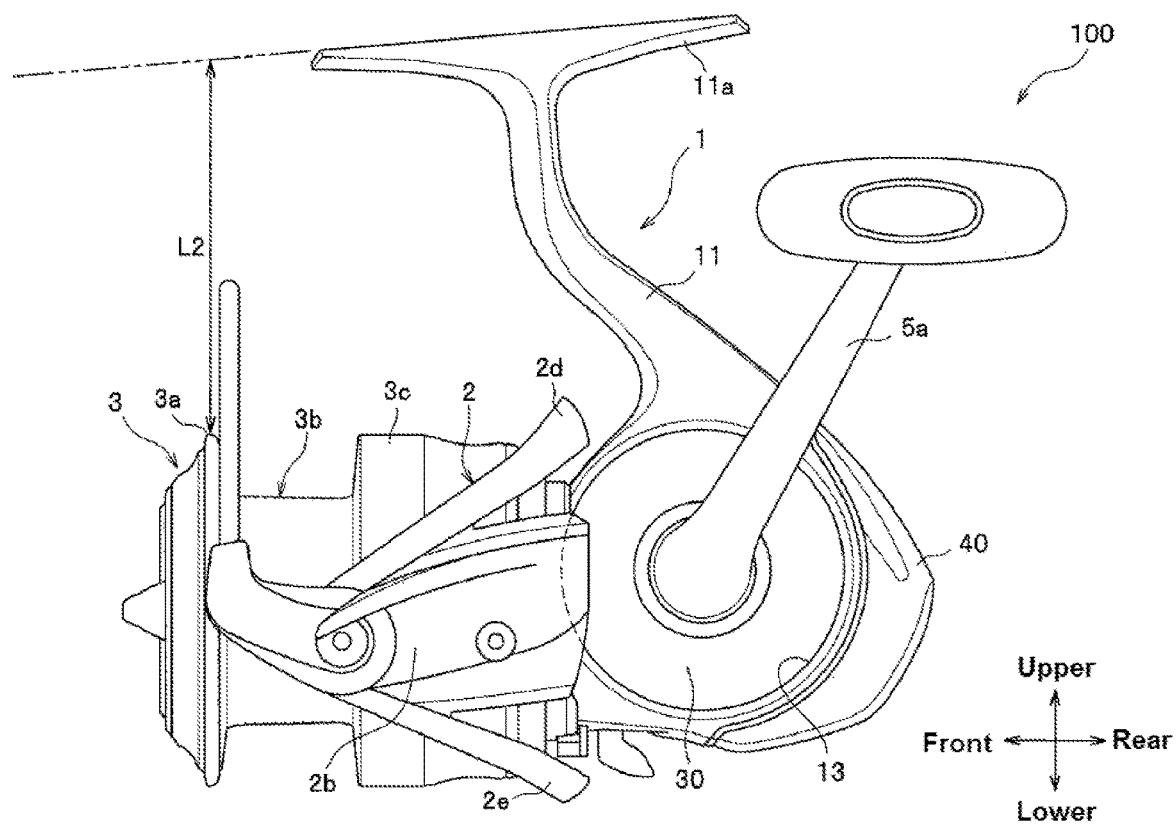
FIG. 1 is a left side view of a fishing spinning reel according to a first embodiment of the invention to show its entire configuration.
Figure 2:
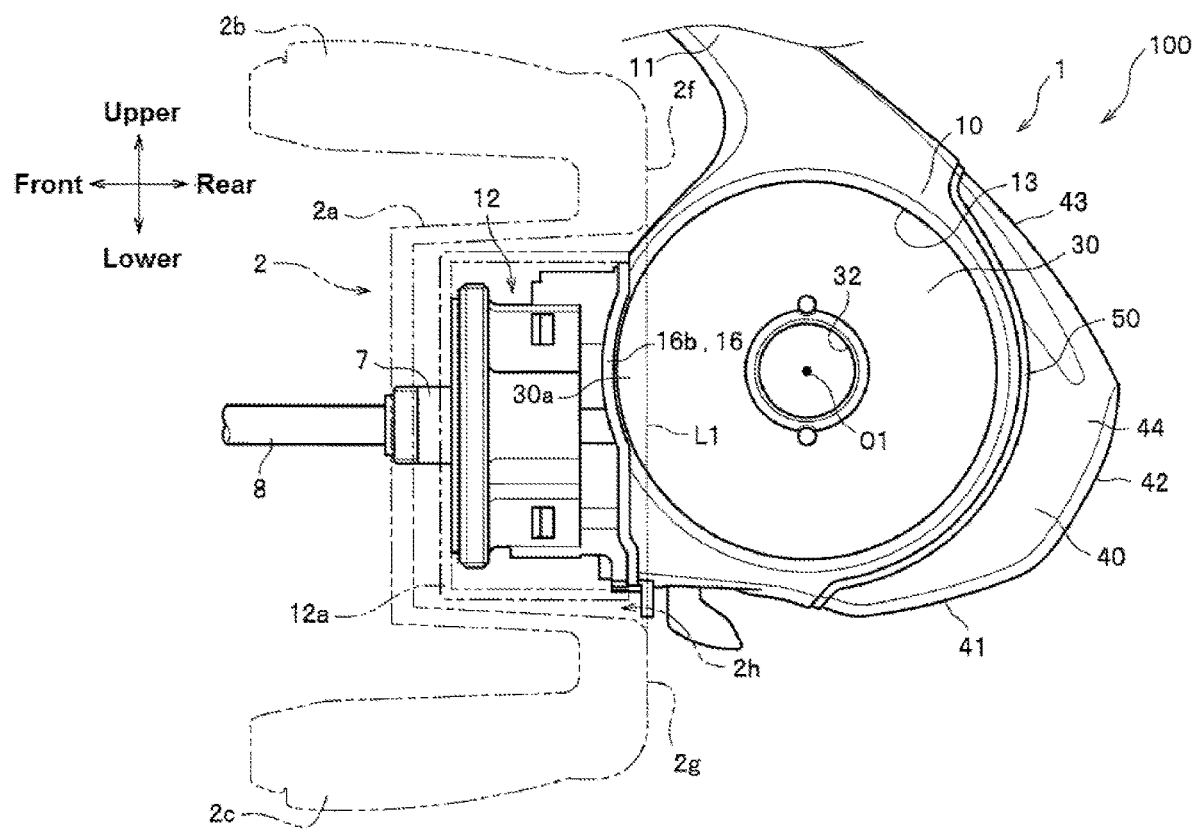
FIG. 2 is a left side view of a reel unit.

Referring to FIGS. 1 and 2, a fishing spinning reel 100 includes a reel unit 1 provided with a drive shaft sleeve 7 that projects toward the front side (see FIG. 2) and a spool shaft 8 (see FIG. 2); a rotor 2 mounted on the drive shaft sleeve 7 and disposed on the front side of the reel unit 1; and a spool 3 mounted on the spool shaft 8 and disposed on the front side of the rotor 2.

The rotor 2 includes a cylindrical portion 2a that is fixed to a front end of the drive shaft sleeve 7 and in which a rear opening portion 2h is formed (see FIG. 2); a pair of arm portions 2b, 2c (shown only the arm 2b in FIG. 1, see FIG. 2) that extend outwardly from a rear end of the cylindrical portion 2a and further extend toward the front side; and a pair of reinforcing members 2d, 2e (see FIG. 1) that extend between the pair of arm portions 2b, 2c in the circumferential direction and respectively couple the pair of arm portions 2b, 2c.

As shown in FIG. 2, rear end surface 2f, 2g of the pair of arm portions 2b, 2c are situated in the rear of the rear end edge of the cylindrical portion 2a and form rearmost surfaces that are situated at the rearmost position among the parts of the rotor 2. Note that the auxiliary line L1 in FIG. 2 is the line that connects the rear end surface 2f and the rear end surface 2g.

As shown in FIG. 1, the spool 3 includes a front flange portion 3a, a line winding body 3b, and a skirt portion 3c that are situated in the stated order from the front. When the fishing spinning reel 100 is attached to a fishing rod, the spool shaft 8 is set on the reel unit 1 such that, for example, a distance L2 between the fishing rod and the front flange portion 3a allows summing (allows a forefinger of the hand holding the fishing rod to impart resistance on a fishing line that is being released).

As shown in FIG. 2, the reel unit 1 includes a body 10 in which a side opening portion 13 that opens toward the left side is formed; a leg portion 11 that extends upward from the top of the body 10 and has at its end a rod attachment portion 11a (see FIG. 1) to be attached to the fishing rod; a cylindrical body front portion 12 provided in front of the body 10; a lid 30 used for closing the side opening portion 13; and a protective cover (a cover member) 40 attached in rear of the body 10. Note that a space inside the body 10 may also be hereunder referred to as "inside the body 10" or a "housing space S1."

Figure 3:
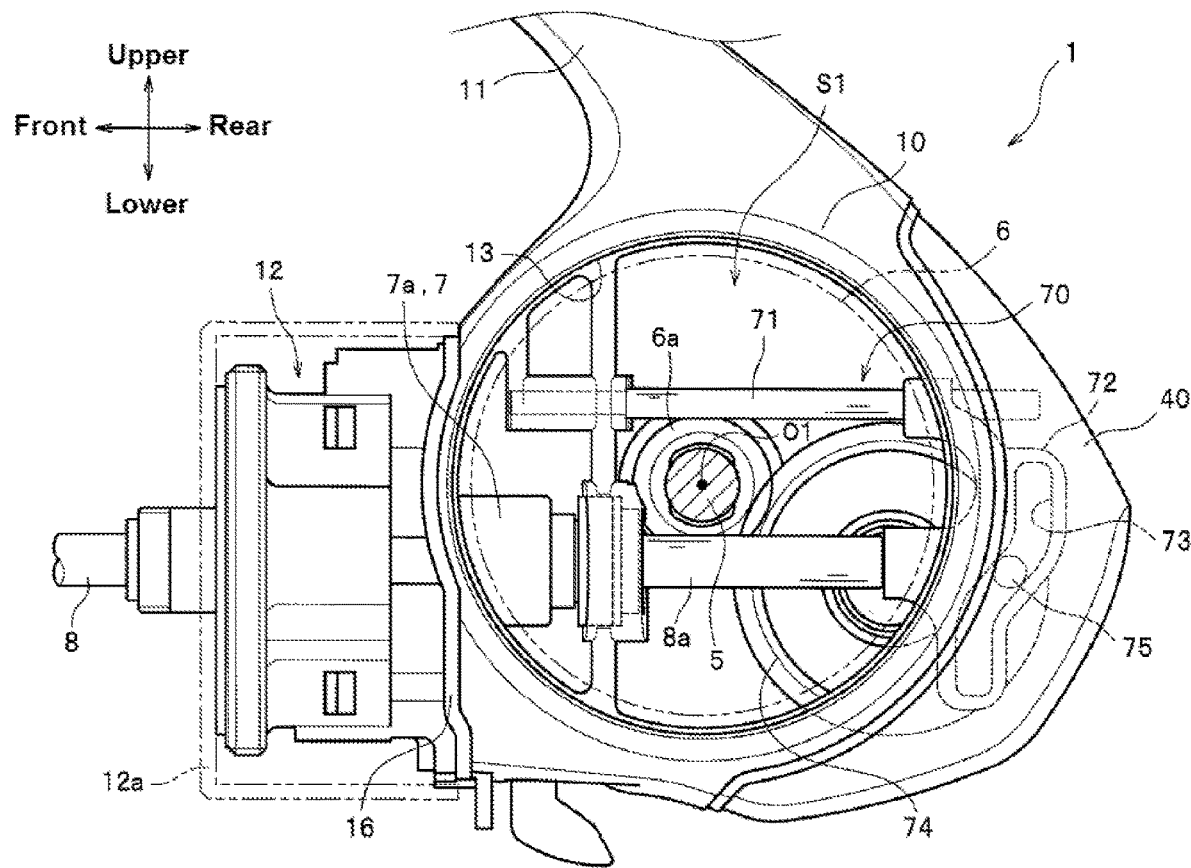
FIG. 3 is a left side view of the reel unit from which a lid is removed.

The body front portion 12 has a cylindrical shape and the drive shaft sleeve 7 is disposed thereinside. The body front portion 12 rotatably supports a front portion of the drive shaft sleeve 7. Referring to FIG. 3, a rear end of the drive shaft sleeve 7 is situated in the body 10. A pinion gear 7a is formed at the rear end of the drive shaft sleeve 7.

The body front portion 12 is situated within the cylindrical portion 2a of the rotor 2. As shown in FIGS. 2 and 3, a bottomed-cylindrical cover 12a is attached to the body front portion 12 for protection of functional components housed therein and aesthetic improvement. The outer peripheral side of the body front portion 12 is covered by the cover 12a. At a rear end of the body front portion 12, provided is a flange 16 that has a circular shape as viewed from the rear (see FIG. 5b and FIG. 7) and closes a rear opening portion of the cover 12a.

Referring to FIG. 3, the spool shaft 8 passes through the drive shaft sleeve 7 and its front end protrudes from the drive shaft sleeve 7 toward the front. A rear portion 8a of the spool shaft 8 protrudes from the rear end of the drive shaft sleeve 7 toward the rear side and is situated within the body 10.

handle shaft 5 that extends in the right-left direction, a drive gear 6 and a gear (shaft barrel) 6a that are fixed to the handle shaft 5, and a spool reciprocating device 70 are assembled in the body 10.

Figure 4:
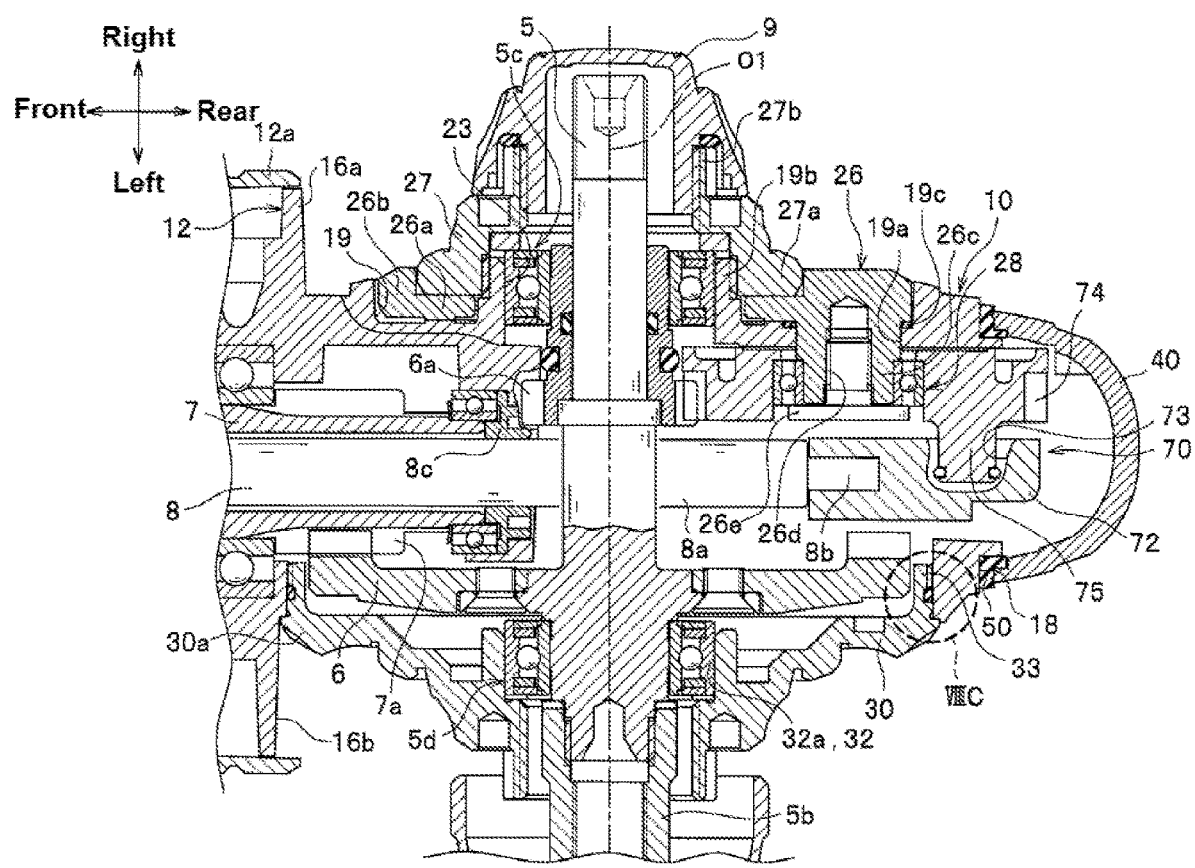
FIG. 4 is a transverse sectional view showing an internal structure of the reel unit.

As shown in FIG. 4, the handle shaft 5 is rotatably supported by the body 10 and the lid 30 through bearings 5c and 5d. A left end portion of the handle shaft 5 penetrates the lid 30 and is threadably mounted on a connecting shaft 5b provided on the handle 5a, and the handle shaft 5 is operated integrally with the handle 5a. The drive gear 6 that meshes with the pinion gear 7a is fixed on the handle shaft 5 at a position toward the left side rather than the center portion of the handle shaft 5 in the left-right direction. Accordingly when a winding operation of the handle 5a is performed, a driving force generated by the winding operation is transmitted to the drive shaft sleeve 7 through the handle shaft 5, the drive gear 6, and the pinion gear 7a, which rotates the rotor 2. At a position toward the right side rather than the center portion of the handle shaft 5 in the left-right direction, the gear 6a is fixed.

As shown in FIG. 3, the spool reciprocating device 70 includes a guide shaft 71 that extends through the body 10 in the front-rear direction, a slider 72 that moves along the guide shaft 71 and in which a guide groove 73 is formed on its right side surface, and an interlocking gear (a component) 74 provided with an eccentric projection 75 that engages with the guide groove 73. As shown in FIG. 4, the slider 72 is coupled with a projection 8b that protrudes from the rear end 8a of the spool shaft 8 toward the rear side so that the slider 72 and the spool shaft 8 forms a single body. The projection 8b and slider 72 are fastened together by a bolt (not shown). As shown in FIG. 3, the interlocking gear 74 is provided at a position rear lower than the handle shaft 5 and situated at the bottom of the body 10 to mesh with a rear side of the gear 6a. Accordingly when a winding operation of the handle 5a is performed, a driving force generated by the winding operation is transmitted to the interlocking gear 74 through the gear 6a, which rotates the interlocking gear 74. Further, the eccentric projection 75 of the interlocking gear 74 presses a front surface or a rear surface of the guide groove 73 of the slider 72, which causes the slider 72 and the spool shaft 8 (the spool 3) to reciprocate in the front-rear direction.

Next, the body 10, the protective cover 40, the spool reciprocating device 70, and the lid 30 will be further described in detail.

Figure 5A:
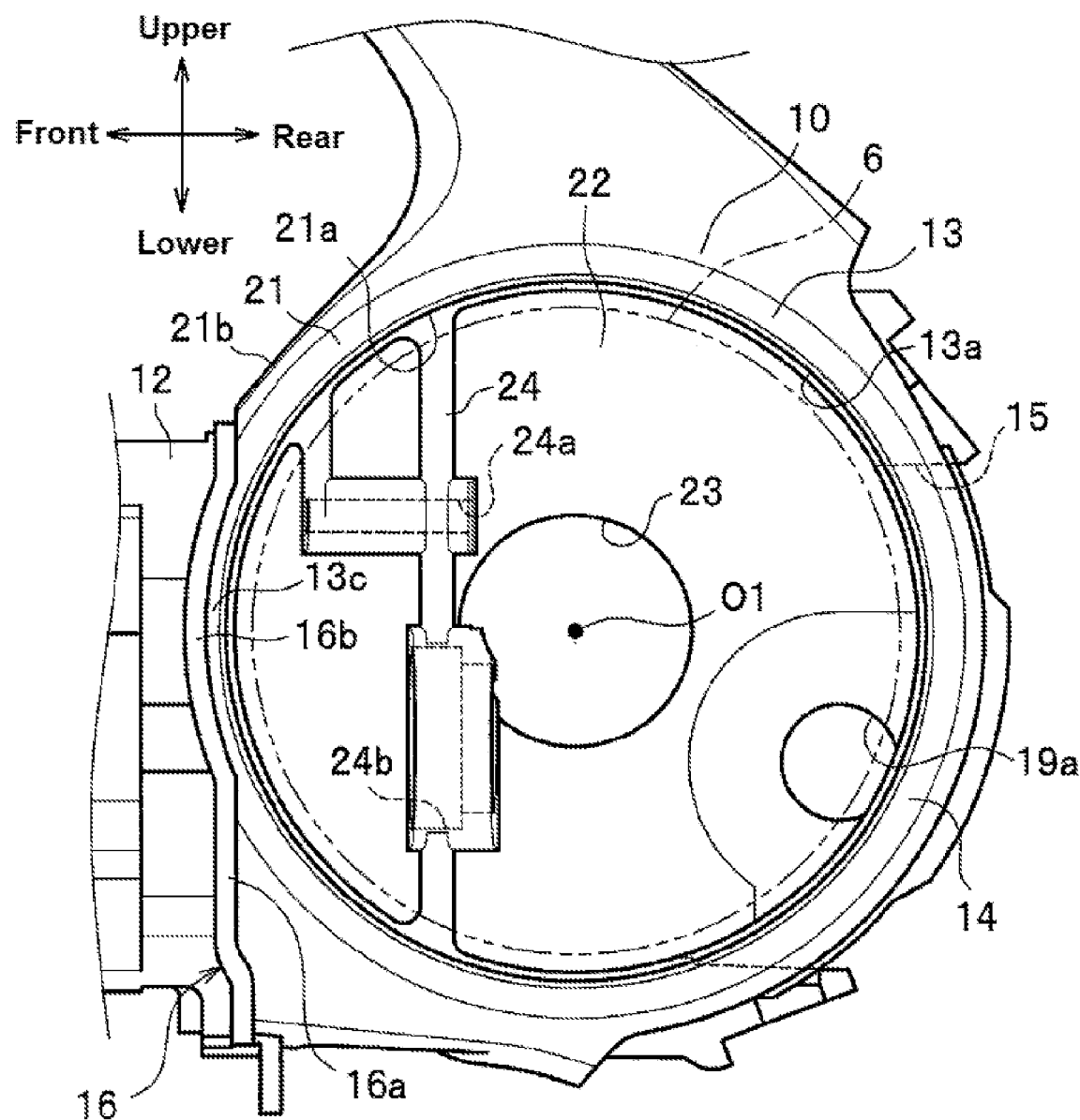
FIG. 5a is a side view of the body.

As shown in FIG. 5a, the body 10 has a bottomed-box shape (cylindrical shape) that includes a peripheral wall at the bottom portion and opens toward the left side. The body 10 includes a circular disk shaped right wall portion 22, a cylindrical portion 21 that extends toward the left from the peripheral edge of the right wall portion 22. The left end portion of the cylindrical portion 21 forms the side opening portion 13.

A right side center hole 23, a rib 24, and an insertion hole 19a are formed in an inner surface (a left side surface) the right wall portion 22. The right center hole 23 is a hole through which the right end portion of the handle shaft 5 passes and is provided at the center portion of the right wall 22.

The rib 24 is a projection that is situated in front of the right center hole 23 and extends in the upper-lower direction. The rib 24 enhances the strength of the right wall portion 22. In the upper portion of the rib 24, a guide shaft supporting hole 24a for supporting a front end 71a of the guide shaft 71 is formed. The guide shaft support hole 24a is situated on the upper side with reference to the central axis O1 of the handle shaft 5. Thus, the guide shaft 71 is disposed above the handle shaft 5 (closer to the leg portion 11). On the other hand, in the lower portion of the rib 24, a through hole 24b for allowing the rear portion 8a of the spool shaft 8 to pass to the rear is formed. The through hole 24b is situated below the central axis O1 of the handle shaft 5. Therefore, the rear portion 8a of the spool shaft 8 is disposed below the handle shaft 5 (on the side opposite to the leg portion 11). Further, a collar 8c for supporting the rear end of the drive shaft sleeve 7 is fitted in the through hole 24b (see FIG. 4).

The insertion hole 19a is formed on the rear side with reference to the right center hole 23. A boss 26c of the gear support member 26 provided on the outside (right side) of the right wall portion 22 penetrates the insertion hole 19a. Thus, a boss 26c that rotatably supports the interlocking gear 74 is disposed in the rear portion of the body 10. The gear support member 26 will be described later.

As shown in FIG. 5a, the cylindrical portion 21 is formed in a substantially cylindrical shape centering on the central axis O1 of the handle shaft 5. More particularly, an inner peripheral surface 21a of the cylindrical portion 21 is formed in a circular shape centering on the central axis O1 of the handle shaft 5, and corresponds to the size of the drive gear 6. An outer peripheral surface 21b of the cylindrical portion 21 is formed in a substantially circular shape centering on the central axis O1 of the handle shaft 5. Therefore, the thickness (radial thickness) of the cylindrical portion 21 is substantially uniform in the circumferential direction. More specifically, the cylindrical portion 21 is downsized than a conventional cylindrical portion (the cylindrical portion having a rectangular cylindrical shape as viewed from the side), and there is no unnecessary space between the inner peripheral surface 21a of the cylindrical portion 21 and the drive gear 6.

Figure 5B:
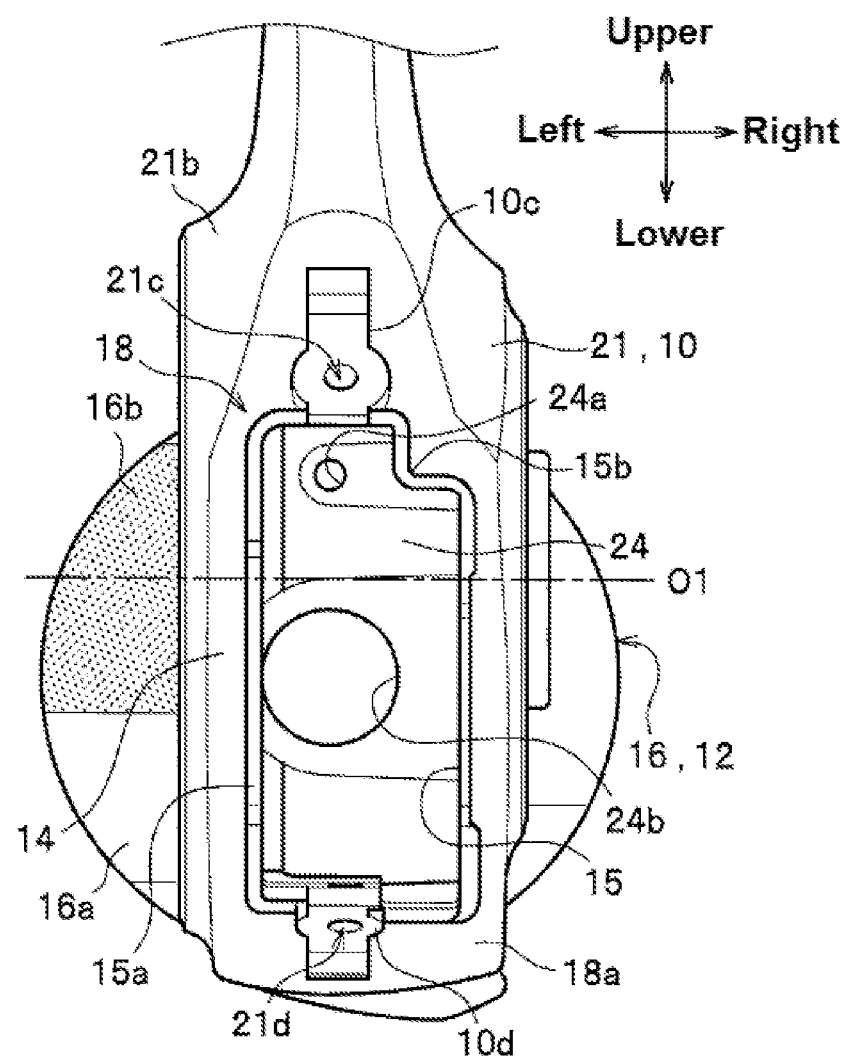
FIG. 5b is a rear view of the reel unit from which a cover member is removed.

Referring to FIG. 5b, a rear opening portion 15 that penetrates the rear portion of the cylindrical portion 21 is formed in the rear portion of the cylindrical portion 21. The rear opening portion 15 is an opening for receiving a part of a component that is to be assembled in the body 10 and allowing a part of the component to be protrude from (outside) the body 10 toward the rear.

Further, as shown in FIG. 5b, the rear opening portion 15 penetrates only the central portion of the cylindrical portion 21 in the right-left direction. Therefore, the opening (aperture) of the rear opening portion 15 and the opening (aperture) of the side opening portion 13 are not continuous to each other. In other words, an arc-shaped bridge portion 14 that forms the edges of the respective openings of the side opening portion 13 and the rear opening portion 15 extends between the side opening portion 13 and the rear opening portion 15. Therefore, as compared with the case where the opening (aperture) of the rear opening portion 15 is continuous with the opening (aperture) of the side opening portion 13, strength of the cylindrical portion 21 is improved. As a result, durability of the body 10 can be enhanced.

Further, as shown in FIG. 5b, a cover mounting portion 18 is formed around the rear opening portion 15 on a rear end surface of the cylindrical portion 21. In the upper portion of the cover mounting portion 18, an upper female screw hole 21c is formed in the lower portion of the cover mounting portion 18, a lower female screw hole 21d is formed.

Figure 6A:
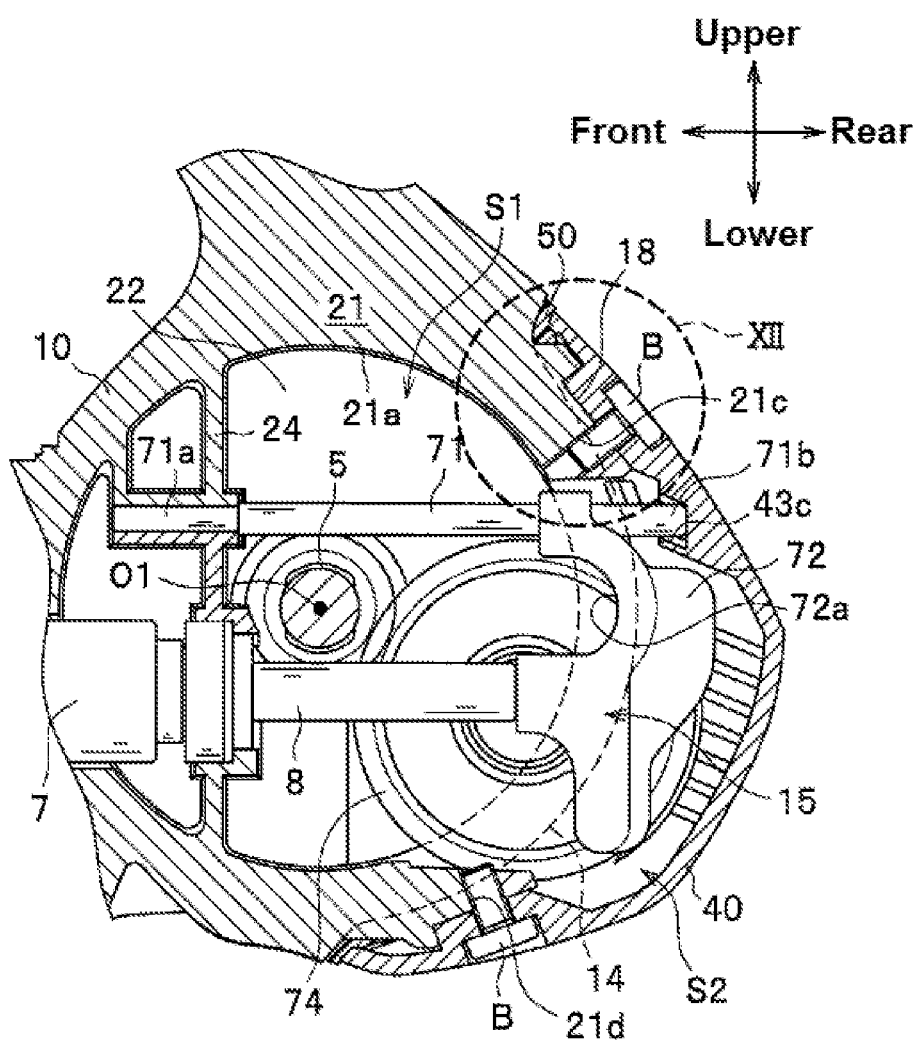
FIG. 6a is a longitudinal sectional view of the reel unit in which a slider is at the rearmost end position of a stroke.
Figure 6B:
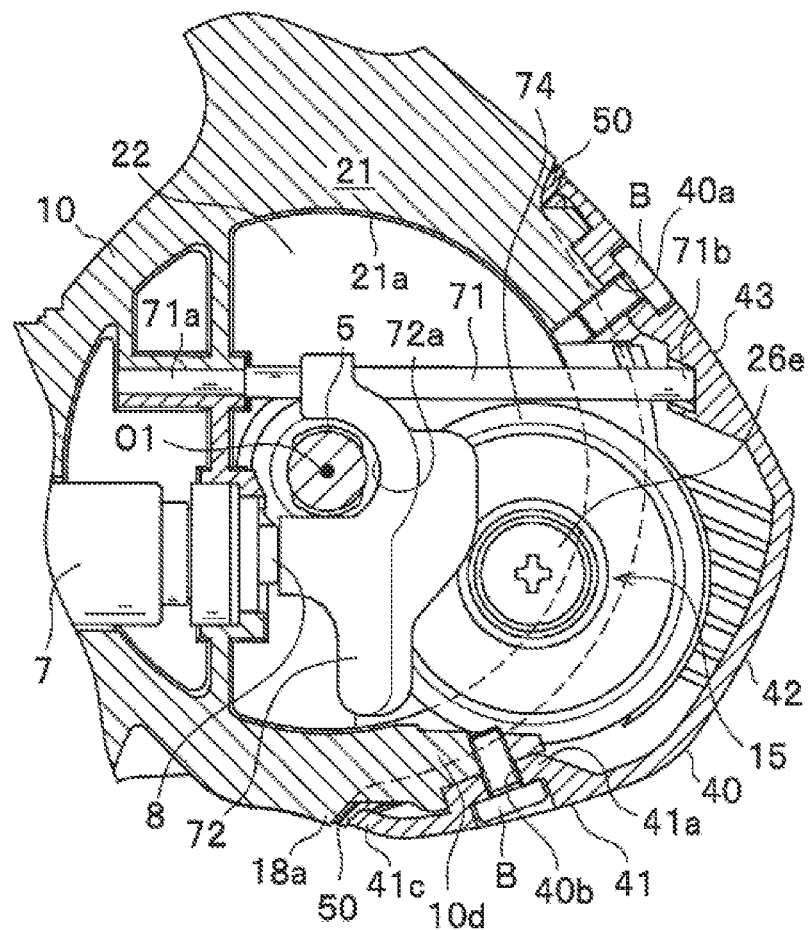
FIG. 6b is a longitudinal sectional view of the reel unit in which the slider is at the most front end position of the stroke.
Figure 7:
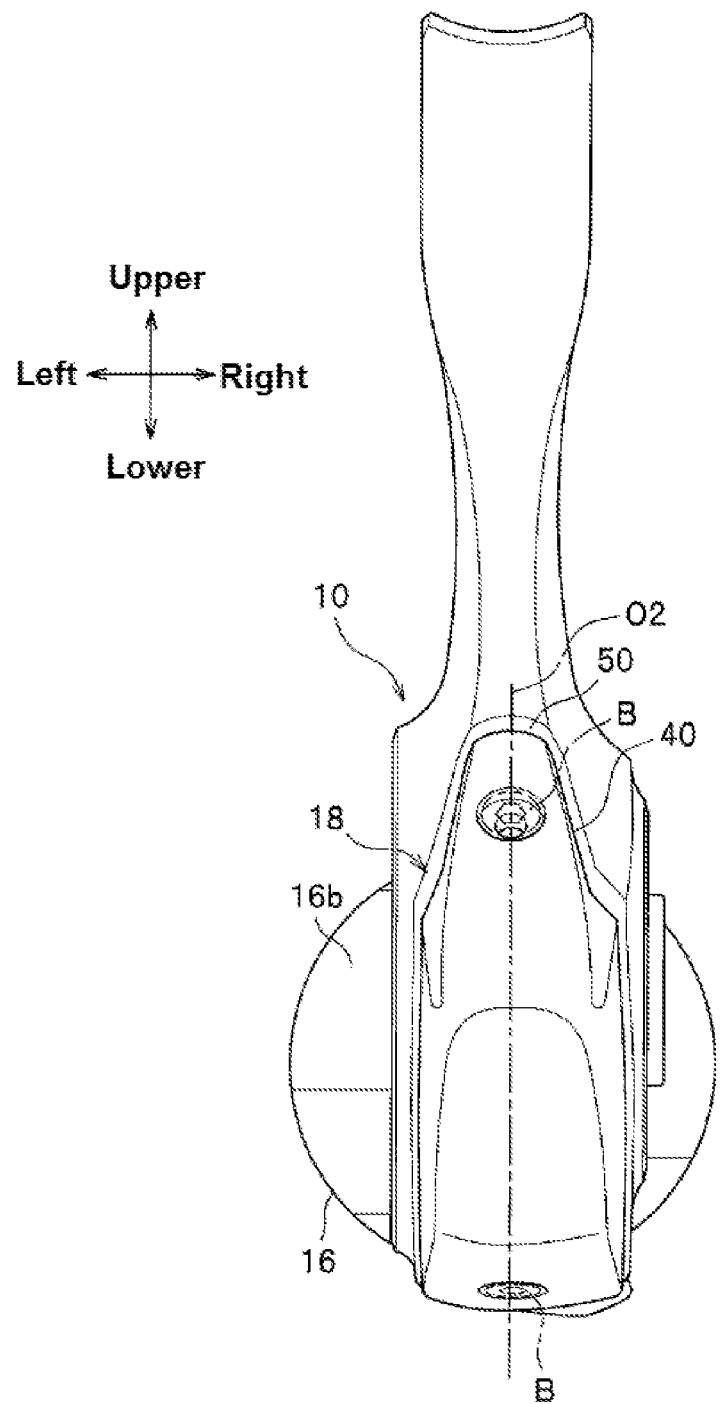
FIG. 7 is a rear view of the reel unit to which a protective cover is mounted.

The protective cover (cover member) 40 is formed in a substantially crescent shape as viewed from the side (see FIG. 2). Referring to FIGS. 6a, 6b and 7, the protective cover 40 is fastened by a screw B that engages with the upper female screw hole 21c and the lower female screw hole 21d to cover the rear opening portion 15 of the body 10 (the cylindrical portion 21). Further, as shown in FIG. 7, the protective cover 40 is formed in a shape in which its width is larger on the right side than the left side of the center line O2 passing through the spool shaft 8 (see FIG. 3) as viewed from the rear.

As shown in FIG. 6a, the front surface of the protective cover 40 is recessed toward the rear. In other words, the protective cover 40 has a bottomed cylindrical shape that opens toward the front, and a housing space S2 is formed on the front surface side of the protective cover 40. Therefore, it is possible to house, in the interior f the protective cover 40, a part of the component that projects toward the rear from the inside of the body 10 through the rear opening portion 15. Hereinafter the internal space of the protective cover 40 may be referred to as the interior of the protective cover 40 or the housing space S2 of the protective cover 40 in some cases.

In addition, an engaged portion 43c of the rear end 71b of the guide shaft is formed on the upper side of the inner surface of the protective cover 40. Between the protective cover 40 and the body 10, a sealing member 50 is provided to prevent water from entering inside from mating surfaces of the protective cover 40 and the body 10 (see FIGS. 4 and 6). The protective cover 40 will be later described in detail.

Further, in the space formed by the body 10 and the protective cover 40 (the housing space S1 and the housing space S2), components of the spool reciprocating device 70 are arranged as follows.

As shown in FIG. 6, the interlocking gear 74 passes through the rear opening portion 15 from the outside and the rear side to be assembled in the body 10. A part (rear region) of the interlocking gear 74 that projects from the rear opening portion 15 toward the rear is housed in the protective cover 40. The guide shaft 71 passes through the rear opening portion 15, and the rear end 71b of the guide shaft 71 is engaged with the engaged portion 43c of the protective cover 40. As shown in FIG. 6a, when the slider 72 is moved to the rearmost end position by being pressed by the eccentric protrusion 75, the part (rear region) of the slider 72 is housed in the protective cover 40. That is, the stroke of the slider 72 that moves in the front and rear direction is not limited to the housing space S1 of the body 10 but expanded to the rear side. Thus, even when the cylindrical portion 21 of the body 10 is formed in a cylindrical shape and the housing space in the lower side of the body 10 becomes smaller, it is possible to use the interlocking gear 74 of a desired size and therefore degradation of the performance of the spool reciprocating device 70 can be avoided. Further, since the protective cover 40 covers the interlocking gear 74 and the rear opening portion 15, it is possible to prevent seawater or dust from adhering to the interlocking gear 74 and from entering into the body 10.

As shown in FIG. 6, in the internal space of the body 10, the guide shaft 71 is disposed above the handle shaft 5 (on the side closer to the leg portion 11), and the rear portion 8a of the spool shaft 8 is disposed below the handle shaft 5 (on the opposite side to the leg portion 11). In this way, the length of the reel unit 1 is shortened in the height direction. In other words, the guide shaft 71 and the spool shaft 8 are well-proportionally disposed separately in the upper interior space and the lower interior space respectively that are divided by the handle shaft 5 in the internal space of the body 10. Consequently, it is possible to reduce the size of the body 10. Further, the slider 72 is disposed behind the handle shaft 5. A recess 72a recessed rearward is formed in the front surface (surface that faces the handle shaft 5) of the slider 72. As shown in FIG. 6b, since the handle shaft 5 is received by the recess 72a when the slider 72 is moved forward, the moving range of the slider 72 is expanded toward the front. Therefore, a sufficient stroke of the slider 72 in the front and rear direction is secured and thus a sufficient stroke of the spool 3 in the front and rear direction is secured. As described above, it is possible to avoid the disadvantage that the front-rear stroke of the spool reciprocating device 70 is reduced (the functional limitation on the spool reciprocating device 70) and a predetermined winding amount of the line cannot be secured due to the miniaturization of the body 10.

The side opening portion 13 will now be described. As shown in FIG. 5a, the left end portion of the cylindrical portion 21 (the side opening portion 13) includes the opening for assembling the components in the body 10. The inner peripheral surface 13a of the side opening portion 13 is formed in a circular shape that has substantially the same diameter as the inner peripheral surface 21a of the cylindrical portion 21. Therefore, the drive gear 6 that has a relatively large and similar shape can be disposed in the cylindrical portion 21 without increasing the size of the body 10. In other words, it is possible to avoid the disadvantage that the diameter of the drive gear 6 is decreased with the miniaturization of the body 10 and a winding gear ratio is lowered (the functional limitation on the winding operation device). This means that the diameter of the drive gear 6 can be increased as much as possible and it is possible to maintain a high speed gear ratio and strength while reducing the size of the body 10.

Further, the front edge 13c of the side opening portion 13 is situated in a concave portion 16b of the flange 16. Here, the flange 16 includes a flat portion 16a and the concave portion 16b dented toward the front compared to the level of the flat portion 16a. The concave portion 16b is provided on the left side from the body 10 (see the shaded area in FIG. 5b). Further, the concave portion 16b is formed in an arc shape around the central axis O1 of the handle shaft 5 and corresponds to the front edge 13c.

According to a conventional reel design, the center of the body 10 (the central axis O1 of the handle shaft 5) is positioned in the rear so that the side opening portion 13 does not overlap the flange 16. Whereas in the embodiment, since the concave portion 16b is formed in the flange 16, it is not necessary to move the center of the body 10 to the rear side as described above. Therefore, it is possible to shorten the length of the reel unit including the body 10 and the body front 12 in the front-rear direction by the recessed amount of the concave portion 16b, and to increase the size of the side opening portion 13 such that it edges into the concave portion 16b. As a result, as shown in FIG. 2, an outer peripheral edge 30a of the front portion of the lid 30 that closes the side opening portion 13 edges into the concave portion 16b of the flange 16 and is situated in front of the rear most end surface (see the rear end surfaces 2f, 2g and the auxiliary brie L1) of the rotor 2. In this way, even if the sizes of the side opening portion 13 and the cover member 30 are increased relative to the body 10, the length of the body 10 and the body front portion 12 in the front-rear direction is shortened size of the reel unit 1 and therefore it is possible to prevent the size increase of the reel unit 1.

In addition, as shown in FIG. 4, the rear end of the cover 12a is situated on the outside of the concave portion 16b, and the cover 12a encloses the concave portion 16b. Therefore, when viewed from the left side, the concave portion 16b is hardly visible.

In the embodiment, the concave portion 16b formed in a part of the flange 16 has been described as an example.

However the flat flange 16 may be disposed more front side rather than at the rear end of the body front portion 12, for example, to avoid interference with the lid 30 (the side opening portion 13). Further, in the embodiment, that rotor 2 in which the rear end surfaces 2f, 2g of the arm portions 2b, 2c forming the rearmost end face has been described as an example. However, the rear end surface of the cylindrical portion 2a, the rear end surfaces of the reinforcing members 2d, 2e or the like may form the rear end surface of the rotor 2 instead. Even in such cases, it is possible to shorten the length of the reel unit 1 in the front-rear direction.

Figure 8A:
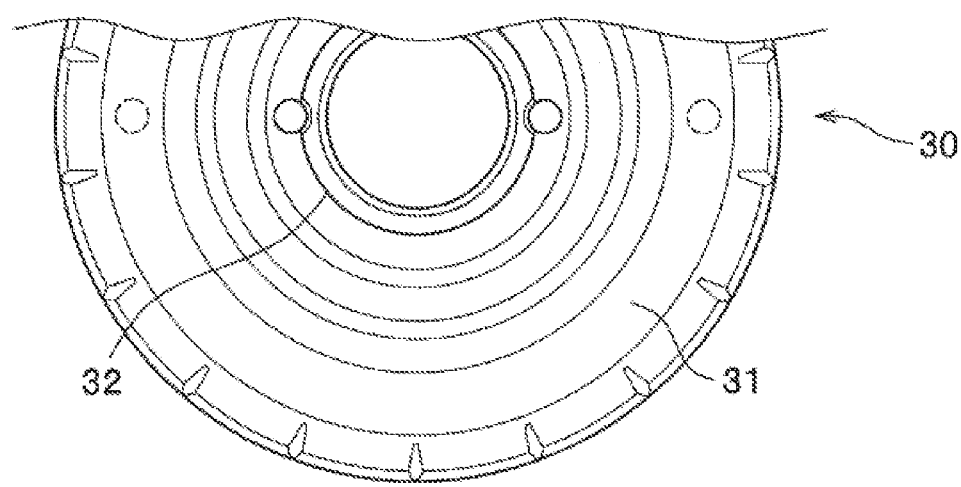
FIG. 8a is an enlarged side view showing a part of the lid.
Figure 8B:
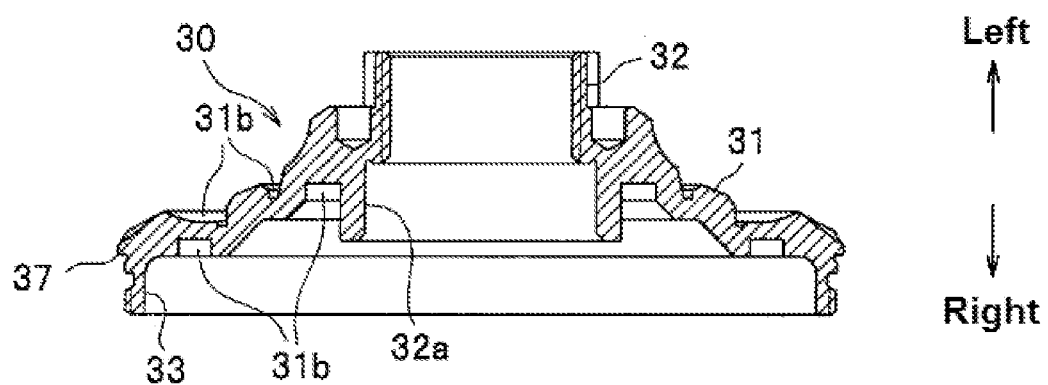
FIG. 8b is a transverse sectional view of the lid.
Figure 8C:
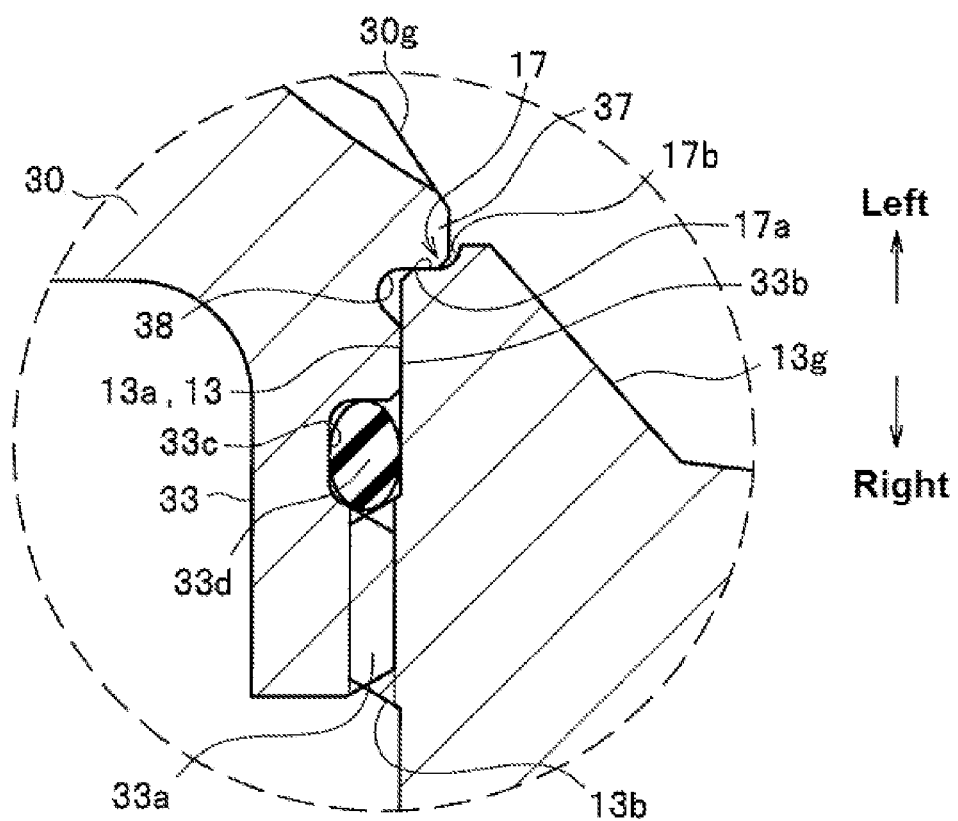
FIG. 8c is an enlarged view of the portion VIIIC surrounded by the broken line in FIG. 4.

The side opening portion 13 will be described again, a female screw portion 13b is formed on the inner side (the right side) of the inner peripheral surface 13a as shown in FIG. 8c. On the peripheral edge of the opening of the side opening portions 13, a fitting receiving portion 17 that has a concave shape in cross section is formed over the circumferential direction. The fitting receiving portion 17 includes a bottom surface 17a, and a rising portion 17b that rises from the bottom surface 17a and has a curved surface shape in cross section.

Next, the lid 30 will be described in detail. As shown in FIG. 2, the lid 30 has a circular shape and is mounted on the side opening portion 13 to close the side opening portion 13 in a liquid tight manner. The lid 30 also serves to support the right end of the handle shaft 5. As shown in FIG. 8b, the lid 30 includes an annular lid portion 31 for covering the side opening portion 13, a cylindrical portion 32 formed in the central portion of the lid portion 31, and a cylindrical insertion portion 33 on the outer peripheral edge of the lid portion 31.

The center of the lid portion 31 protrudes more toward the left compared to the outer peripheral edge thereof, and the cross-section of the lid portion 31 has a substantially mountain shape. Lightweight portions 31b are formed in the outer surface (the left side surface) and the inner peripheral surface (the right side surface) of the lid portion 31 to reduce the weight of the lid 30. Both ends of the cylindrical portion 32 protrude to the left and right from the lid portion 31. The bearing 5d (see FIG. 4) is fitted on a right end portion 32a of the cylindrical portion 32. The left end of the handle shaft. 5 rotatably supported by the bearing 5d penetrates the cylindrical portion 32 and protrudes from the cylindrical portion 32 toward the left. As shown in FIG. 4, the right end of the handle shaft 5 is supported by a handle support portion 19b provided on the body 10 through the bearing 5c.

The insertion portion 33 is a portion that extends from the outer peripheral edge of the lid portion 31 toward the right to be inserted in the interior of the side opening portion 13 and has a cylindrical shape. As shown in FIG. 8c, on the outer peripheral surface of the insertion portion 33, a male screw portion 33a, a housing recess 33c, an abutting surface 33b, and a small diameter portion 38 are formed in this stated order from the tip end side (the right end side) to the butt end side (the left end side).

The male screw portion 33a is threadably formed to be engaged with the female screw portion 13b on the inner peripheral surface 13a of the side opening portion 13. When the male screw portion 33a is engaged with the female screw portion 13b, the lid 30 is fastened to the reel unit 1 (the body 10), and the side opening portion 13 is closed by the lid portion 31 of the lid 30. With such a fastening structure, a plurality of screws for fastening the lid 30 to the body 10 can be made unnecessary otherwise needed in a conventional structure. In this way, it is possible to reduce the number of components and improve ease of assembling and disassembling of the reel. Moreover, it is possible to prevent breakage of the screws.

The abutting surface (abutting portion) 33b abuts the inner peripheral surface 13a of the side opening portion 13 and is for adjusting the center of the lid 30 relative to the side opening portion 13 at the time of mounting the lid 30 on the side opening portion 13 by screwing. In this manner, the center of the right center hole 23 of the body 10 for supporting the right of the handle shaft 5 corresponds to the center of the cylindrical portion 32 of the lid 30 for supporting the left of the handle shaft 5, and consequently the concentricity is achieved. Thus, the handle shaft 5 is supported so as to extend in the right-left direction with respect to the reel unit 1, the rotation of the handle shaft 5 becomes smooth, and the operability of the handle 5a can be improved. The abutting surface 33b may be configured to partially abut the inner peripheral surface 13a of the side opening portion 13 and only some portions of the abutting surface 33b may abut the inner peripheral surface 13a at intervals in the circumferential direction. The concentricity can be obtained also by this configuration.

Here, at the time of winding operation of the handle 5a, a load centering on the central axis O1 acts in the radially outward direction on the lid 30 that supports the handle shaft 5. In a conventional configuration, the lid is fixed to the body by a plurality of screws so that a load on the lid acts only on the portions of the body where the screws are situated and the load concentrates thereon. Whereas according to this embodiment, the entire circumference of the insertion portion 33 is supported by the circular side opening portion 13 via the male screw portion 33a and the abutting surface 33b. Therefore, the load acting on the lid 30 is distributed uniformly over the entire circumference of the side opening portion 13. As a result, even if a large load acts on the lid 30 during a winding operation of the handle 5a, the load acting on the cover 30 is distributed over the entire circumference of the side opening portion 13, which enhances the durability of the body 10.

The housing recess 33c is a recess formed between the male screw portion 33a and the abutting surface 33b, and an O-ring 33d is fitted as a sealing material on the outer periphery of the housing recess 33c. This prevents water from entering inside from between the insertion portion 33 and the side opening portion 13.

The small diameter portion 38 is dented radially inward from the abutting surface 33b and is formed in a curved concave shape as viewed in cross section. A lubricant such as grease or oil is applied on the small diameter portion 38. Therefore, smooth attachment of the lid 30 is possible with the lubricant, and the sealing performance between the inner peripheral surface 13a of the side opening portion 13 and the lid 30 is enhanced.

In the outer peripheral edge portion of the lid 30, provided is a flange-shaped fitting portion 37 that extends circumferentially outward. The fitting portion 37 contacts the bottom surface 17a with a small gap between the rising portion 17b of the fitting receiving portion 17 of the side opening portion 13 (although there is the gap in the example shown in the drawing, full contact fitting is alternatively possible) to spigot fit in the fitting receiving portion 17. This spigot fitting curbs the amount of projection of the fitting portion 37 in the lateral direction. Moreover, with the spigot fitting the abutting surfaces (the inner peripheral surface 13a and the abutting surface 33b) are not exposed to the outside. Therefore, even if a gap is formed between the abutting surfaces (the inner peripheral surface 13a and the abutting surface 33b), the spigot fitting can prevent the gap from being exposed. As a result, it is possible to prevent sea water, water, sand in the water, foreign substances or the like from entering inside. Furthermore, since it is possible to prevent a fishing line unwound when the reel is operated or the like from entering into the gap, entanglement of the fishing line can be prevented. Note that lubricant such as grease or oil may be applied on the fitting receiving portion 17 and the fitting portion 37 to enhance the sealing performance.

As shown in FIG. 8c, the outer surface 30g of the outer peripheral edge of the lid 30 and an outer surface 13g of the outer peripheral edge portion of the side opening portion 13 are configured as inclined surfaces that are substantially continues to each other with the fitting portion 37 (the fitting receiving portion 17) interposed therebetween. This structure makes a unwound fishing line less likely to be caught thereon.

With reference to FIGS. 4 and 9, a peripheral structure of the gear support member 26 will now be described.

Figure 9A:
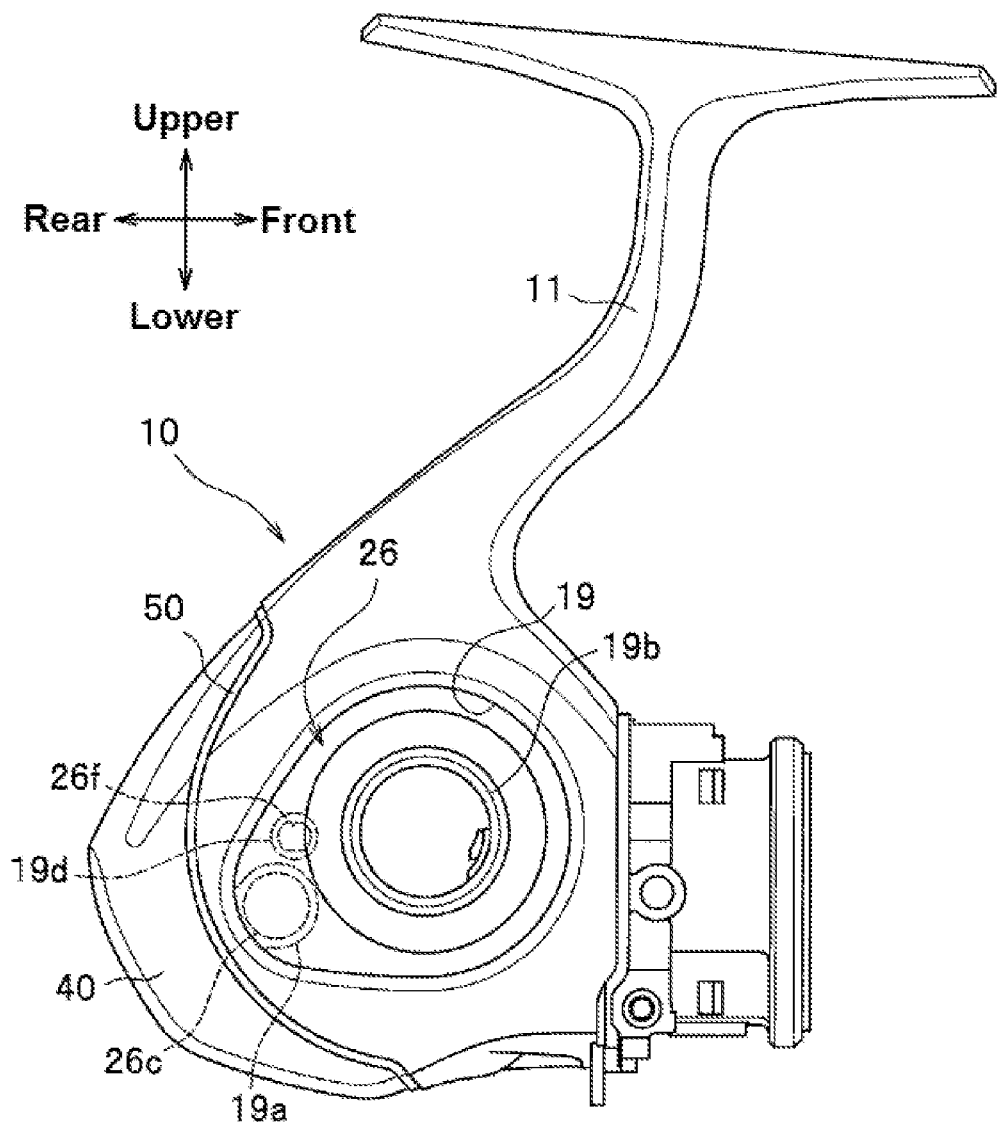
FIG. 9a is a right side view of the reel unit to which a gear support member is attached.

As shown in FIG. 4, the cylindrical handle support portion 19b that projects toward the right is provided in the right side portion of the body 10. Around the handle support portion 19b, a mounting portion 19 recessed therein is provided. As shown in FIG. 9a, the mounting portion 19 has a cam shape in a side view. Further, the gear support member 26 that is also formed in a cam shape is attached on the mounting portion 19.

Figure 9B:
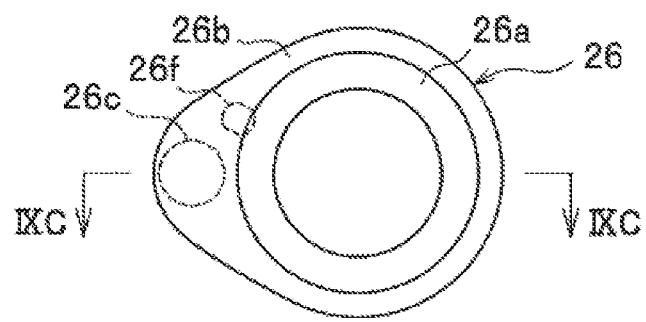
FIG. 9b is a right side view of the gear support member.
Figure 9C:
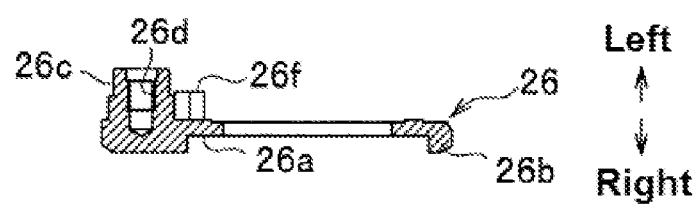
FIG. 9c is a cross-sectional view along the line IV-IV viewed from the direction indicated by the arrow.

As shown in FIGS. 9b and 9c, the gear support member 26 has a plate-like shape. The gear support member 26 includes an annular inner peripheral portion 26a that encloses the handle support portion 19b of the body 10, and an annular outer peripheral portion 26b that is thicker than the inner peripheral portion 26a.

As shown in FIG. 4, an annular portion 27a of a fixing member 27 contacts a right side surface of the inner peripheral portion 26a. In this manner, the gear support member 26 is prevented from being escaped from the handle support portion 19b. The fixing member 27 is mounted on the body 10 by screwing into the handle support portion 19b of the body 10. Further, a handle cap 9 is mounted on a tip end portion 27b of the fixing member 27 by screwing.

A boss 26c that protrudes to the left is formed in the left side surface of the outer peripheral portion 26b. The boss 26c protrudes into the housing space St through the insertion hole 19a formed in the mounting portion 19. An O-ring 19c (shown by the broken lines in FIG. 9a) is provided on the periphery of the insertion hole 19a for a dust and water proof.

The boss 26c supports the interlocking gear 74 via a bearing 28. That is, the boss 26c serves as a support shaft for the interlocking gear 74. Thus, the interlocking gear 74 is configured to be supported by the gear support member 26 attached to the body 10 without being directly supported by body 10. Since the boss for supporting the interlocking gear 74 is not formed in the inner surface of the right portion of the body 10, the left side (inner surface) of the right wall portion 22 (see FIG. 5a) of the body 10 has a substantially flat surface before the gears support member 26 is mounted. Therefore it is possible to allow the components to be smoothly inserted into the housing space S1 through the rear opening portion 15 and facilitate assembling of the components of the spool shaft 8 and the spool reciprocating device 70.

Further, according to the configuration described above, the position to support the interlocking gear 74 (the position of the boss 26c) is determined when the gears support member 26 is mounted on the mounting portion 19, and the distance between the axis of the interlocking gear 74 and the handle shaft 5 is determined. Thus, it is possible to support the interlocking gear 74 with various diameters (various specifications) by changing the specification of the gear support member 26 to change the axial distance and consequently it is possible to change the stroke amount. In this way, it is possible to realize specification changes of the fishing spinning reel 100 easily at low cost. At the same time, since the reel unit 1 can be made as a common component, it is not necessary to prepare several types of molds corresponding to the reel specifications in manufacturing of the reel unit 1. Therefore it is possible to reduce the costs associated with a change in the specifications. Further, it is also possible to make components that have sizes beyond the size of the reel as a common component. Therefore, it is possible to avoid price increase of the reel. In order to enable mounting of the gear support members 26 with different specifications, the shape of the insertion hole 19a in the mounting portion 19, for example, may be formed in a circular shape of larger diameter, a long hole shape or the like.

In addition, in the above configuration, the bearing 28 is retained by a screw 26e in a screw hole 26d (see FIG. 4, and FIG. 6b) while the right end of the inner ring of the bearing 28 abuts against a stepped portion of the boss 26c. A stepped portion of the interlocking gear 74 is abutted against the right end of an outer ring of the bearing 28 to prevent the gear from moving leftward.

As shown in FIGS. 9b and 9c, in the vicinity of the boss 26c of the gear support member 26, a protrusion 26f is provided. The projection 26f protrudes toward the mounting portion 19 and is inserted into a positioning hole 19d formed in the mounting portion 19 (see FIG. 9a) to prevent the gear support member 26 from moving in the surface direction of the mounting portion 19.

Procedure to mount the spool shaft 8, the spool reciprocating device 70 and the gears support member 26 is as follows. First, the guide shaft 71 of the spool reciprocating device 70 is inserted into the body 10 (the housing space S1) through the rear opening portion 15, and the front end 71a of the guide shaft 71 is inserted into the guide shaft support hole 24a. In this state, the rear end 71b of the guide shaft 71 projects from the rear of the body 10 through the rear opening portion 15.

Subsequently, the slider 72 is coupled to the projection 8b at the rear end of the spool shaft 8 (see FIG. 4) with a screw (not shown). The interlocking gear 74 is brought close to the slider 72, and the eccentric projection 75 of the interlocking gear 74 is engaged with the guide groove 73 of the slider 72. The slider 72 and the interlocking gear 74 together with the spool shaft 8 are then inserted into the body 10 (the housing space St) through the rear opening portion 15. Note that the bearing 23b is attached to the interlocking gear 74 in advance.

Then, insert the tip of the spool shaft 8 in the drive shaft sleeve 7. To insert the spool shaft, when the slider 72 is brought close to the rear opening portion 15, a guide hole shown) of the slider 72 is aligned with the rear end 71b of the guide shaft 71 that projects from the rear of the body 10 and the slider 72 is engaged with the guide shaft 71. In this manner, the slider 72 and the interlocking gear 74 are inserted along the guide shaft 71.

Subsequently, the gear support member 26 is mounted from the right side of the body 10 to the mounting portion 20 of the body 10, the boss 26c is protruded inside the body 10 (the housing space S1) through the insertion hole 19a to be inserted through the bearing 23b of the interlocking gear 74.

Thereafter, the screw 26e is screwed into the screw hole 23a of the bearing 23b to retain the interlocking gear 74 to the boss 26c. As described above, it is possible to assemble the spool shaft 8 and the spool reciprocating device 70 in the housing space S1 through the rear opening portion 15. The above-described assembly order is merely an example, and may be changed in accordance with needs.

The protective cover 40 and the sealing member 50 will now be described in detail.

Figure 10A:
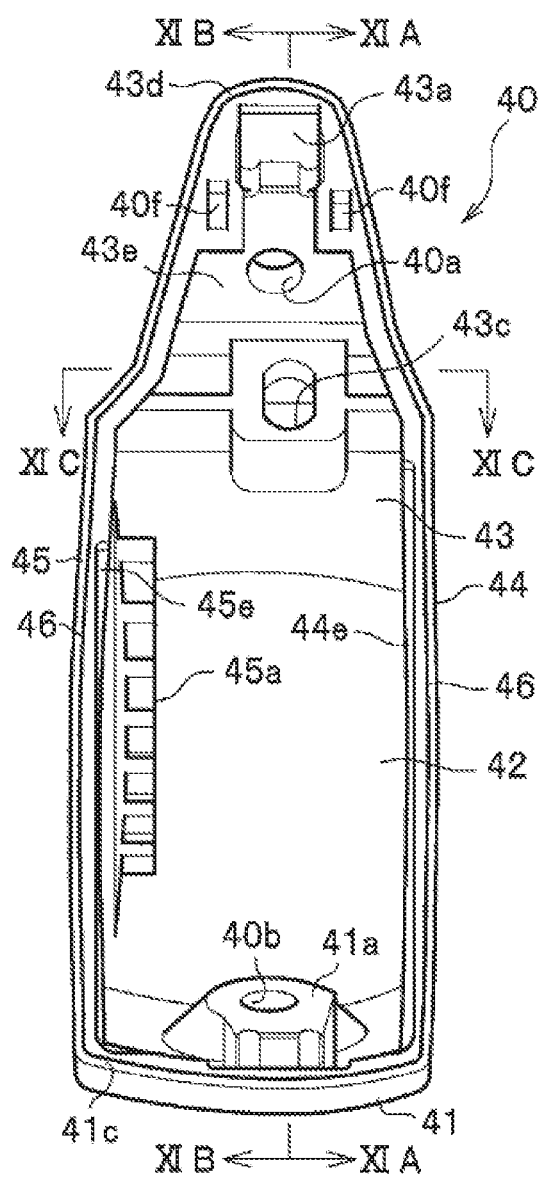
FIG. 10a is a front view of the protective cover.
Figure 10B:
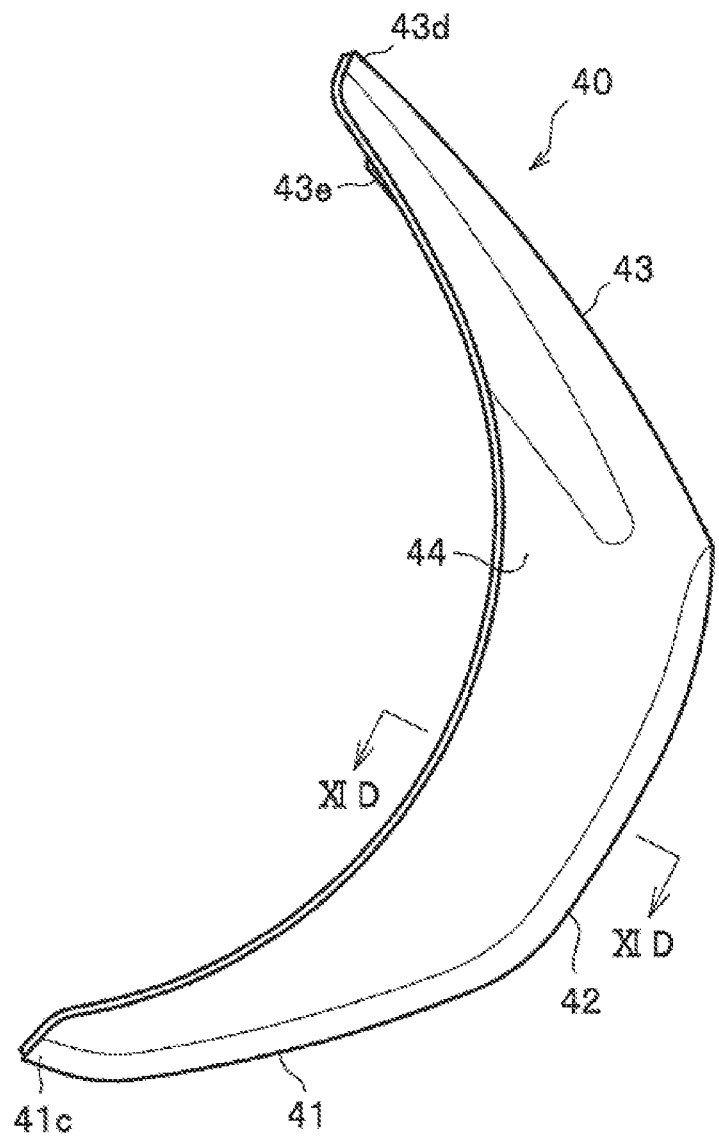
FIG. 10b is a left side view of the protective cover.
Figure 10C:
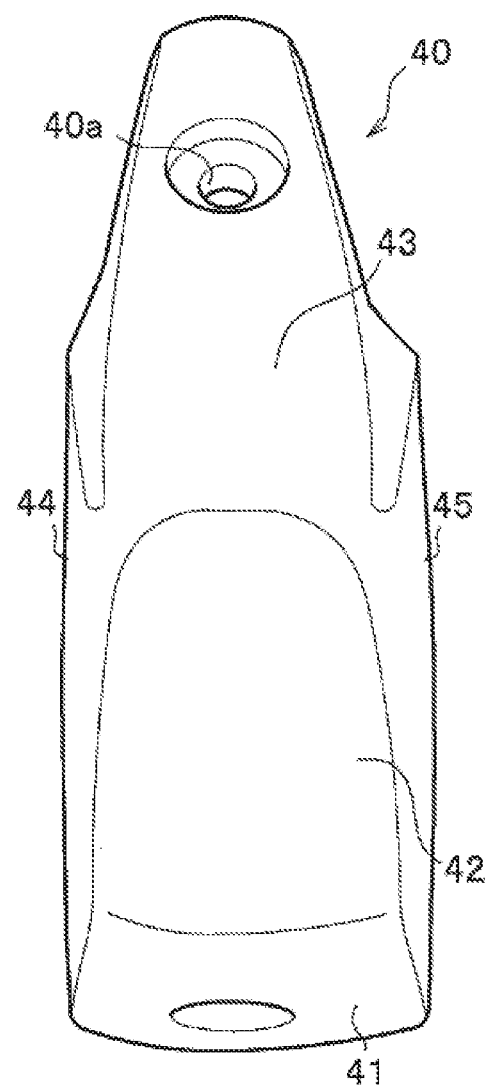
FIG. 10c is a rear view of the protective cover.

As described above, the protective cover 40 has a bottomed cylindrical shape that opens toward the front. Thus, as shown in FIGS. 2 and 10c, the protective cover 40 includes a base portion 41 disposed at the rear lower portion of the body 10, a rearward inclining portion 42 that extends obliquely upward to the rear from the rear end of the base portion 41, a forward inclining portion 43 that extends obliquely rearward to the front from the upper end of the rearward inclining portion 42, and plate-shaped left side portion 44 and right side portion 45 (only the left side portion 44 is shown in FIG. 2), that are formed over the base portion 41, the rearward inclining portion 42, and the forward inclining portion 43. (The outer surface of) The base portion 41, the rearward inclining portion 42, and the forward inclining portion 43 are formed substantially flat.

Figure 11A:
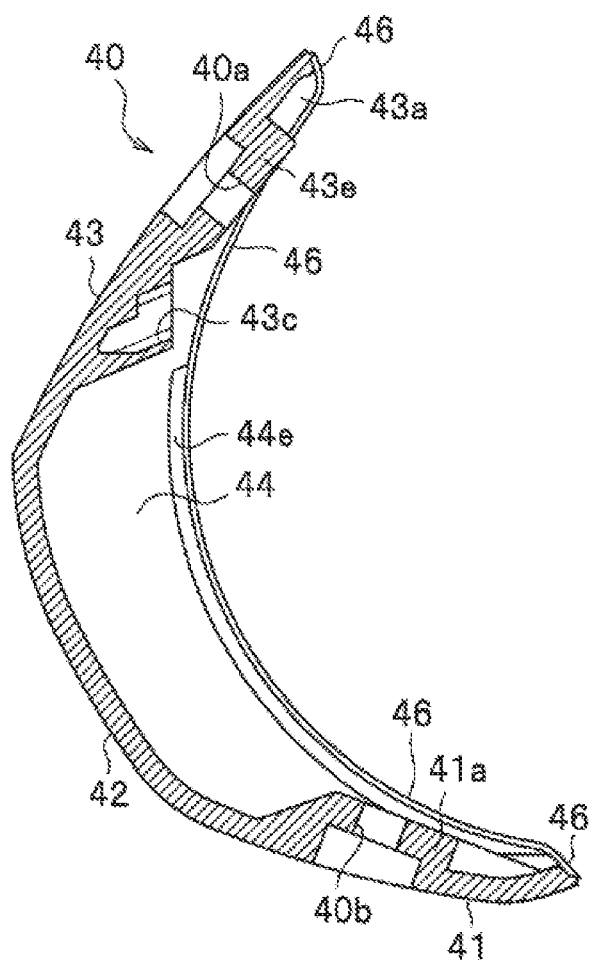
FIG. 11a is a sectional view taken along the line XIA-XIA in FIG. 10a, FIG. 11b is a sectional view taken along the line XIB-XIB in FIG. 10a, FIG. 11c is a sectional view taken along the line XIC-XIC in FIG. 10a, and FIG. 11d is a sectional view taken along the line XID-XID line in FIG. 10b.
Figure 11B:
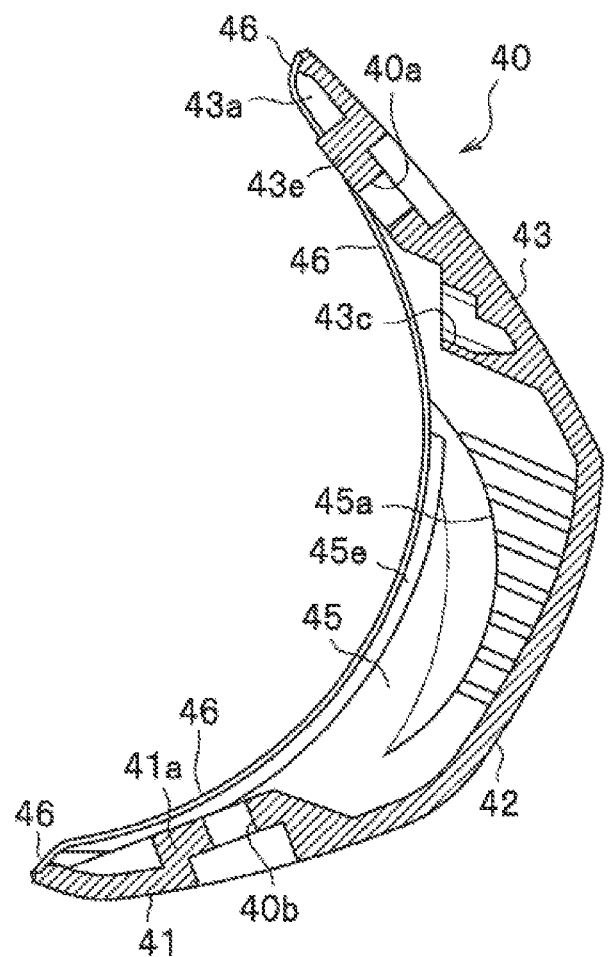
Figure 11C:
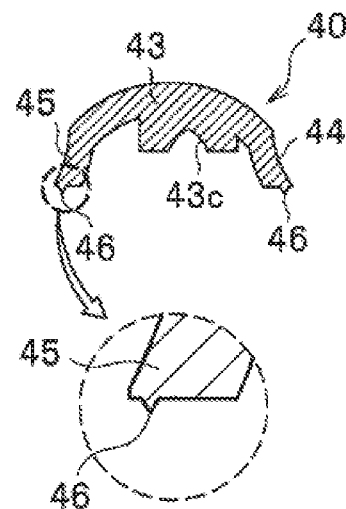
Figure 11D:
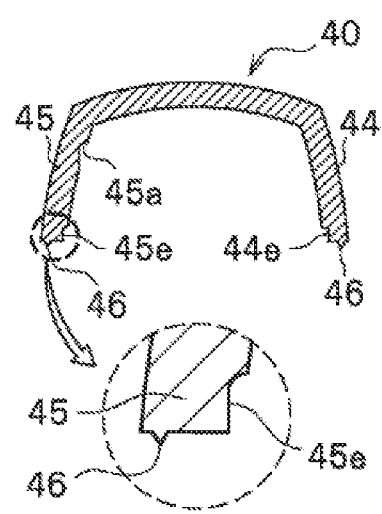

As shown in FIGS. 11c and 11d, a projecting portion 46 that projects toward the front is formed in the annular front edge portion of the protective cover 40. The projecting portion 46 has a tapered substantially triangular cross section so that it abuts and bites into the surface of the sealing member 50 that faces the projecting portion. As shown in FIG. 10a, the projecting portion 46 extends to a front edge of an upper end portion 43d of the forward inclining portion 43, front edges of the left and right side portions 44, 45, and a front edge of the base portion 41 and is formed in an annular shape. The projecting portion 46 is not limited to the one formed in an annular shape. Alternatively it may have a partial cut therein.

As shown in FIG. 10a, a base boss 41a that protrudes upward is formed on the inner surface (upper surface) of the base portion 41. Further, a screw hole 40b is formed in the base boss 41a. The base boss 41a of the protective cover 40 abuts a lower boss 10d (see FIG. 6b) of the cover mounting portion 18. The head of a screw B abuts the rim of the screw hole 40b and the base portion 41 is fixed to the cover mounting portion 18. The rim of the screw hole 40a is formed such that the head of the screw B does not protrude from the outer surface of the base portion 41. A front end 41c of the base portion 41 is formed in a shape that corresponds to a lower rear wall 18a of the cover mounting portion 18 and the front end 41c is abutted against the lower rear wall 18a from the rear with the sealing member 50 interposed therebetween.

As shown in FIG. 6b, the rearward inclining portion 42 is separated from the components (the interlocking gear 74 and the slider 72) of the spool reciprocating device 70 that project from the rear opening portion 15 of the body 10 so as to avoid contact with the components. As shown in FIG. 11b, a reinforcing rib 45a is also formed in the right side portion 45.

Figure 12:
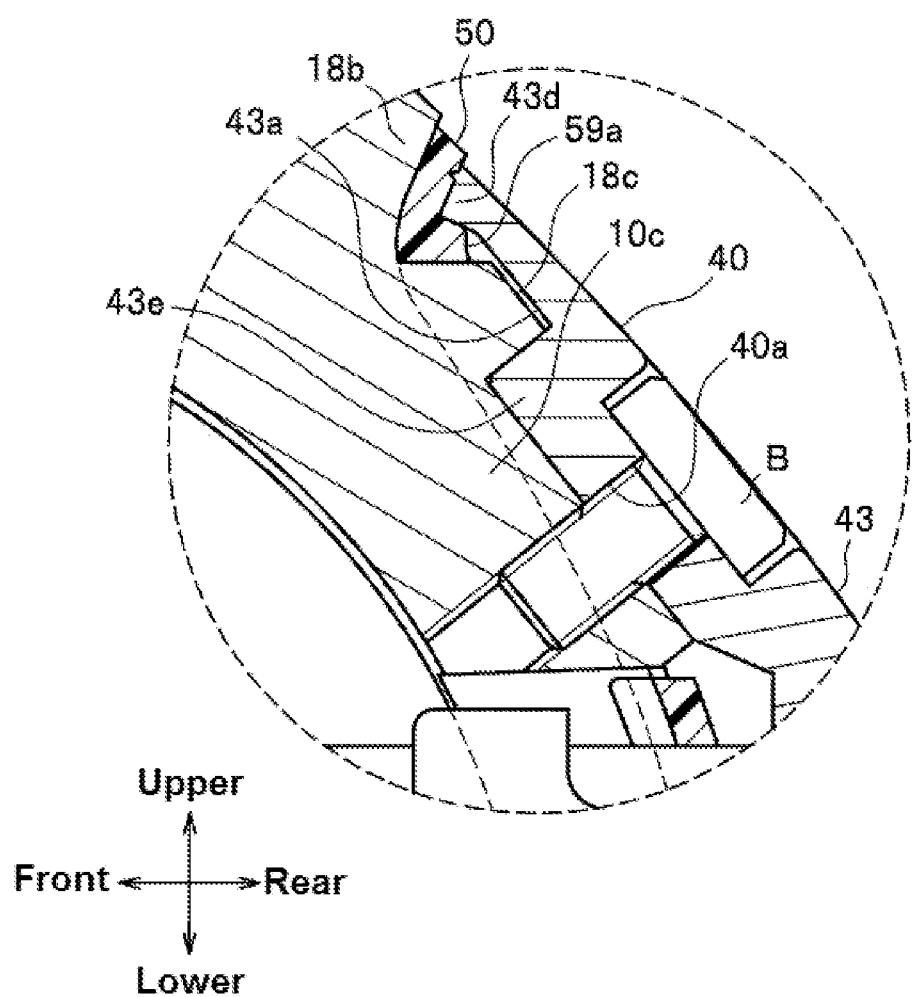

As shown in FIG. 6b, the forward inclining portion 43 covers the upper rear portion of the body 10. As shown in FIG. 12, the upper end portion 43d of the forward inclining portion 43 is formed in a shape that corresponds to an upper rear wall 18b of the cover mounting section 18, and the upper end portion 43d is abutted against the upper rear wall 18b from the rear with the sealing member 50 interposed therebetween. As shown in FIG. 10a, an upper recess 43a, the screw hole 40a, an engaged portion 43c are formed on the inner side (the front surface) of the forward inclining portion 43 in the stated order from the top. As shown in FIG. 12, the upper recess 43a is recessed such that it corresponds to an upper projecting portion 18c of the cover mounting portion 18 to engage therewith. The upper recess 43a serves as an alignment portion in the upper portion of the protective cover 40. A sixth restricting portion 59a provided on the top portion of seal member 50 is engaged on the upper edge of the upper recess 43a. The screw hole 40a is formed in the forward inclining portion boss 43e that is formed on the inner side (the front surface) of the forward inclining portion 43 to project therefrom. As described above, the engaged portion 43c is a portion that supports the rear end 71b of the guide shaft 71 (see FIG. 6).

When the protective cover 40 is mounted on the cover mounting portion 18, the upper recess 43a of the forward inclining portion 43 is firstly hooked on the upper projecting portion 18c of the cover mounting portion 18, and the protective cover 40 is then turned down around the upper recess 43a. According to this procedure, the alignment of the protective cover 40 with the cover mounting portion 18 is easy.

The sealing member 50 is sandwiched between the cover mounting portion 18 and the protective cover 40 to seal liquid-tightly the gap between the cover mounting portion 18 (the body 10) and the protective cover 40.

Figure 13A:
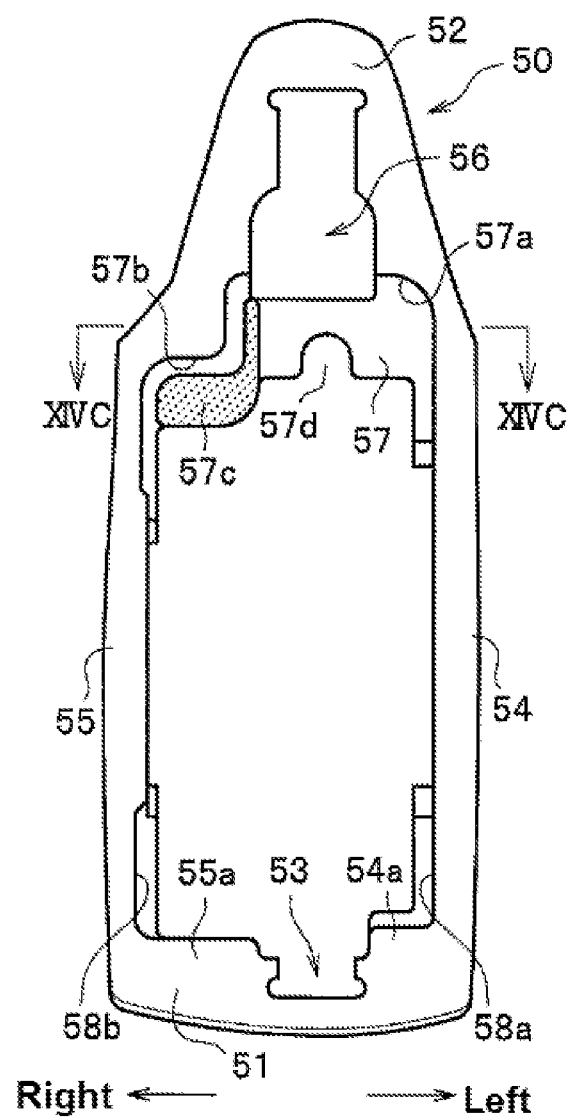
FIG. 13a is a front view of a sealing member.
Figure 13B:
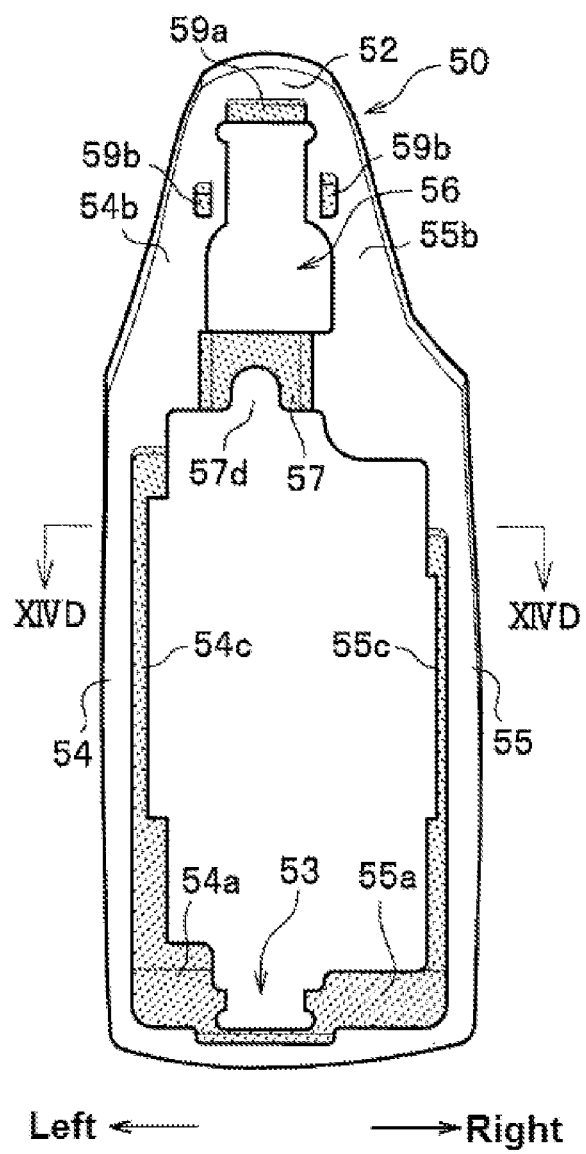
FIG. 13b is a rear view of the sealing member.
Figure 13C:
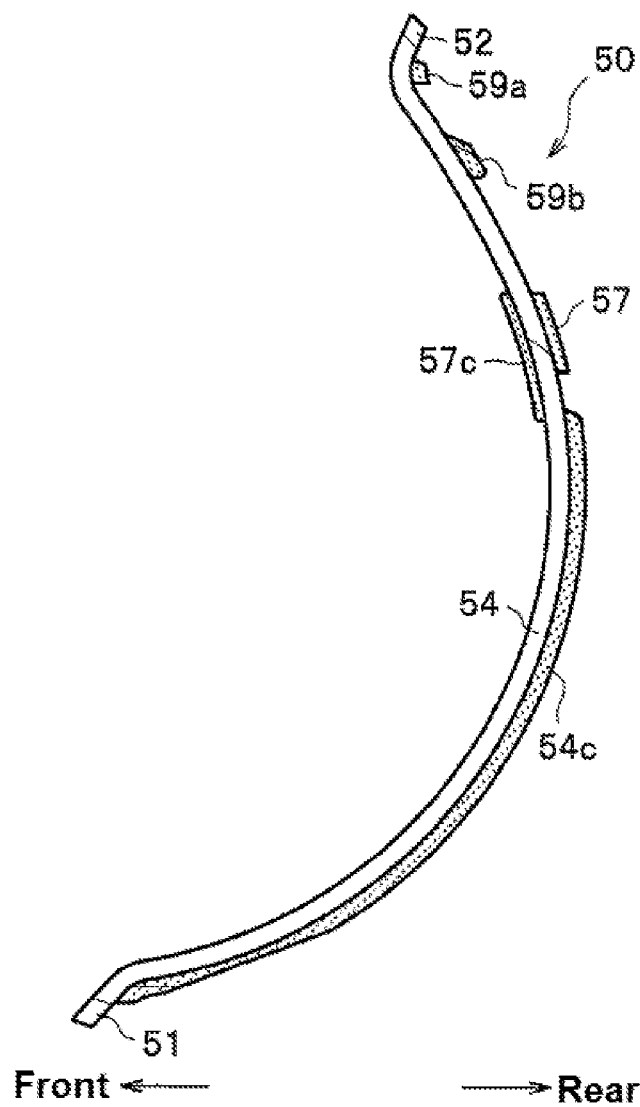
FIG. 13c is a left side view of the sealing member.

As shown in FIGS. 13a and 13b, the sealing member 50 is formed in an annular shape that corresponds to an edge rib 15a of the rear opening portion 15 (see FIG. 5b). That is, the sealing member 50 includes a lower edge portion 51, an upper edge portion 52, and a left edge portion 54 and a right edge portion 55 that connect the lower edge portion 51 and the upper edge portion 52. The front edge of the base portion 41 of the protective cover 40 abuts a rear surface of the lower edge portion 51. The front edge of the forward inclining portion 43 of the protective cover 40 abuts a rear surface of the upper edge portion 52. The front edge of the left sick portion 44 of the protective cover 40 abuts a rear surface of the left edge portion 54. The front edge of the right side portion 45 of the protective cover 40 abuts a rear surface of the right edge portion 55. The projecting portion 46 on each front edge of the protective cover 40 bites into the lower edge portion 51, the upper edge portion 52, the left edge portion 54, and the right edge portion 55 respectively.

A slit portion 53 for letting the lower boss 10d (see FIG. 5b) of the cover mounting portion 18 is formed on the upper edge side of the lower edge portion 51. An inner side surface 54c of the left edge portion 54 abuts the outer edge of the left rib of the edge rib 15a (see FIG. 5b) and is engaged therewith. An inner side surface 55c of the right edge portion S5 abuts the outer edge of the right rib of the edge rib 15a (see FIG. 5b) and is engaged therewith.

As shown in FIGS. 13a and 13b, in the upper portion of the sealing member 50, formed is an insertion portion 56 that penetrates in the front-rear direction and in which the upper boss 10c of the cover mounting section 18 (see FIG. 5b) is inserted. The insertion portion 56 are enclosed by an upper wide portion 54b that forms the upper edge portion 52 and an upper portion of the left edge portion 54, an upper wide portion 55b that forms an upper portion of the right edge portion 55, and a connecting portion 57 that connects a lower portion of the upper wide portion 54b and a lower portion of the upper wide portion 55b. Note that a concave notch portion 57d in which the rear end 71b of the guide shaft 71 is inserted is formed in the connecting portion 57.

Figure 14A:
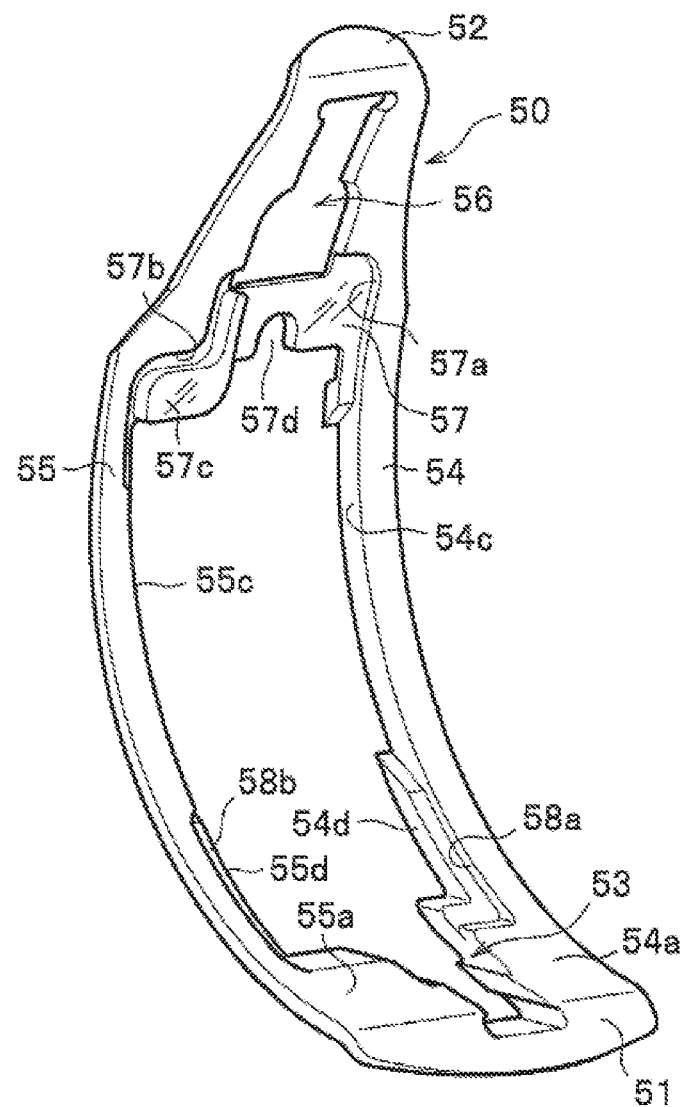
FIG. 14a is a perspective view of the sealing member as viewed from the front right side.

As shown in FIG. 14a, a front surface of the connecting portion 57 is positioned rearward from a front surface of the left edge portion 54 and a front surface of the right edge portion 55. Thus on the left and right sides of the connecting portion 57, a first restricting portion 57a and the second restricting portion 57b that are formed as stepped portions are provided.

The first restricting portion 57a abuts the outer edge of the upper-left corner of the edge rib 15a (see FIG. 5b) of the rear opening portion 15 and is engaged therewith. The first restricting portion 57a is formed continuously with the inner side surface 54c of the left edge portion 54.

The second restricting portion 57b is formed in a substantially L-shape in front view. The second restricting portion 57b abuts the outer edge of a shoulder 15b (see FIG. 5b) formed on the upper-right corner of the edge rib 15a of the rear opening portion 15 and is engaged therewith. The second restricting portion 57b is formed continuously with the inner side surface 55c of the right edge portion 55.

A third restricting portion 57c that has a substantially L-shape in front view is formed on the inner side of the second restricting portion 57b. The third restricting portion 57c abuts and is engaged with an inner edge of the shoulder 15b (see FIG. 5b) and disposed inside the rear opening portion 15. Further, the second restricting portion 57b and the third restricting portion 57c hold the shoulder 15b of the edge rib 15a therebetween.

As shown in FIG. 14a, a left projecting portion 54d that projects upward is formed in a lower wide portion 54a that forms a lower portion of the left edge portion 54. A front surface of the left projecting portion 54d is recessed rearward from the front surface of the left edge portion 54. Thus, between the left projecting portion 54d and the left edge portion S4, a fourth restricting portion 58a that has a substantially L-shape in front view and formed as a stepped portion is provided. The fourth restricting portion 58a abuts the outer edge of the lower-left corner of the edge rib 15a (see FIG. 5b) of the rear opening portion 15 and is engaged therewith.

As shown in FIG. 14a, a right projecting portion 55d that projects upward is formed in a lower wide portion 55a that forms a lower portion of the right edge portion 55, A front surface of the right projecting portion 55d is recessed rearward from the front surface of the right edge portion 55. Thus, between the right projecting portion 55d and the right edge portion 55, a fifth restricting portion 58b that has a substantially L-shape in front view and formed as a stepped portion is provided. The fifth restricting portion 58b abuts the outer edge of the lower-right corner of the edge rib 15a (see FIG. 5b) of the rear opening portion 15 and is engaged therewith.

The first restricting portion 57a, the second restricting portion 57b, the third restricting portion 57c, the fourth restricting portion 58a, and the fifth restricting portion 58b together serve as a restricting portion that prevents displacement of the sealing member 50 relative to the cover mounting portion 18.

Figure 14B:
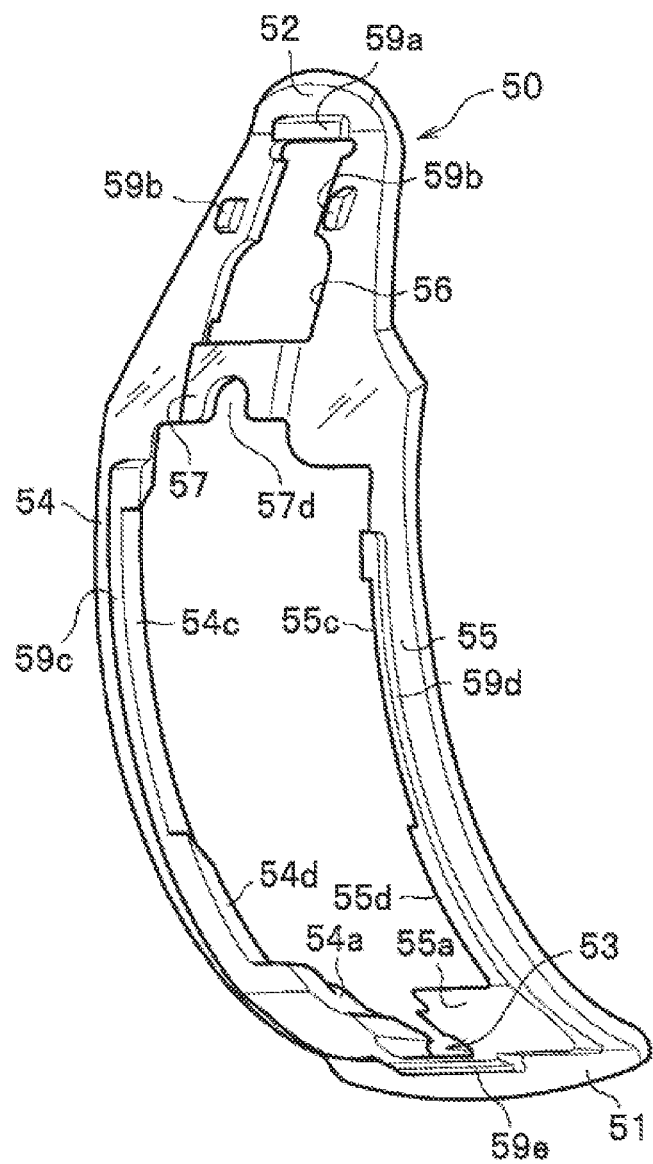
FIG. 14b is a perspective view of the sealing member as viewed from the rear right side.
Figure 14C:
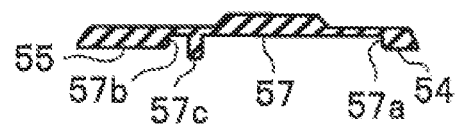
FIG. 14c is a cross-sectional view along the line XIVC-XIVC in FIG. 13a, and FIG. 14d is a cross-sectional view along the line XIVD-XIVD in FIG. 13.
Figure 14D:
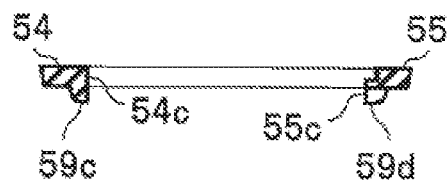

As shown in FIGS. 13b and 14b, a sixth restricting portion 59a and a seventh restricting portion 59b that project rearward are formed in an upper portion of the rear surface of the sealing member 50.

The sixth restricting portion 59a extends in the left-right direction along an upper edge of the insertion portion 56. The sixth restricting portion 59a is engaged with an upper edge of the upper recess 43a (see FIGS. 11a and 11b, and FIG. 12) of the protective cover 40. The seventh restricting portions 59b are formed on the rear surface of the upper wide portion 54b and the rear surface of the upper wide portion 55b respectively as a pair. The seventh restricting portions 59b are inserted in a pair of engagement holes 40f of the protective cover 40 (see FIG. 10a) respectively and engaged therewith.

As shown in FIG. 14b, an eighth restricting portion 59c that projects rearward is formed on the rear surface of the left edge portion 54. The eighth restricting portion 59c extends in the upper-lower direction along the inner side surface 54c of the left edge portion 54, the left projecting portion 54d, and the lower wide portion 54a.

A ninth restricting portion 59d that projects rearward is formed on the rear surface of the right edge portion 55. The ninth restricting portion 59d extends in the upper-lower direction along the inner side surface 55c of the right edge portion 55, the right projecting portion 55d, and the lower wide portion 55a.

Figure 15A:
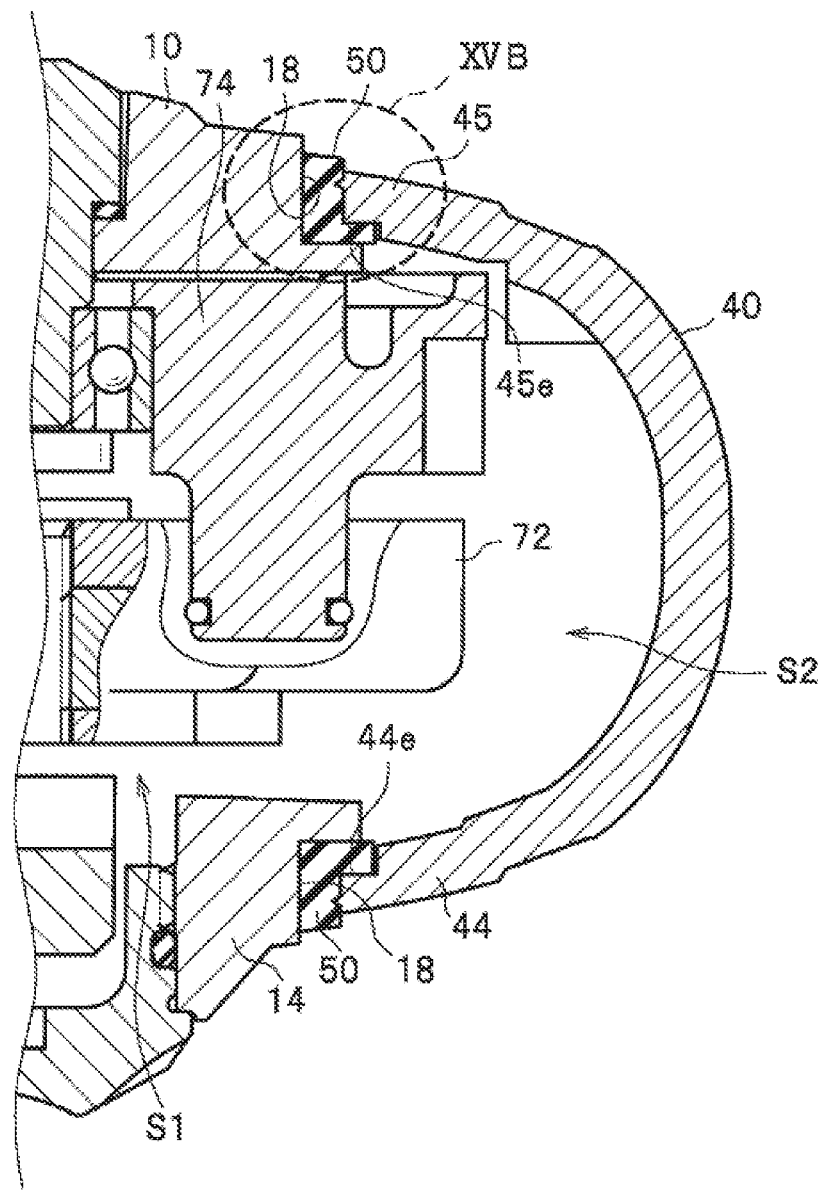
FIG. 15a is a transverse sectional view showing an assembled state of the sealing member and the protective cover that are mounted on a cover mounting portion.
Figure 15B:
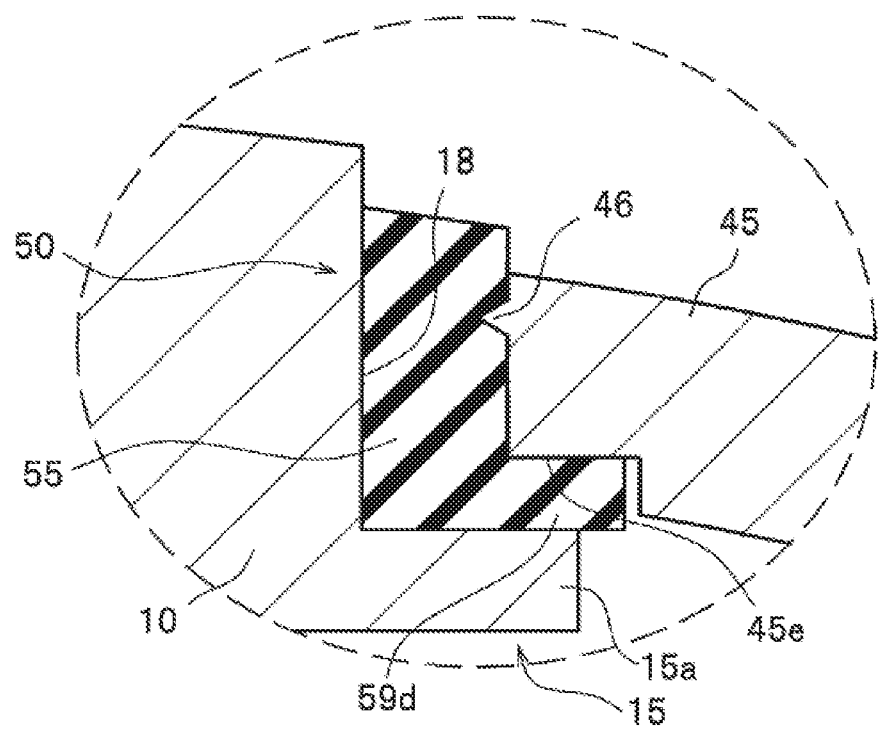
FIG. 15b is an enlarged view of the portion XVB surrounded by the broken line in FIG. 15.

The eighth restricting portion 59c is engaged with a stepped portion 44e (see FIG. 10a and FIG. 15a) formed in the left side portion 44 of the protective cover 40. The ninth restricting portion 59d is engaged with a stepped portion 45e (see FIG. 10a and FIGS. 15a and 15b) formed in the right side portion 45 of the protective cover 40.

As shown in FIG. 14b, a tenth restricting portion 59e that projects rearward is formed on the rear surface of the lower edge portion 51. The tenth restricting portion 59e extends in the left-right direction along the lower edge of the notch portion 53. The tenth restricting portion 59e is engaged with the inner edge of the front end 41c (see FIG. 6b) of the base portion 41 of the protective cover 40.

The sixth restricting portion 59a, the seventh restricting portion 59b, the eighth restricting portion 59c, the ninth restricting portion 59d, and the tenth restriction portion 59e described above serve as a restricting portion that prevents a relative displacement between the seal member 50 and the protective cover 40.

A method of mounting the sealing member 50 will now be described. When mounting the protective cover 40 on the cover mounting portion 18, the sealing member 50 according to the embodiment may be firstly attached to the cover mounting portion 18 and then the protective cover 40 may be mounted thereon. Alternatively the sealing member 50 is firstly attached to the protective cover 40 and then the sealing member 50 and the protective cover 40 together may be mounted on the cover mounting portion 18.

Once the sealing member 50 is mounted on the cover mounting portion 18, the first restricting portion 57a, the second restricting portion 57b, the fourth restricting portion 58a, and the fifth restricting portion 58b of the seal member 50 are engaged along the outer edge of the edge rib 15a of the cover mounting portion 18. Further, the third restricting portion 57c is engaged along the inner edge of the shoulder 15b of the edge rib 15a. Thus, the sealing member 50 is arranged at a predetermined position around the edge rib 15a (around the rear opening portion 15). The upper boss 10c of the cover mounting portion 18 is inserted into the insertion portion 56 of the sealing member 50, so that the upper portion of the sealing member 50 is arranged at a predetermined position around the upper boss 10c. The lower boss 10d of the cover mounting portion 18 is inserted into the notch portion 53 of the sealing member 50, so that the lower portion of the sealing member 50 is arranged at a predetermined position around the lower boss 10d.

Whereas when the protective cover 40 is attached to the sealing member 50, the sixth restricting portion 59a of the upper rear surface of the sealing member 50 is engaged with the upper edge of the upper recess 43a of the protective cover 40, the seventh restricting portion 59b is engaged with the pair of engagement holes 40f of the protective cover 40, and thereby the upper portion of the sealing member 50 and the upper portion of the sealing member 50 (the forward inclining portion 43) are arranged at a predetermined position. Further, the eighth restricting portion 59c of the sealing member 50 is engaged with the inner surface 54c of the left edge portion 54 of the protective cover 40, the ninth restriction portion 59d is engaged with the inner side surface 55c of the right edge portion 55 of the protective cover 40, and thereby the left edge portion 54 and the right edge portion 55 of the sealing member 50 and the left and right side portions 44, 45 of the protective cover 40 are arranged at predetermined positions. Moreover, the tenth restricting portion 59e of the sealing member 50 is engaged with the inner edge of the front end portion 41c of the base portion 41 of the protective cover 40. Thus, the lower portion of the sealing member 50 and the lower portion of the protective cover 40 (the base portion 41) of the seal member 50 are arranged in predetermined positions.

Then, by screwing and tightening the screws B into the upper boss 10c and the lower boss 10d of the cover mounting portion 18 through the screw holes 40a, 40b of the protective cover 40, the protective cover 40 is secured in a liquid tight manner to the cover mounting portion 18 with the sealing member 50 interposed therebetween. In this case, by tightening the screws B, the projecting portions 46 on the front edge of the protective cover 40 bite annularly into the lower edge portion 51, the upper edge portion 52, the left edge portion 54 and the right edge portion 55 of the sealing member 50 and thereby relative displacement between the sealing member 50 and the protective cover 40 is prevented (see FIG. 13b).

The invention is not limited to the above described embodiment. For example, the bridge portion 14 may be not formed in the body 10, and the side opening portion 13 and the rear opening portion 15 may be continuous with each other. The coupling between the body 10 and the lid 30 may not be performed by screwing with the female screw portion 13b and the male screw portion 33a, they may be fastened by a bolt. The shape of the cylindrical portion 21 may not be cylindrical but a rectangular shape. Even in the modification example described above, it is possible to avoid size reduction of the interlocking gear (component) 74 by disposing the rear portion of the interlocking gear 74 outside the body 10 (within the protective cover 40).

Furthermore, in the spool reciprocating device 70 described in the above embodiment, the slider 72 that is fixedly connected to the rear portion 8a of the spool shaft 8 is engaged with the eccentric protrusion 75 of the interlocking gear 74 (component) that roues in conjunction with the handle shaft 5. Thus the rotation of the handle shaft 5 is converted into reciprocation of the spool shaft 8 in the front-rear direction. However the invention is not limited this. For example, the invention can also be applied to a spool reciprocating device in which the slider 72 is engaged with a known worm shaft (component) that rotates in conjunction with the drive shaft sleeve 7 that has the pinion gear 7a. The lid portion 31 of the lid 30 has a circular shape in a side view in the embodiment, however it may be alternatively any shape as long as the side opening portion 13 can be closed by the lid portion, for example, it may be a square.

Although the gear support member 26 has a cam profile in the above embodiment, it is not limited to this. It may have various shapes such as a circular shape, an elliptical shape, a triangular shape, quadrangular shape, polygonal shape, and the like. Further, the gear support member 26 is not necessarily attached around the handle shaft 5 but it may be attached anywhere as long as it is secured to the right side portion of the body 10.

Further, the gear support member 26 of the first embodiment is attached to the outside of the body 10. However the invention is not limited thereto. For example, as shown in FIG. 16, a gear support member 61 may be mounted inside the body 10 (the reel unit 1). In this first modification example, a mounting portion 60 for mounting the gear support member 61 is provided in the inside of the body 10 (the reel unit 1). The mounting portion 60 includes a circular rib 60a that projects from an inner surface 10g of the right side portion of the body 10 along the periphery of a handle supporting portion 10e, and a screw hole 60b.

Figure 16A:
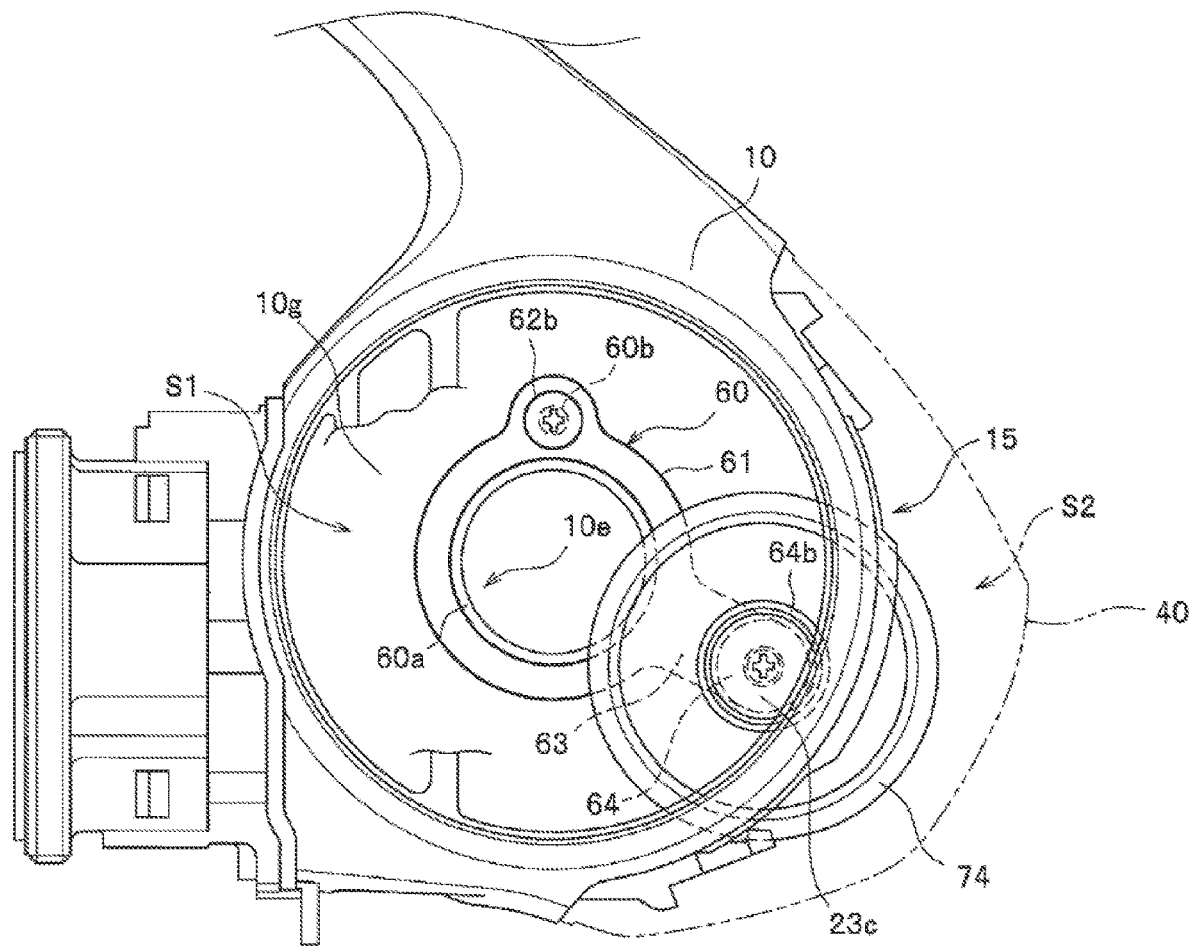
FIGS. 16a and 16b show a modification example of the gear support member.
Figure 16B:
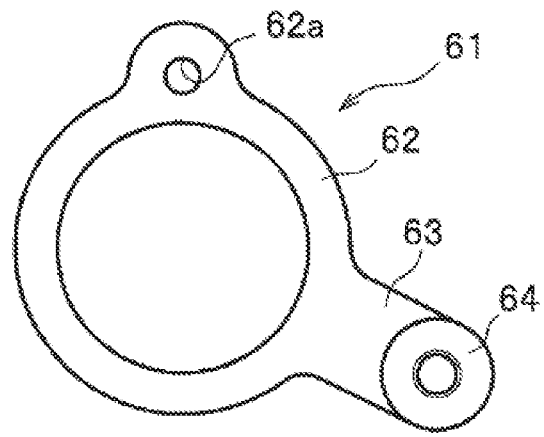

As shown in FIG. 16b, the gear support member 61 includes an annular portion 62, and an arm portion 63 that extends from the annular portion 62. As shown in FIG. 16a, the annular portion 62 is mounted around the circular rib 60a of the mounting portion 60. In the annular portion 62, a screw opening 62a that corresponds to the screw hole 60b is formed. An attaching screw 62b is inserted into the screw opening 62a and then screwed into the screw hole 60b of the mounting portion 60, and thereby the gear support member 61 is fixed.

A boss 64 that protrudes into the housing space S1 is formed in a tip end portion of the arm portion 63. The interlocking gear 74 is supported on the boss 64 through a bearing 64b. In this first modification example, by changing the specification of the gear support member 61, it is possible to change the distance between the axis of the interlocking gear 74 and the handle shaft 5 (not shown in FIG. 16). Therefore, it is possible to support the interlocking gear 74 having different outer diameters, and therefore a stroke length of the spool shaft 8 (not shown in FIG. 9) can be easily changed. Thus, same as the first embodiment, it is possible to easily change the specification of the fishing spinning reel 100 at a low cost. Further since the interlocking gear 74 and the gear support member 61 can be assembled together through the rear opening portion 15, the time taken to assemble them is shortened and therefore the productivity can be improved.

Figure 17A:
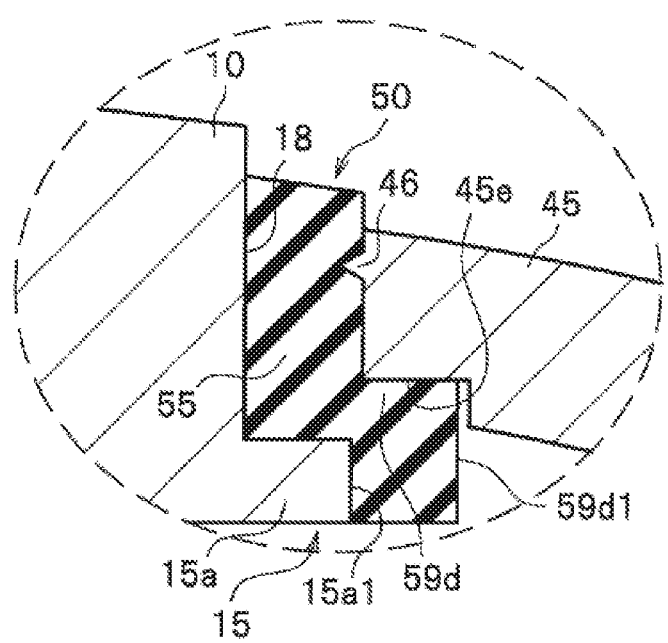
FIGS. 17a to 17c are sectional views showing a modified example of the assembled state of the sealing member and the protective cover that are mounted on the cover mounting portion.

As for the shape of the sealing member 50, it is not limited to that in the first embodiment. For example, as shown in FIG. 17a, a cross-section of the right edge portion 55 of the sealing member 50 may be formed in a crank shape, and an extended portion 59d1 that is engaged with the edge rib 15a of the rear opening portion 15 may be formed. By providing the extended portion 59d1, a rear surface 15a1 of the edge rib 15a is covered with the extended portion 59d1, which further enhances the sealing performance.

Figure 17B:
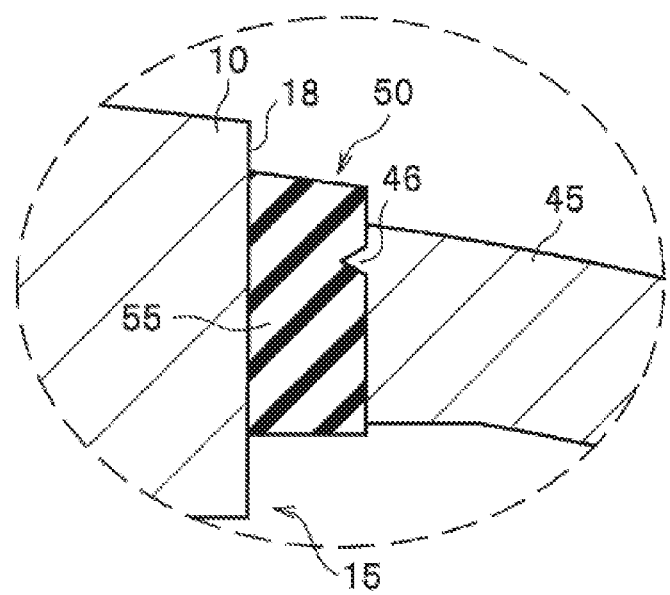

Moreover as shown in FIG. 17b, it may have a simple configuration such that the edge rib 15a may not be provided to the rear opening portion 15 and the cover mounting portion 18 may have a flat surface. In this case, the projecting portion 46 on the front edge of the protective cover 40 bites annularly into the rear surface of the sealing member 50, so that it is possible to adequately prevent relative displacement between the protective cover 40 and the sealing member 50.

Figure 17C:
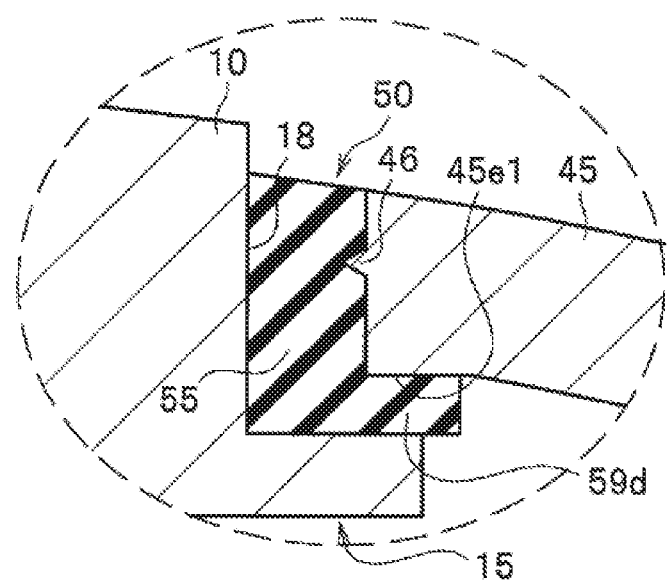

Further, as shown in FIG. 17c, the stepped portion 45e may not be provided in the right side portion 45 (the left side portion 44) of the protective cover 40 (the stepped portion 44e in the left side portion 44). Instead, the right side portion 45 (the left side portion 44) may have a flat surface 45e1 that is directly engaged with the ninth restricting portion 59*d* (the eighth restricting portion 59*c* in the left side portion 44). In this case, the relative displacement between the protective cover 40 and the sealing member 50 is also adequately prevented and the configuration of the protective cover 40 becomes simple.

Second Embodiment

Figure 18A:
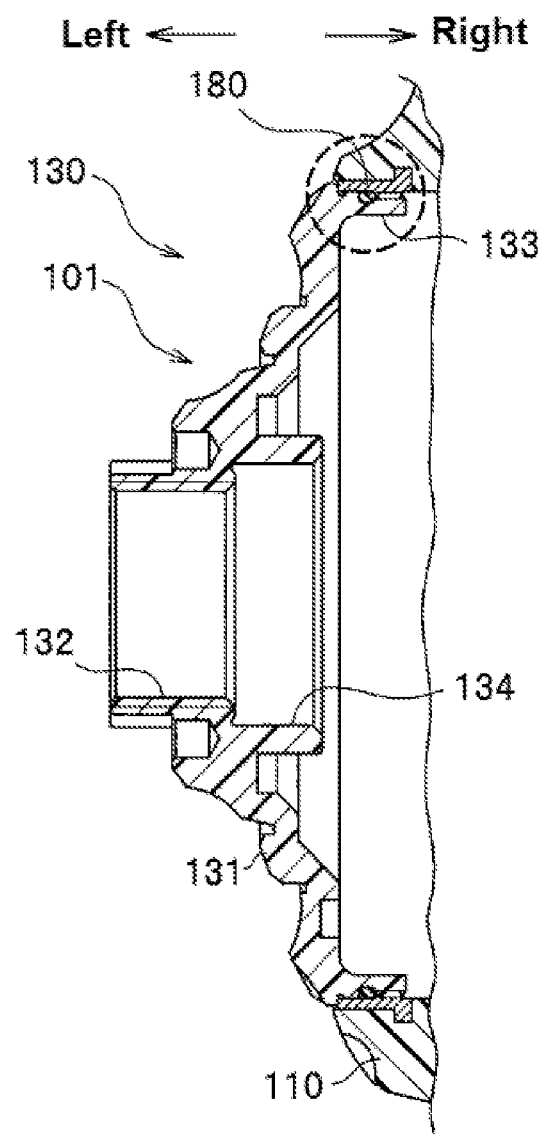
FIG. 18a is a sectional view of a side opening portion in the body and the lid according to a second embodiment.

Next, a fishing spinning reel according to the second embodiment will now be described. As described in the first embodiment, the left end portion of the cylindrical portion 21 of the body 10 forms the side opening portion 13. That is, in the first embodiment, the side opening portions 13 is formed of resin. As shown in FIG. 18*a*, in the second embodiment, an annular metal member 180 is insert-molded on the inner periphery of a side opening portion 113 of a body 110. Therefore, an inner peripheral surface 182 of the metal member 180 forms an inner peripheral surface 113*a* of the side opening portion 113.

The metal member 180, and has a cross section L-shaped. In other words, a flange 181 that projects radially outward is formed on the outer peripheral surface of the metal member 180 to prevent the metal member 180 from fall off from the body 110 and to be firmly integrated therewith. Further, a female screw portion 191 that is formed around the side opening portion 113 is provided on the right side and closer to the center on the inner peripheral surface 182 of the metal member 180.

Although not shown, the metal member 180 extends inside the bridge portion that extends from the side opening portion to the rear opening portion (see the bridge portions 14 in FIG. 5*a*). Accordingly, the strength of the bridge portion is increased compared to the one that is formed of resin only.

As shown in FIG. 18*a*, a lid 130 of the second embodiment includes a lid portion 131 for closing the side opening portion 113 of the body 110, and a cylindrical cylinder portion 133 that projects from the inner surface (the right surface) of the lid portion 131 toward the right and is inserted in the interior of the metal member 180 (the side opening portion 113).

The lid 131 has a circular shape when viewed from the side, and the shape corresponds to the shape of the side opening portion 113. Similar to the first embodiment, a cylindrical portion 132 through which the handle shaft (see the handle shaft 5 in FIG. 4) passes is formed at the center portion of the lid portion 131.

Figure 18B:
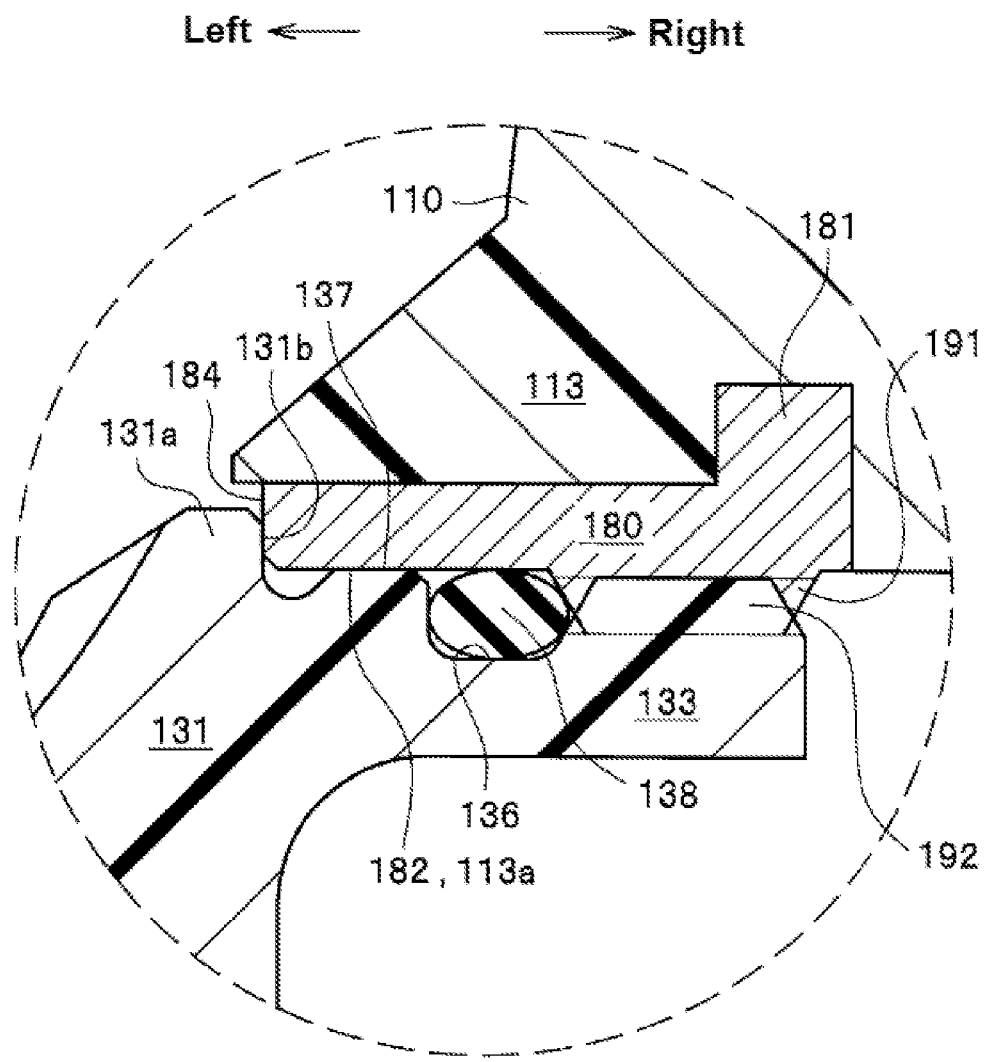

As shown in FIG. 18*b*, the outer diameter of the lid portion 131 is larger than the outer diameter of the cylindrical portion 133 and the outer peripheral portion 131*a* of the lid 131 protrudes radially outward from the cylindrical portion 133. Further, the bottom surface (right surface) 131*b* of the outer peripheral portion 131*a* abuts an end surface 184 of the metal member 180 to seal the gap between the lid 130 and the side opening portion 113. In the second embodiment, the end surface 184 of the metal member 180 is the place where the bottom surface 131*b* of the outer peripheral portion 131*a* abuts. That is, the bottom surface 131*b* of the outer peripheral portion 131*a* is in contact with the end surface 184 that has a higher flatness than the end surface formed of resin. Therefore, a gap is hardly formed between the lid 130 and the side opening portion 113 (the metal member 180), and therefore a high waterproof property is imparted.

A male screw 192, a housing recess 136, and an abutting surface 137 are formed on the outer peripheral surface of the cylindrical portion 133 in the stated order from the tip end side (the right end side) to the butt end side (the left end side).

The male screw 192 is a threaded portion formed around the side opening portion 113 in a side view and screwed into the female screw portion 191 of the metal member 180. In this way, the lid 130 is fastened and fixed to the body 110. As described above, the reel unit 101 has a monocoque body in which the lid 130 and the body 110 is integrated as the lid 130 that supports the handle shaft is screwed into the body 110.

Moreover, since the material used for the female screw portion 191 is a metal, threads and thread grooves can be formed with a higher accuracy and a higher resistance against abrasion compared to the ones made of resin. Consequently, it is possible to facilitate the work of threadably mounting the lid 130 on the side opening portion 113. Moreover, a high mounting strength of the lid 130 can be obtained since the male screw portion 192 screwed in the female screw portion 191 will be hardly loosened. Further, since the metal member 180 is integrated into the side opening portion 113 of the resin body 110 by insert molding, the strength of the inexpensive lightweight body 110 made of resin can be increased and its stiffness is significantly enhanced. Moreover, since the metal member 180 is inserted in the side opening portion 113 of the body 110, shrinkage (deformation) during the resin molding can be restrained, resulting in a high precision.

The abutting surface (abutting portion) 137 abuts the inner peripheral surface 182 of the metal member 180 for adjusting the center of the lid 130 relative to the side opening portion 113 at the time of threadably mounting the lid 130 on the metal member 180 (the side opening portion 113). In this manner, the center of the right center hole (see the right center hole 23 in FIG. 5*a*) of the body 110 for supporting the right side of the handle shaft 5 corresponds to the center of the handle shaft supporting portion 134 of the lid 130 for supporting the left side of the handle shaft 5, and consequently the concentricity is achieved. Moreover, since the material used for the inner peripheral surface 182 is a metal, the roundness of the inner peripheral surface 182 is higher than the one made of resin and a very high concentricity can be achieved. Thus, the handle shaft is supported such that it extends in the right-left direction with respect to the reel unit 101, and the rotation of the handle shaft becomes smooth.

The housing recess 136 is a recess formed between the male screw 192 and the abutting surface 137, and an O-ring 138 is fitted as a sealing material on the outer periphery of the housing recess 136. Therefore, the gap between the inner peripheral surface 182 of the metal member 180 and the cylindrical portion 133 is sealed so as to reliably prevent water from penetrating thereinside.

As described above, according to the second embodiment, the mounting strength of the lid 130 is increased. Moreover, due to the integration of the cover 130 by screwing and the insert molding of the metal member 180 in the side opening portion 113, it is possible to increase the strength and rigidity of the body 110 made of resin. Consequently, rotation of the handle shaft is stabilized by improving meshing precision, and it is possible to perform a fine and smooth winding operation of the handle. Further, since the reel unit 101 is made of resin except for a portion (the metal member 180) of the side opening portion 113, it can be made inexpensive and lightweight.

Figure 19A:
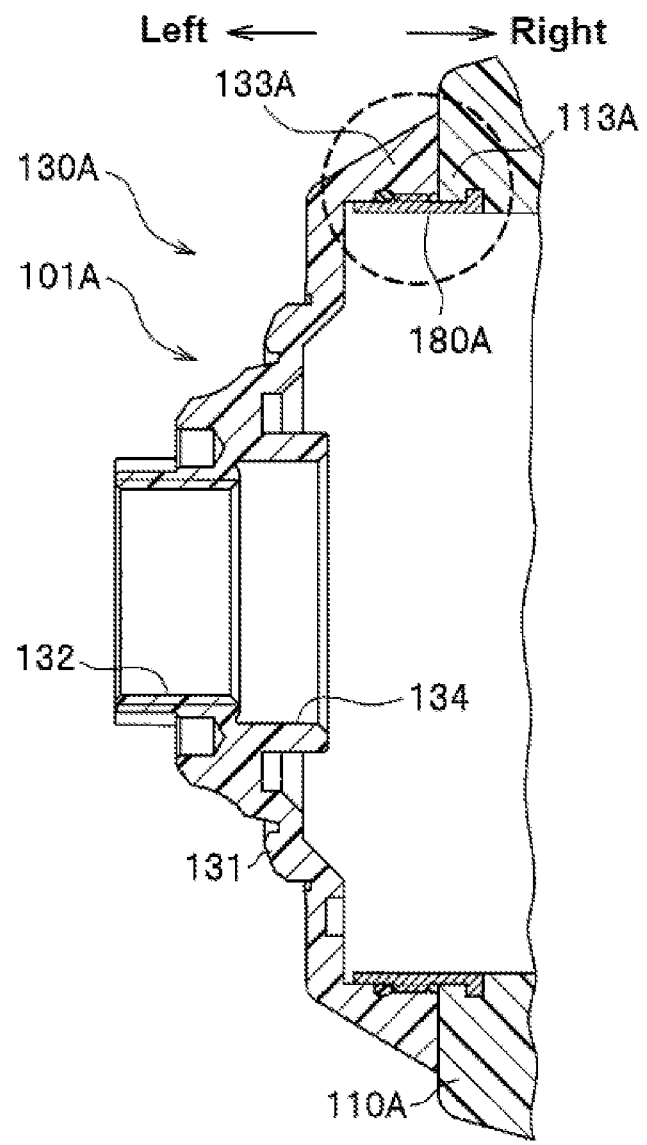
FIG. 19a is a sectional view of the side opening portion in the body and the lid according to a first modification example of the second embodiment.
Figure 19B:
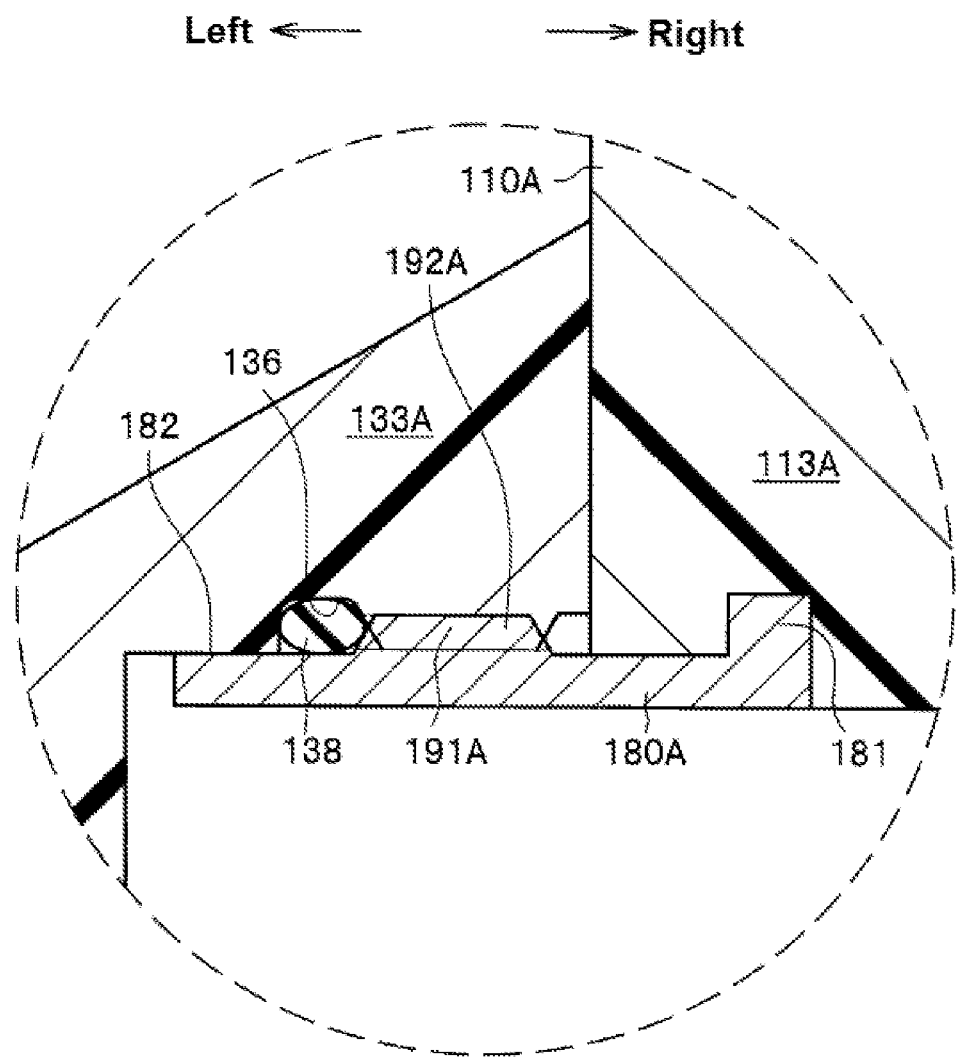

Next, a first modification of the second embodiment will now be described. As shown in FIG. 19, in a reel unit 101A of the first modification example, a metal member 180A is provided such that it protrudes leftward from a left side surface of a side opening portion 113A of a body 110A, and a male screw 192A may be formed on an outer peripheral surface of the metal member 180A. In this example, a lid 130A has a cylindrical portion 133A of which inner diameter is larger than the outer diameter of the metal member 180A and it is necessary to form a female screw portion 191A on the inner peripheral surface of the cylindrical portion 133A.

Figure 20A:
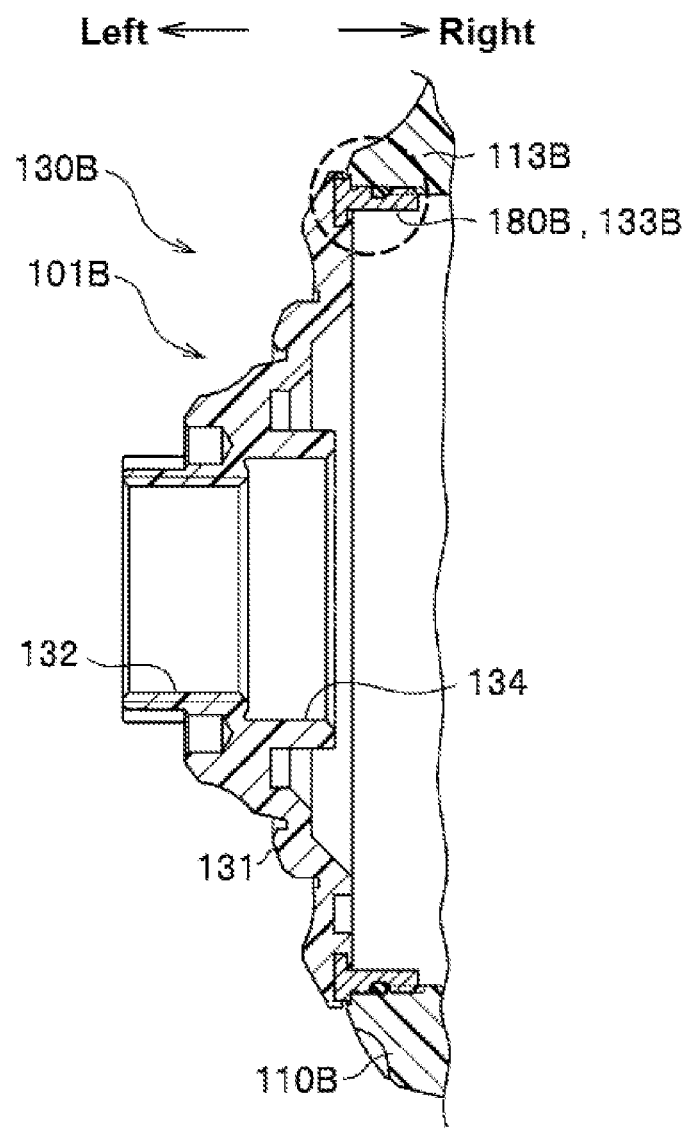
FIG. 20a is a sectional view of the side opening portion in the body and the lid according to a second modification example of the second embodiment.
Figure 20B:
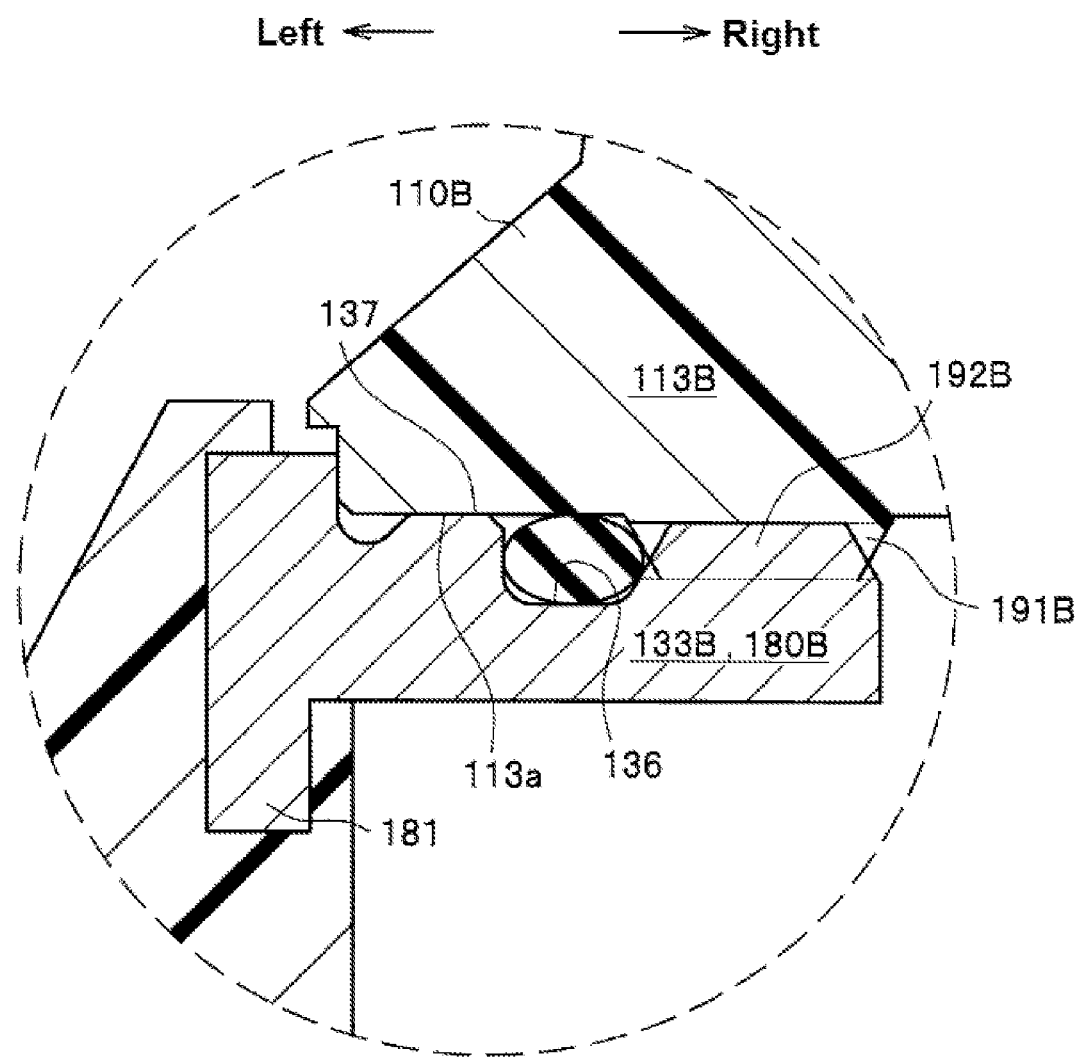

Next, second and third modification examples in which the metal member is provided in the lid instead of the body will be described. As shown in FIG. 20, a metal member 180B is provided in a lid 130B of the second modified example. Also, the entire metal member 180B serves as a cylindrical portion 133B, and the outer peripheral surface of the metal member 180B is exposed. A male screw portion 192B is formed on the outer peripheral surface of the metal member 180B. In the reel unit 101B in this case, a female screw portion 191B (a screw portion made of resin) formed on the inner peripheral surface of the side opening portion 113B of the body 110B.

Figure 21A:
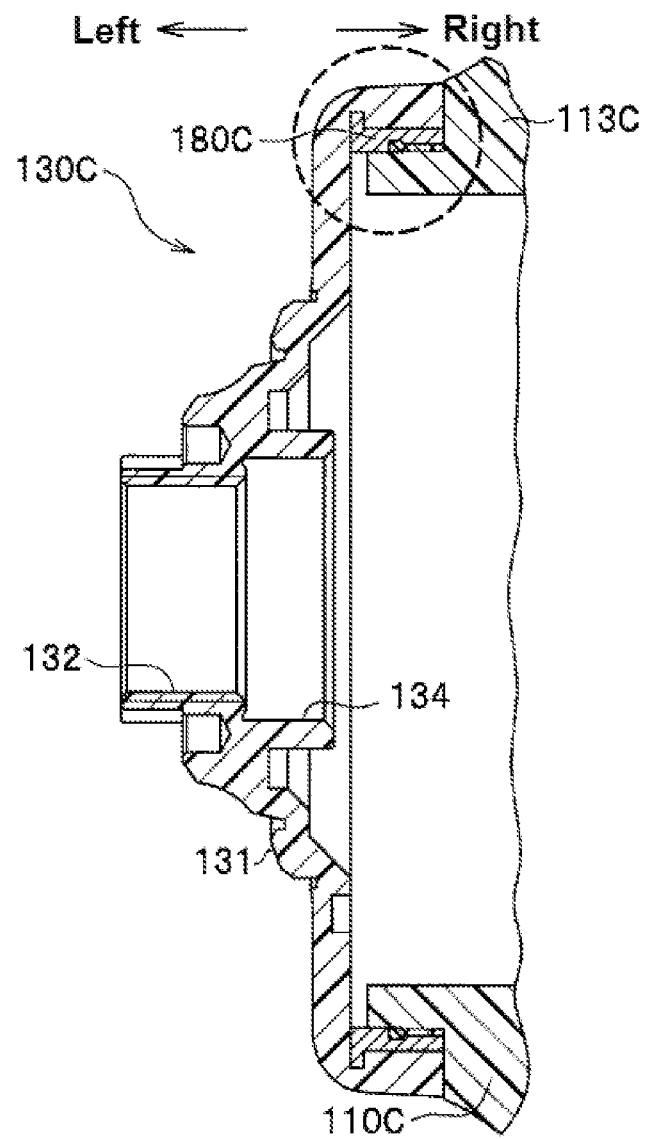
FIG. 21a is a sectional view of the side opening portion in the body and the lid according to a third modification example of the second embodiment.
Figure 21B:
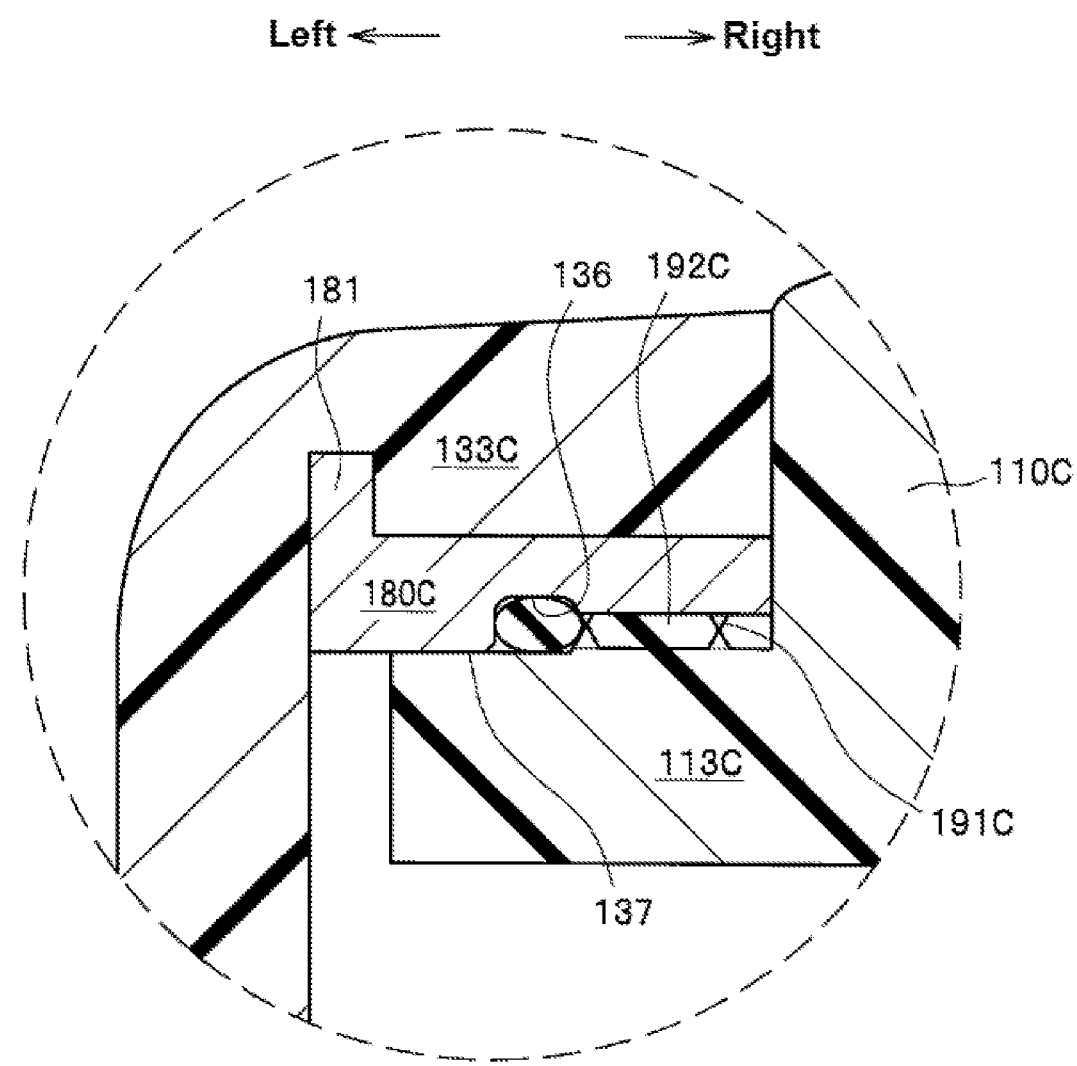

As shown in FIG. 21, a metal member 180C is provided in a lid 130C of the third modification example, and the metal member 180C forms a part of a cylindrical portion 133C. The inner peripheral surface of the metal member 180C is exposed and a female screw portion 191C is formed on the inner peripheral surface. As for the reel unit 101C, a male screw portion 192C is formed on the outer peripheral surface of a side opening portion 113C of a body 110C.

Although not shown in the drawing, both the body and the lid may be provided with the metal member. In this case, the mounting strength of the lid can be further increased and it is possible to operate the handle more smoothly. Furthermore, the entire lid may be formed of a metal and it may be threadably coupled and form a singular body with the metal member that is insert molded in the side opening portion of the resin body.

As for a portion where the seal member is to be provided, for example, the seal member may be provided between the end surface 184 of the metal member 180 (the side opening portion 113) and the bottom surface 131b (see FIG. 18b) of the outer peripheral portion 131a of the lid 130.

Figure 22:
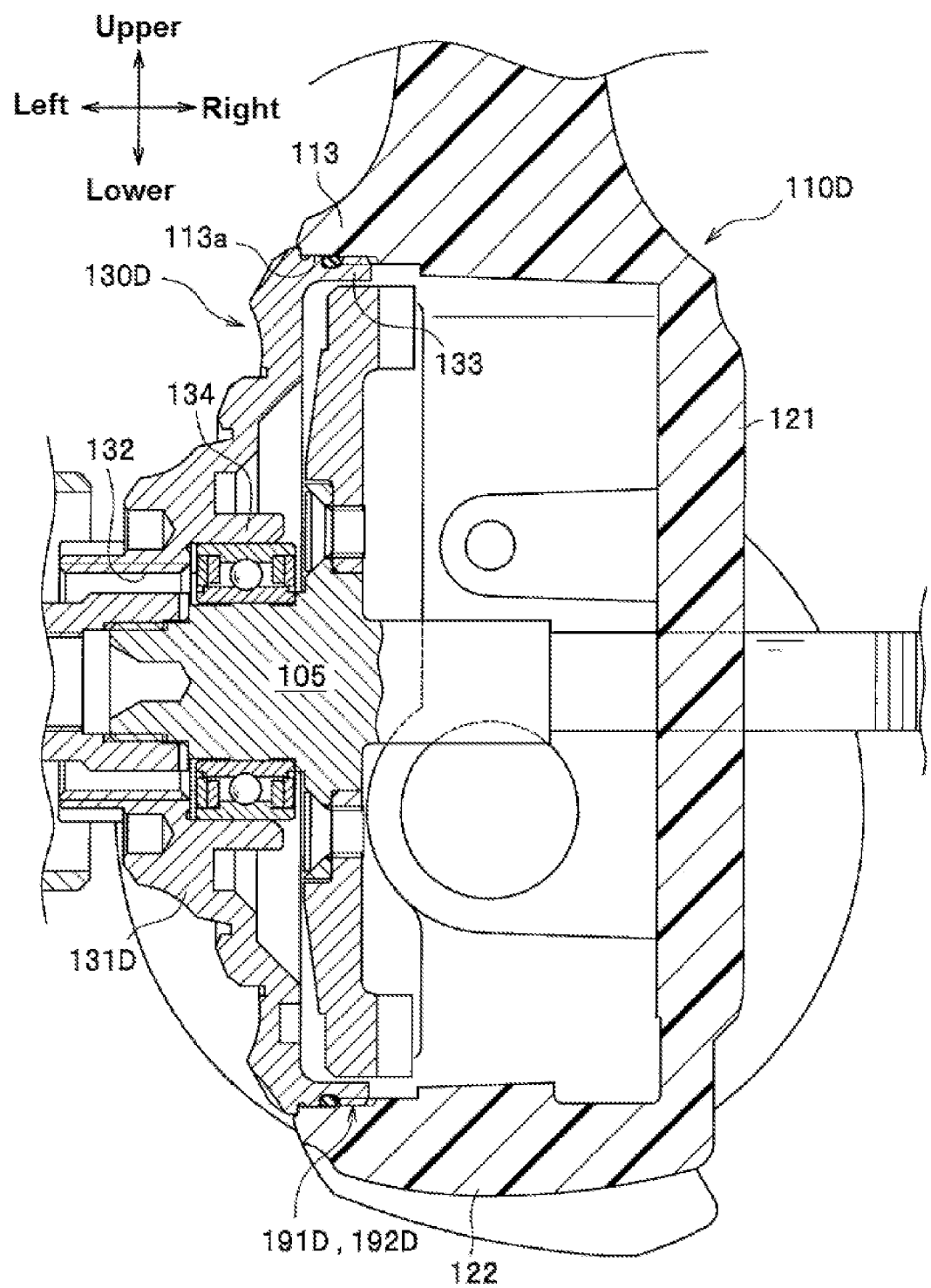
FIG. 22 is a rear cross-sectional view of the reel unit according to a fourth modification example of the second embodiment.

Further, as shown in FIG. 22, a pair of thread portions (a male screw portion 191D, a female thread portion 192D) that mate with each other may be respectively formed in the resin body 110D and the metal lid 130D, and thereby the lid 130D may threadably fixed to the body 110D. Even in such a modification example, the weight is lighter than the case where the entire body 110D is formed of metal. Moreover, since the lid portion 131D of the lid 130D is formed of a metal material, the lid is hardly deformed by the load imposed thereon at the time of operating the handle 5a and therefore the supporting precision of the handle shaft supported by the lid 130D can be improved.

Third Embodiment

Figure 23:
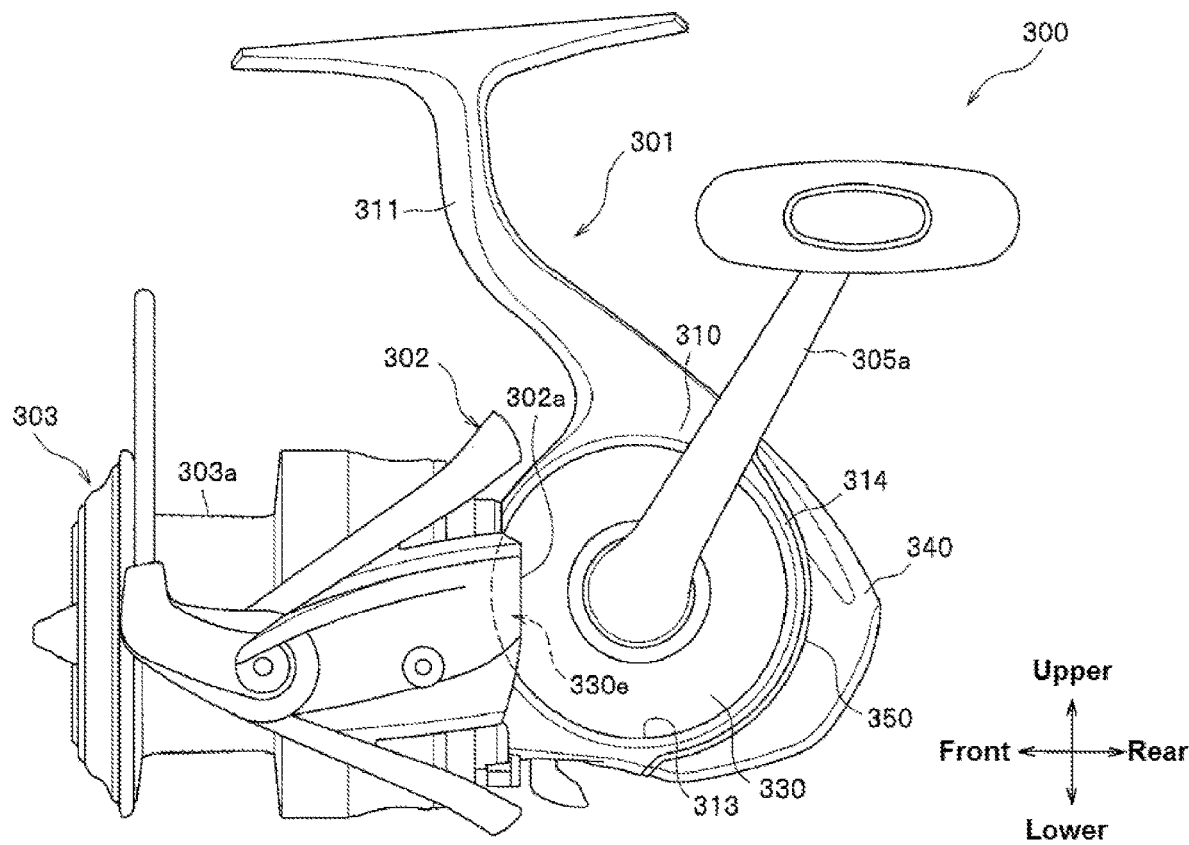
FIG. 23 is a side view of the fishing spinning reel according to a third embodiment of the invention to show its entire configuration.

Next, a third modification of the second embodiment will now be described. As shown in FIG. 23, a fishing spinning reel 300 includes a reel unit 301, a rotor 302 rotatably disposed in front of the reel unit 301, and a spool 303 provided so as to be movable in the front-rear direction in synchronization with the rotation of the rotor 302.

Figure 24:
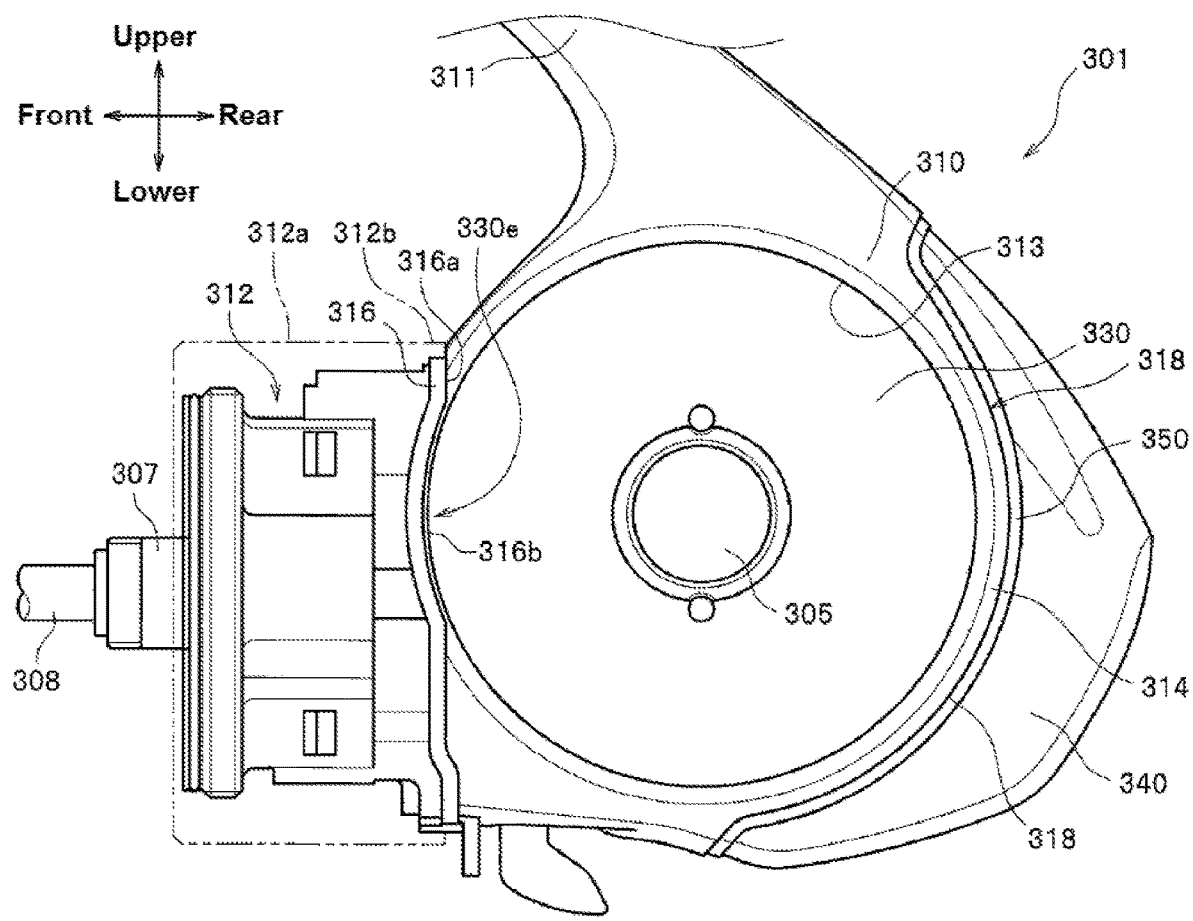
FIG. 24 is a side view of the reel unit.

As shown in FIG. 24, the reel unit 301 includes a body 310 whose shape is a substantially circle as viewed from the side, and a lid 330 for closing a side opening portion 313 formed in the left side portion of the body 310. The side opening portion 313 and the lid 330 are formed in circular shapes as viewed from the side. A leg portion 311 (see FIG. 23) that is to be attached to a fishing rod (not shown) integrally formed on top of the body 310. A cylindrical body front portion 312 is provided in a front portion of the body 310. A protective cover 340 is mounted in a rear portion of the body 310 with a sealing member 350 interposed therebetween.

Figure 25:
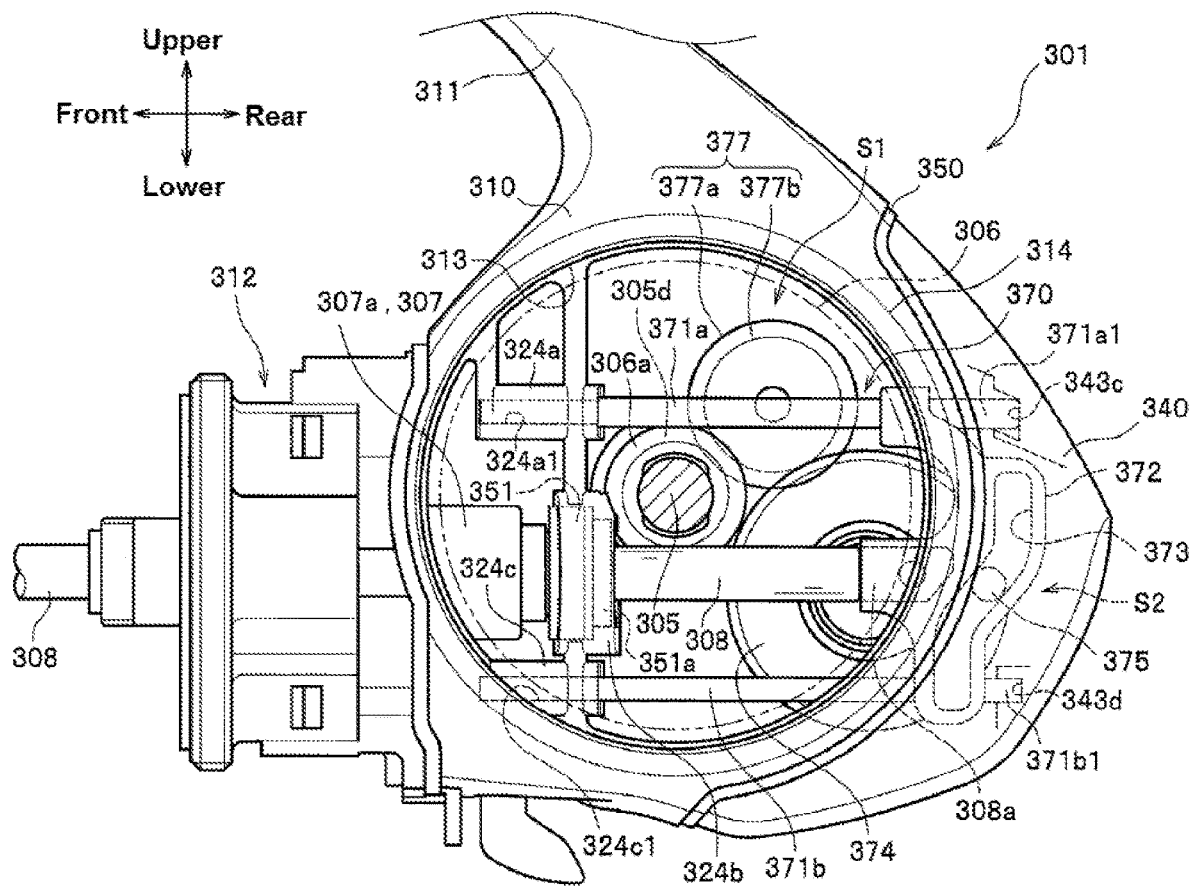
FIG. 25 is a side view of the reel unit from which the lid and the protective cover are removed.

As shown in FIG. 25, in the body 310, formed is the housing space S1 that is enclosed by a bottomed substantially cylindrical wall (an inner peripheral surface 322a of a cylindrical portion 322 which will be described later) and has the side opening portion 313 as an opening. A rear portion of a drive shaft sleeve 307, a rear portion of a spool shaft 308 where is inserted into the drive shaft sleeve 307, and a spool reciprocating device 370 are disposed in the housing space St. The drive shaft sleeve 307 and the spool shaft 308 project from the body front portion 312 toward the front. The spool shaft 308 is disposed below the handle shaft 305. A pinion gear 307a is formed at a rear of the drive shaft sleeve 307. A rear portion of the spool shaft 308 extends rearward from the rear end of the pinion gear 307a (the drive shaft sleeve 307).

The spool reciprocating device 370 is an oscillating-gear type. The spool reciprocating device 370 includes a pair of guide shafts 371a, 371b that extend in the front-rear direction, a slider 372 that moves along the guide shafts 371a, 371b and in which a guide groove 373 is formed on its right side, and an interlocking gear (a component) 74 provided with an eccentric projection 375 that engages with the guide groove 373. At the rear end of the spool shaft 308, a connecting portion 308a that protrudes rearward and is connected with the slider 372 is provided so that the spool shaft 308 and the slider 372 are integrated together.

Figure 27:
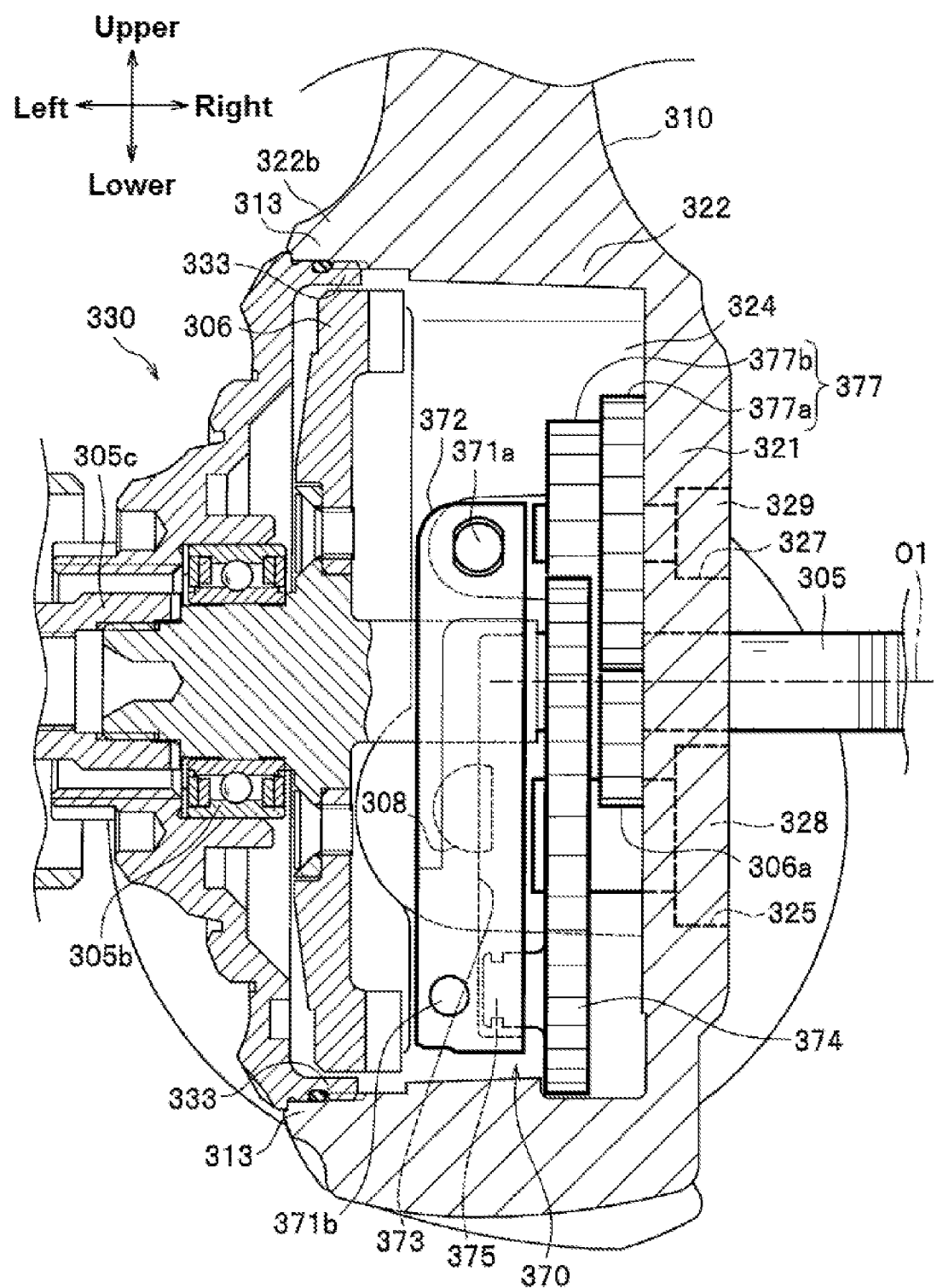
FIG. 27 is a rear cross-sectional view showing layout of the members inside the body.

As shown in FIG. 27, a handle shaft 305 that extends in the right-left direction is provided in the body 310. The handle shaft 305 is rotatably supported by the lid 330 and the body 310 through left and right bearings (only a left bearing 305b is shown in FIG. 27, as for a right bearing 305d, see FIG. 25). A handle 305a (see FIG. 23) is coupled to a left end of the handle shaft 305 through a connecting shaft. 305c. A drive gear 306 is fixed on the left side of the handle shaft 305 and a gear 306a is fixed on the right side of the handle shaft 305.

As shown in FIG. 25, a front side of the drive gear 306 meshes with the pinion gear 307a. A rear side of the gear 306a meshes with a reduction gear 377 that is a reduction gear mechanism. The reduction gear 377 is disposed above and in the rear of the handle shaft 305 and it meshes with an interlocking gear 374. In other words, the reduction gear 377 is interposed between the interlocking gear 374 and the gear 306a.

As shown in FIG. 27, the reduction gear 377 is rotated about a boss 329 that is disposed in parallel with the handle shaft 305. The boss 329 is cantilever-supported by a right wall portion 321. The reduction gear 377 is a stepped gear including a large diameter gear 377a that meshes with the gear 306a, and a small diameter gear 377b that has a smaller number of teeth than the large-diameter gear 377a and meshes with the interlocking gear 374. The large diameter gear 377a is a spur gear with a diameter larger than the gear 306a. On the other hand, the small diameter gear 377b is a spur gear with a diameter smaller than interlocking gear 74, and the number of teeth is smaller than that of the interlocking gear 374. Therefore, when the handle 305a is rotatably operated, the rotation of the handle shaft 305 is reduced by the reduction gear 377 and then transmitted to the interlocking gear 374. In this way, the displace amount of the spool reciprocating device 370 in the front-rear direction per rotation of the handle 305a becomes smaller than the case where the reduction gear 377 is not provided.

A driving force generated by a winding operation of the handle 305a is transmitted to the drive shaft sleeve 307 through the handle shaft 305a, the drive gear 306, and the pinion gear 307a. Thus, the rotor 302 is rotated in conjunction with the drive shaft sleeve 307. Further, the spool shaft 308 is moved in the front-rear direction by the spool reciprocating device 370, and a fishing line is evenly wound around a winding body 303a of the spool 303 (see FIG. 23) through a fishing line guide portion (not shown) of the rotor 302.

Figure 26A:
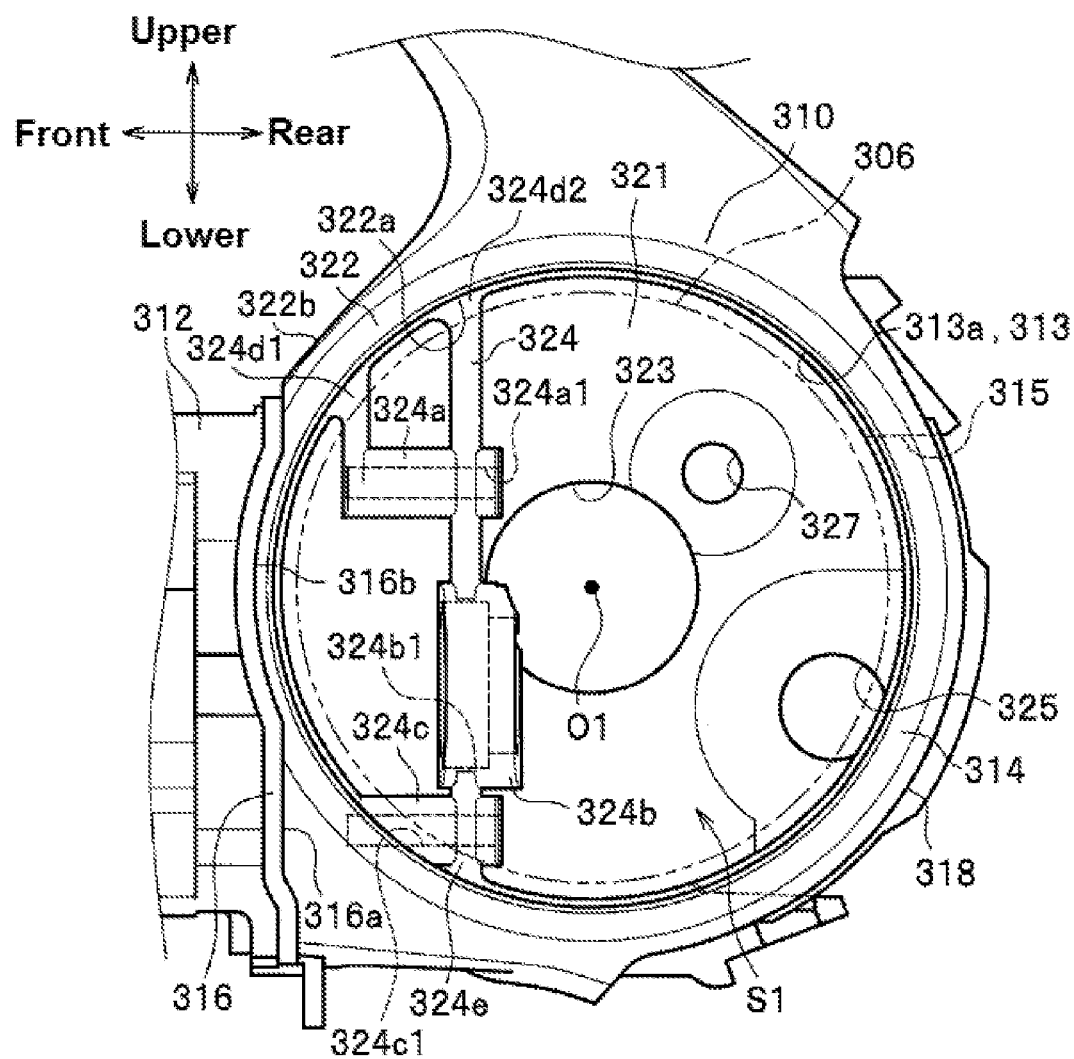
FIG. 26a is a side view showing the internal structure inside the side opening portion.

The structure of each portion will now be described in detail. As shown in FIG. 26a, the body 310 has a bottomed-box shape (cylindrical shape) that includes a peripheral wall at the bottom portion and opens toward the left side. The body 310 includes a circular disk shaped right wall portion 321, a cylindrical portion 322 that extends toward the left from the peripheral edge of the right wall portion 321. The left end portion of the cylindrical portion 322 forms the side opening portion 313.

A right side center hole 323, a support rib 324, an insertion hole 325, and an insertion hole 327 are formed in an inner surface (a left side surface) of the right wall portion 321. The right center hole 323 is a hole through which the right end portion of the handle shaft 305 passes, supports the right side of the handle shaft 305, and is provided at the center portion of the right wall portion 321. The right bearing 305d (see FIG. 25) is disposed in the right center hole 323 as a handle shaft bearing that rotatably supports the handle shaft 305. The right bearing 305d is mounted from the right side of the body 310 in the right center hole 323.

As shown in FIG. 26a, the support rib 324 is integrally formed with the right wall portion 321 and protrudes therefrom, and disposed in the housing space S1. The support rib 324 is situated in front of the right center hole 323 and extends in the upper-lower direction. Upper end portions 324d1, 324d2 and lower end portion 324e of the support rib 324 are coupled to the inner peripheral surface 322a of the cylindrical portion 322. In other words, the support rib 324 is also provided integrally with the cylindrical portion 322. The support rib 324 enhances the strength of the right wall portion 321 and the cylindrical portion 322. In the support rib 324, a cylindrical upper support portion 324a, a lower support portion 324b, and a lower end support portion 324c are formed. As shown in FIG. 25, a guide shaft supporting hole 324a1 for supporting the front end portion of the guide shaft 371a is formed in the upper support portion 324a.

A bearing support hole 324b1 for supporting a rear bearing (ball bearing) 351 (see FIG. 25) via a collar 351a is formed in the lower support portion 324b. Therefore, the rear side of the pinion gear 307a (the rear of the drive shaft sleeve 307) is supported by the body 310 via the rear bearing 351 and the support rib 324. A rear portion of the spool shaft 308 penetrates to the rear side of the lower support portion 324b through the collar 351a.

The spool shaft 308 does not contact with the inner periphery of the pinion gear 307a with a small gap interposed therebetween. However the spool shaft 308 is supported slidably in the front-rear direction by a support portion (not shown) formed in the inner periphery of the pinion gear 307a on the front side and by the collar 351 that is supported by the lower support portion 324b of the body 310.

A guide shaft supporting hole 324a1 for supporting the front end portion of the guide shaft 371b (see FIG. 25) is formed in the lower support portion 324c.

The upper support portion 324a, the lower support portion 324b, and the lower end support portion 324c are situated within the side opening portion 313. As shown in FIG. 25, the lower support portion 324b is disposed so as to overlap at least a portion of the right bearing 305d as viewed from the axial direction of the handle shaft 305. In this way, it is possible to reduce the inner space of the body 310 (the side opening portion 313). The rear bearing 351 may be disposed so as to overlap at least a portion of the right bearing 305d as viewed from the axial direction of the handle shaft 305.

As shown in FIG. 26a, the insertion hole 325 is formed on the rear side and below the right center hole 323. The insertion hole 327 is formed on the rear side and above the right center hole 323. As shown in FIG. 27, a boss 328 that rotatably supports the interlocking gear 374 passes through the insertion hole 325. Thus, the interlocking gear 374 is arranged rotatably in the rear portion of the body 310. A boss 329 (see FIG. 27) that rotatably supports the reduction gear 377 passes through the insertion hole 327. Thus, the reduction gear 377 is arranged rotatably in the rear portion of the body 310.

As shown in FIG. 26a, the cylindrical portion 322 has a substantially cylindrical shape originating at the center O1 of the right center hole 323 where the right bearing 305d that supports the handle shaft 305 is fitted therein. More particularly, an inner peripheral surface 322a of the cylindrical portion 322 is formed in a circular shape centering on the center O1 of the right center hole 323, and corresponds to the size of the drive gear 306. In other words, the inner peripheral surface 322a is a surface concentric with the outer peripheral surface of the handle shaft 305.

The outer peripheral surface 322b of the cylindrical portion 322 is formed in a substantially circular shape about the center O1 of the right center hole 323, and the thickness (radial thickness) of the cylindrical portion 322 is substantially uniform in the circumferential direction. Therefore the cylindrical portion 322 is downsized compared to a conventional cylindrical portion (the cylindrical portion having a rectangular cylindrical shape as viewed from the side), and there is no unnecessary space between the inner peripheral surface 322a of the cylindrical portion 322 and the drive gear 306.

As shown in FIGS. 25 and 26a, the inner peripheral surface 313a of the left end portion of the cylindrical portion 322 (the side opening portion 313) is formed such that it has a substantially same diameter as the inner peripheral surface 322a of the cylindrical portion 322, so that even in the case of a relatively large drive gear 306, it can be easily mounted within the cylindrical portion 322. The inner diameter of the side opening portion 313 (the inner peripheral surface 313a) is larger than the outer diameter of the drive gear 306 (shown by a two-dot chain line in the drawing). In other words, the drive gear 306 is formed such that it has a diameter as large as the inner diameter of the side opening portion 313.

Figure 28A:
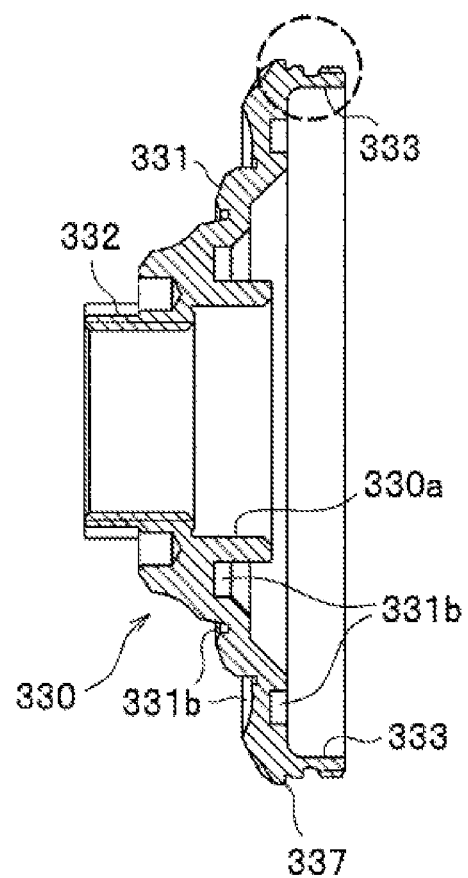
FIG. 28a is a transverse sectional view of the lid.
Figure 28B:
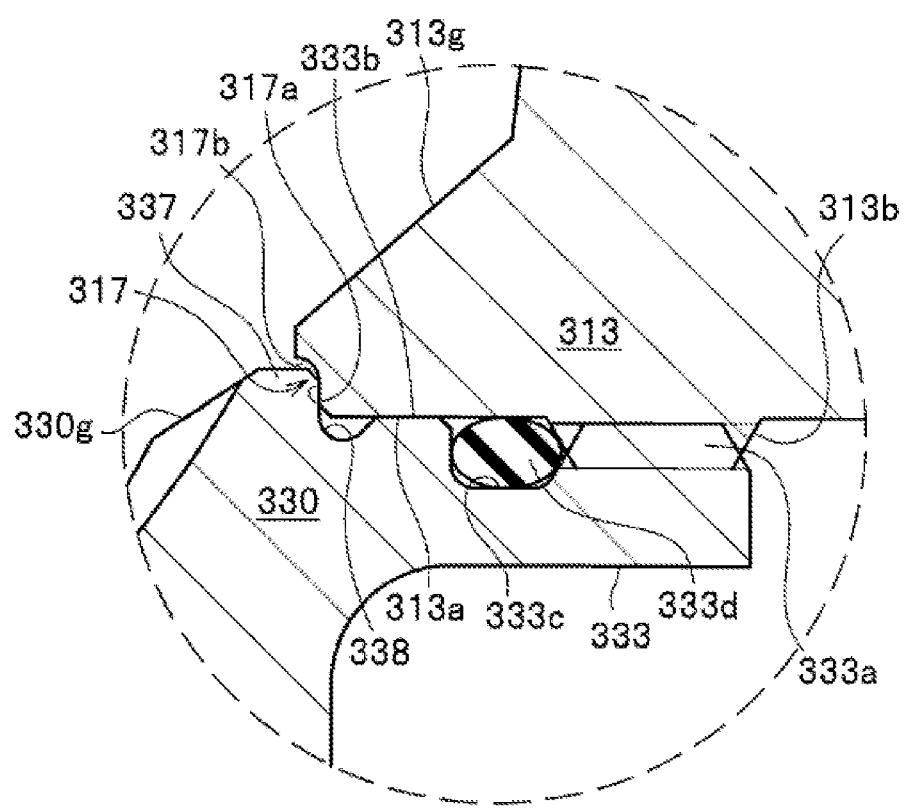
FIG. 28b is an enlarged sectional view showing the engagement state between the side opening portion in the body and a peripheral edge of the lid.

As shown in FIG. 28b, a female screw 313b is formed on the inner side of the inner peripheral surface 313a of the side opening portion 313. On the opening peripheral edge of the side opening portion 313, a fitting receiving portion 317 that has a concave shape in cross section is formed over the circumferential direction. The fitting receiving portion 317 includes a bottom surface 137a, and a rising portion 317b that rises from the bottom surface 317a and has a curved surface shape in cross section.

Figure 26B:
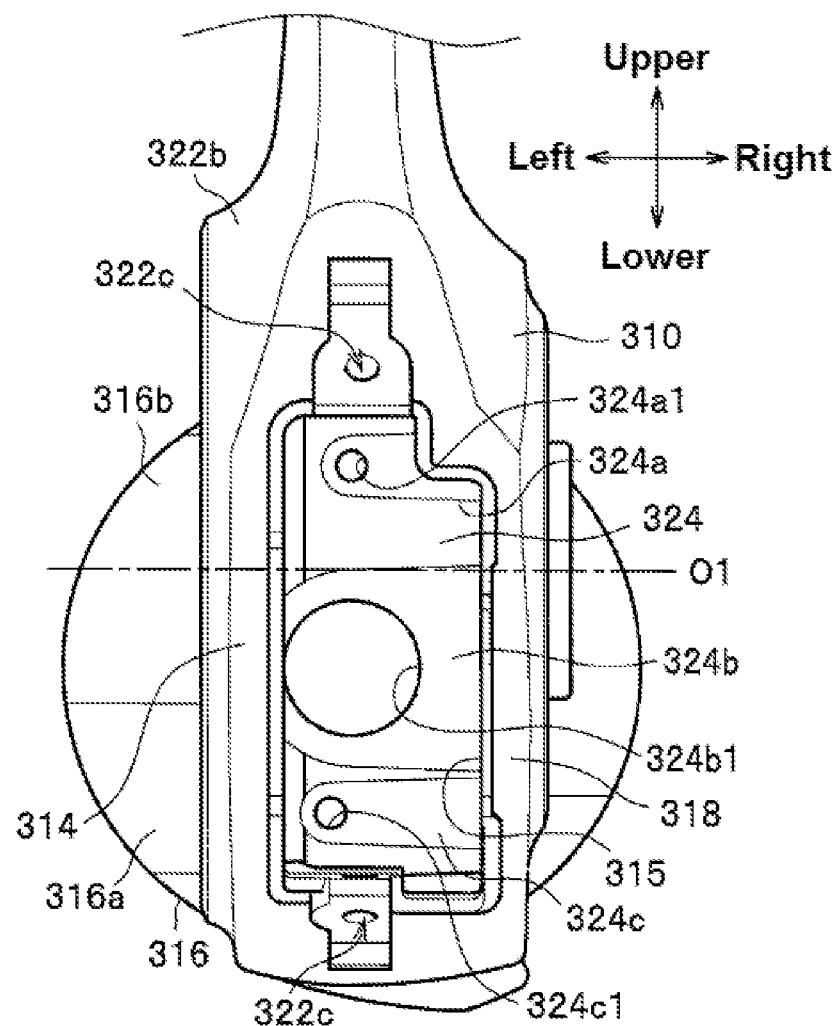
FIG. 26b is a rear view of the body from which the protective cover is removed.

As shown in FIG. 26b, in the rear portion of the cylindrical portion 322, two female screw holes 322c for the protective cover (see FIG. 29a) that are formed in the outer peripheral surface 322b of the cylindrical portion 322, and a rear opening portion 315 that extends through the rear portion of the cylindrical portion 322 are formed.

As shown in FIGS. 26a, 26b, the rear opening portion 315 penetrates the rear portion of the cylindrical portion 322 and communicates with the housing space S1 and a rear space. The rear opening portion 315 is an opening for receiving a part of the component that is assembled in the body 310 and allowing a part of the component to be protrude from (outside) the body 310 toward the rear. The rear opening portion 315 penetrates only the central portion of the cylindrical portion 322 in the right-left direction so as to prevent the opening (aperture) of the rear opening portion 315 and the opening (aperture) of the side opening portion 313 from being connected to each other. Accordingly, an arc-shaped bridge portion 314 that forms the edges of the respective apertures of the side opening portion 313 and the rear opening portion 315 extends between the side opening portion 313 and the rear opening portion 315. Therefore, as compared with the case where the opening (aperture) of the rear opening portion 315 is continuous with the opening (aperture) of the side opening portion 313, the strength of the cylindrical portion 322 is improved.

As shown in FIG. 25, a portion of the interlocking gear 374 of the spool reciprocating device 370, a portion of the slider 372 when it is in the rearmost end position in its stroke, a rear end portion 371a1 of the guide shaft 371a, and a rear end portion 371b1 of the guide shaft 371b protrude rearward from the rear of the body 310 through the rear opening portion 315. In other words, the rear opening portion 315 is sized and shaped such that it allows these members to be inserted and arranged therethrough. Since these members project toward the rear from the body 310 through the rear opening portion 315, the housing space S1 is formed into a compact size.

As shown in FIG. 26b, a cover mounting portion 318 is formed around the rear opening portion 315. The protective cover 340 is mounted on the cover mounting portion 318 with a sealing member 350 (see FIG. 29a) interposed therebetween. The protective cover 340 is fastened with screw B that engages with the protective cover female screw hole 322c to cover the rear opening portion 315 of the body 310 (the cylindrical portion 322). As shown in FIG. 25, the housing space S2 is formed on the inner side of the protective cover 340. A portion of the interlocking gear 374 and a portion of the slider 372 that project from the rear of the body 310 through the rear opening portion 315 are accommodated in the housing space S2. That is, a portion of the interlocking gears 374 and a portion slider 372 are covered by the protective cover 340 that is mounted via the sealing member 350 and accommodated in a liquid-tight manner.

Figure 29A:
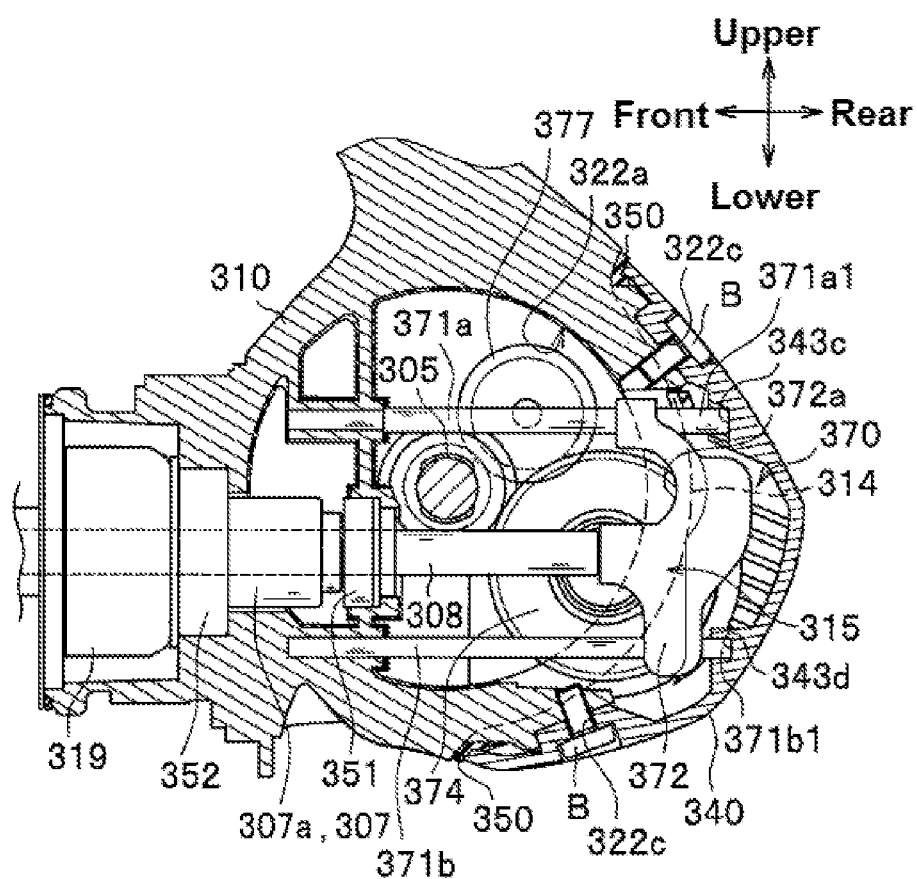
FIG. 29a is a sectional side view of the reel unit in which slider is at the rearmost end position of a stroke.

As shown in FIGS. 25 and 29a, the rear end portion 371a1 of the guide shaft 371a that projects from the rear of the body 310 is supported by a supporting portion 343c that is provided on the inner side of the protective cover 340. Similarly, the rear end portion 371b1 of the guide shaft 371b that projects from the rear of the body 310 is supported by a supporting portion 343d provided on the inner side of the protective cover 340. The rear opening portion 315 also serves as an assembly hole for assembling the spool shaft 308 and the components of the spool reciprocating device 370.

As shown in FIGS. 24 and 25, the bridge portion 14 has a circular arc shape that spans from the upper to the lower portion of the body 310 along the side opening portion 313 (the lid 330). The profile of the bridge portion 314 is substantially a circle concentric with the side opening portion 313 (the lid 330). As shown in FIG. 25, the bridge portion 314 forms a part of the opening edge portion of the side opening portion 313. The bridge portion 314 described above has a circular shape concentric with the side opening portion 313, however it is not limited thereto. The circular shape of the bridge portion 314 may be decentered toward the front or the rear relative to the center of the side opening portion 313 (the center of the handle shaft 305). Alternatively, the bridge portion 314 may be formed in a profile that has a linear portion in a side view.

Next, the essential configuration of the spool reciprocating device 370 will be described in detail. As shown in FIG. 25, the interlocking gear 374 is brought from the outside and the rear direction through the rear opening portion 315 and then assembled to the body 310. In the assembled state, a portion (rear area) of the interlocking gear 374 protrudes from the rear opening portion 315 toward the rear and is housed within the protective cover 340. A driving force transmitted from the gear 306a of the handle shaft 305 through the reduction gear 377 is input into the interlocking gear 374. The interlocking gear 374 moves in conjunction with the slider 372 via the eccentric projection 375 and serves as a conversion driving member that converts the rotation of the handle shaft 305 into reciprocation of the spool shaft 308 in the front-rear direction.

The guide shaft 371a is disposed above the handle shaft 305 on a side opposite to the spool shaft 308 with reference to the handle shaft 305. Whereas the guide shaft 371b is disposed below the handle shaft 305 on a side closer to the spool shaft 308. The guide shafts 371a, 371b are disposed in parallel to the spool shaft 308. In other words, the slider 72 is slidably supported at two point which are the upper and lower sides of the spool shaft 308. Rear end portions 371a1, 371b1 of the guide shafts 371a, 371b pass through the rear opening portion 315. The rear portion 371a1 of the guide shaft 371a is engaged with the supporting portion 343c in the protective cover 340, the rear end portion 371b1 of the guide shaft 371b is engaged with the supporting portion 343d in the protective cover 340. Therefore, as shown in FIG. 29a, a portion of the slider 372 enters into the protective cover 340 when it moves toward the real; and the moving range of the slider 372 is effectively secured.

Figure 29B:
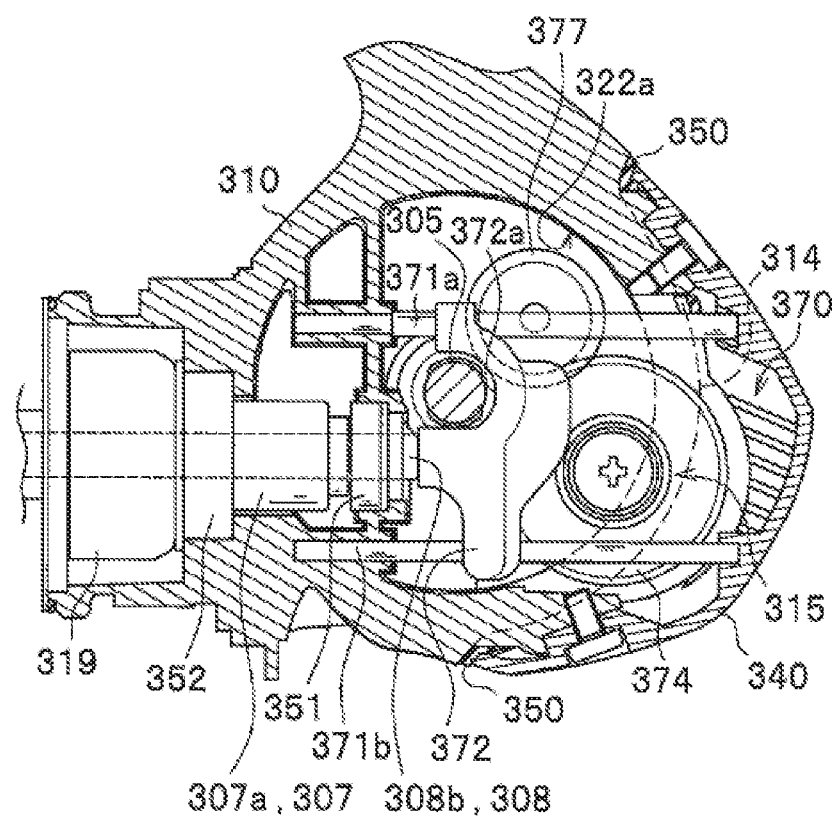
FIG. 29b is a sectional side view of the reel unit in which the slider is at the most front end position of the stroke.

A recess 372a recessed rearward is formed in the front surface (surface that faces the handle shaft 305) of the slider 372. As shown in FIG. 29b, since the handle shaft 305 is received by the recess 372a when the slider 372 is moved forward the moving range of the slider 372 is expanded toward the front. As described above, the moving range (stroke) of the slider 372 is effectively secured while controlling the size increase of the body 310.

The lid 330 will now be described in detail. As shown in FIG. 24, the lid 330 is mounted on the side opening portion 313 to close the side opening portion 133 in a liquid tight manner. The lid 330 also serves to support the left end of the handle shaft 305. As shown in FIG. 28b, the lid 330 has a substantially mountain shape, and includes a peripheral wall portion 331, a cylindrical portion 332 formed in the central portion of the peripheral wall portion 331, and a cylindrical insertion portion 333 on the outer peripheral edge of the peripheral wall portion 331. The handle shaft 305 is supported at the center of the lid 330 (see FIG. 27).

Lightweight portions 331b are formed n the outer side surface (the left side surface) and the inner peripheral surface (the right side surface) of the peripheral wall portion 331. In this way, the weight of the lid 330 is reduced. The cylindrical portion 332 has a right side portion (on the back side) where its diameter is increased in a stepped manner and the bearing 305b (see FIG. 27) is housed in this enlarged diameter portion 330a. The lid 330 supports the left end of the handle shaft 305 through the bearing 305b.

The insertion portion 333 extends toward the side opening portion 313 to be inserted into the side opening portion 313. As shown in FIG. 28b, a male screw 333a is formed in an outer peripheral portion of a tip end (right end) of the insertion portion 333. The male screw 333a is threadably engagable with the female screw 313b of the side opening portion 313. Thus, it is possible to fix the lid 330 to the side opening portion 313 by screwing the lid itself, and therefore it is easy to perform attachment of the lid 330.

In the outer peripheral portion of the insertion portion 333 on the side closer to the butt end than the male screw 333a, a cylindrical contact surface (contact portion) 333b that contacts the inner peripheral surface (abutting portion) 313a of the side opening portion 313. The abutting surface 333b abuts the inner peripheral surface 313a of the side opening portion 313 in the circumferential direction when the lid 330 is mounted on the side opening portion 313 by screwing. Accordingly, the concentricity between the side opening portion 313 and the lid 330 is achieved Consequently, a gap is hardly formed between the side opening portion 313 and the lid 330 without increasing the machining accuracy. Further, since the center of the body 310 corresponds to the center of the lid 330, tilting of the handle shaft 305 is prevented. Therefore the rotation operability and meshing performance of the handle 305a are stabilized and improved. The abutting surface 333b may be configured to partially abut the inner peripheral surface 313a of the side opening portion 313 and only some portions of the abutting surface 333b may abut the inner peripheral surface 313a at intervals in the circumferential direction.

On the outer peripheral surface of the insertion portion 333, a housing recess 333c is formed between the male screw portion 333a and the abutting surface 333b. An O-ring 333d is fitted as a sealing material in the housing recess 333c.

In the outer peripheral edge portion of the lid 330, provided is a flange-shaped fitting portion 337 that extends circumferentially outward. The fitting portion 337 contacts the bottom surface 317a with a small gap between the rising portion 317b of the fitting receiving portion 317 of the side opening portion 313 (although there is the gap in the example shown in the drawing, full contact fitting is alternatively possible) to spigot fit in the fitting receiving portion 317. This spigot fitting curbs the amount of projection of the fitting portion 337 in the lateral direction. Thus, when the fishing line is loosened by reel operation or the like, the loosened fishing line is not easily caught on the outer peripheral edge of the lid 330. Further, the spigot fitting prevents dust and water from penetrating. Therefore, it is possible to prevent sea water, water, sand in the water, foreign substances and the like from entering inside. That is, it is possible to prevent a fishing line, seawater, foreign substances and the like from entering inside by the spigot fitted portion.

As shown in FIG. 28c, the outer surface 330g of the outer peripheral edge of the lid 330 and an outer surface 313g of the outer peripheral edge portion of the side opening portion 313 are configured as inclined surfaces that are substantially continues to each other with the fitting portion 337 (the fitting receiving portion 317) interposed therebetween. This structure makes a unwound fishing line less likely to be caught thereon.

As shown in FIG. 28b, a small diameter portion 338 that has a curved concave shape as viewed in cross section is formed between the fitting portion 337 and the abutting surface 333b. A lubricant such as grease or oil is applied on the small diameter portion 338. Therefore, smooth attachment of the lid 330 is possible with the lubricant, and the sealing performance between the inner peripheral surface 313a of the side opening portion 313 and the lid 30 is enhanced. Note that lubricant such as grease or oil may also be applied on the fitting receiving portion 317 and the fitting portion 337.

As described above, the reel unit employs a monocoque body such that the lid 330 having the support portion for the handle shaft 305 is mounted on the side opening portion 313 of the body 310 by screwing to form a single body.

As shown in FIGS. 24 and 25, a flange portion 316 formed in a thin plate shape is provided at the boundary between the body 310 and the body front portion 312. As shown in FIG. 24, a concave portion 316b is formed in a left side portion of the flange portion 316. The concave portion 316b is recessed toward the front along the profile of a front end portion 330e of the lid 330. Since the concave portion 316b is provided, the front end portion 330e of the lid 330 is situated on front side compared to an upper rear surface 316a of the flange portion 316. As shown in FIG. 23, the front end portion 330e of the lid 330 is situated in front of a rearmost end portion 302a of the rotor 302 in the positional relationship between the rotor 302 and the lid 330. Further, as shown in FIG. 24, the front end portion 330e of the lid 330 is situated in front of a rear end portion 312b of a bottomed cylindrical cover 312a in the positional relationship between the lid 330 and the bottomed cylindrical cover 312a that covers the body front portion 312. By placing the front end portion 330e of the lid 330 in such a positional relationship, it is possible to increase the diameter of the lid 330 while reducing the dimension of the body 310 in the front-rear direction. The concave portion 316b serves as a clearance portion when the lid 330 is mounted.

On the inner side of the body front portion 312, a front bearing (ball bearing) (not shown) that supports the front side of the pinion gear 307a (see FIG. 25) (the front portion of the drive shaft sleeve 307) is disposed. The drive shaft sleeve 307 extends toward the spool 303 (see FIG. 23), and the rotor 304 is attached at the tip end of the drive shaft sleeve.

According to the third embodiment, since the lid 330 itself is threadably mounted on the side opening portion 313 and fixed with a uniform fastening force in the circumferential direction. Therefore the body 310 and the lid 330 is integrated into a single body with a high precision. Moreover, the side opening portion 313 of the body 310 is reinforced by the lid 330 screwed therein, and the strength and rigidity of the body 310 itself are enhanced. As described above, since the reduction gear mechanism is assembled in the reel unit 1 having the high precision and rigidity, it is possible to prevent decrease in the conversion efficiency as much as possible where the rotary motion of the handle shaft 305 is converted into the reciprocation of the spool shaft 308 in the front-rear direction. Consequently it is possible to ensure a fine power transmission efficiency. Therefore, a fish spinning reel with an excellent power transmission efficiency and winding operability can be obtained.

Moreover, it is possible to further improve the high strength and high rigidity of the reel unit 301 by the support rib 324 so that the advantages of monocoque body (precision, high power transmission efficiency) can be further enhanced.

Further, since the center of the side opening portion 313 is made corresponded to the center of the lid 330 by providing the abutting surface 333b, tilting of the handle shaft 305 is prevented. Therefore the rotation operability and meshing performance of the handle 305a are stabilized and improved Consequently, a fish spinning reel with an excellent power transmission efficiency and winding operability can be obtained.

Further, by providing the rear opening portion 315, it is possible to use a desired sized component without the size limitation of the space (the housing space S1) in the reel unit 301, and the components disposed in the rear of the reel unit are accommodated by the protective cover 340 through the rear opening portion 315. Therefore, it is possible to achieve flexibility of design and the stable performance of the spool reciprocating device 370. Consequently, a fish spinning reel with an excellent power transmission efficiency and winding operability can be obtained.

Further, the pair of upper and lower guide shafts 371a, 371b can stabilize the performance of the spool reciprocating device 370 so that it is possible to obtain a fishing spinning reel with excellent power transmission efficiency and winding operability.

Next, a modification example of the third embodiment of the fishing spinning reel will now be described with reference to FIGS. 30 and 31.

This embodiment differs from the third embodiment in that a reduction gear 409 is provided as the reduction gear mechanism in a worm-shaft type spool reciprocating device 480.

Figure 30:
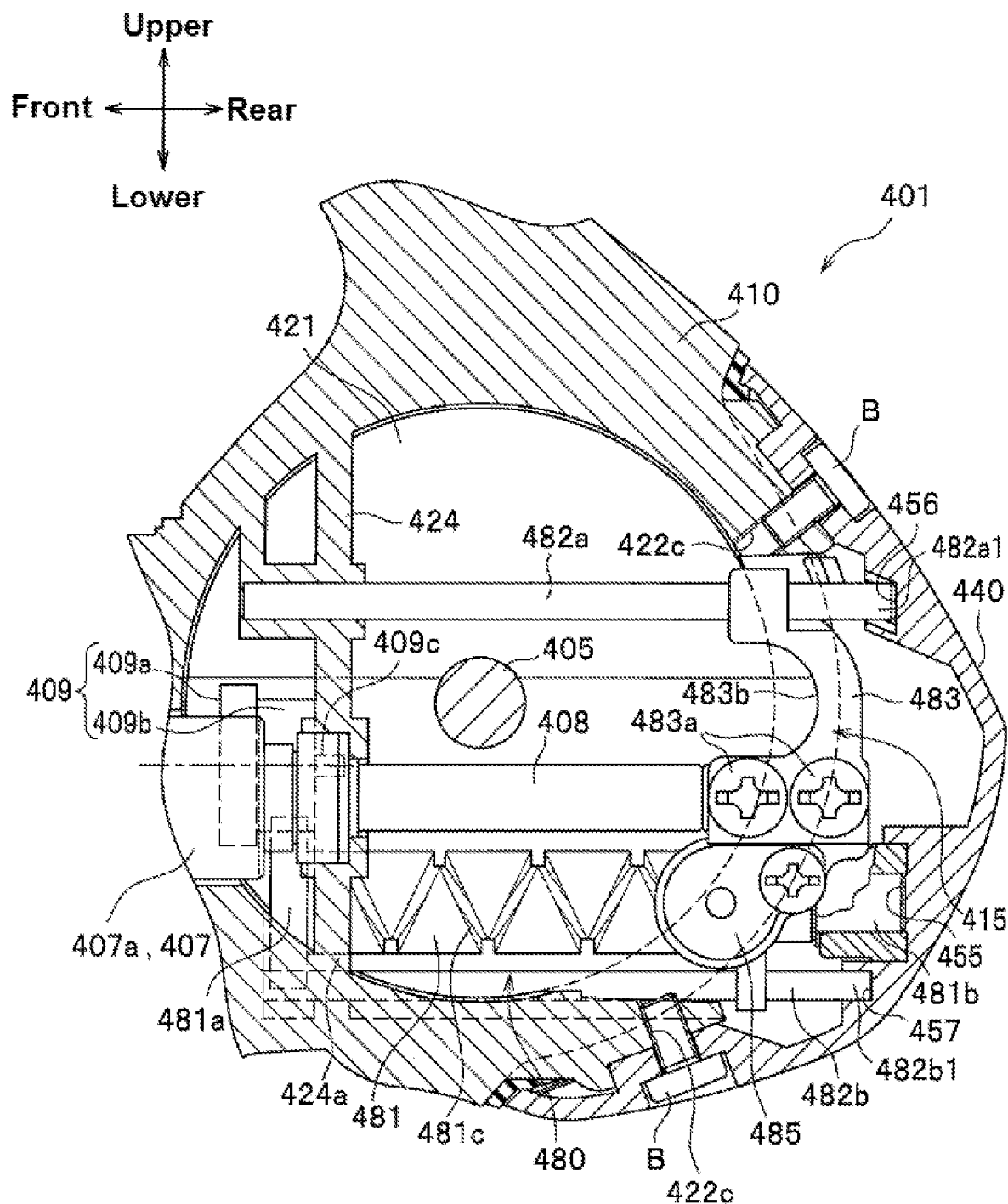
FIG. 30 is a sectional side view of a fishing spinning reel according to a modification example of the third embodiment to show its major components.
Figure 31:
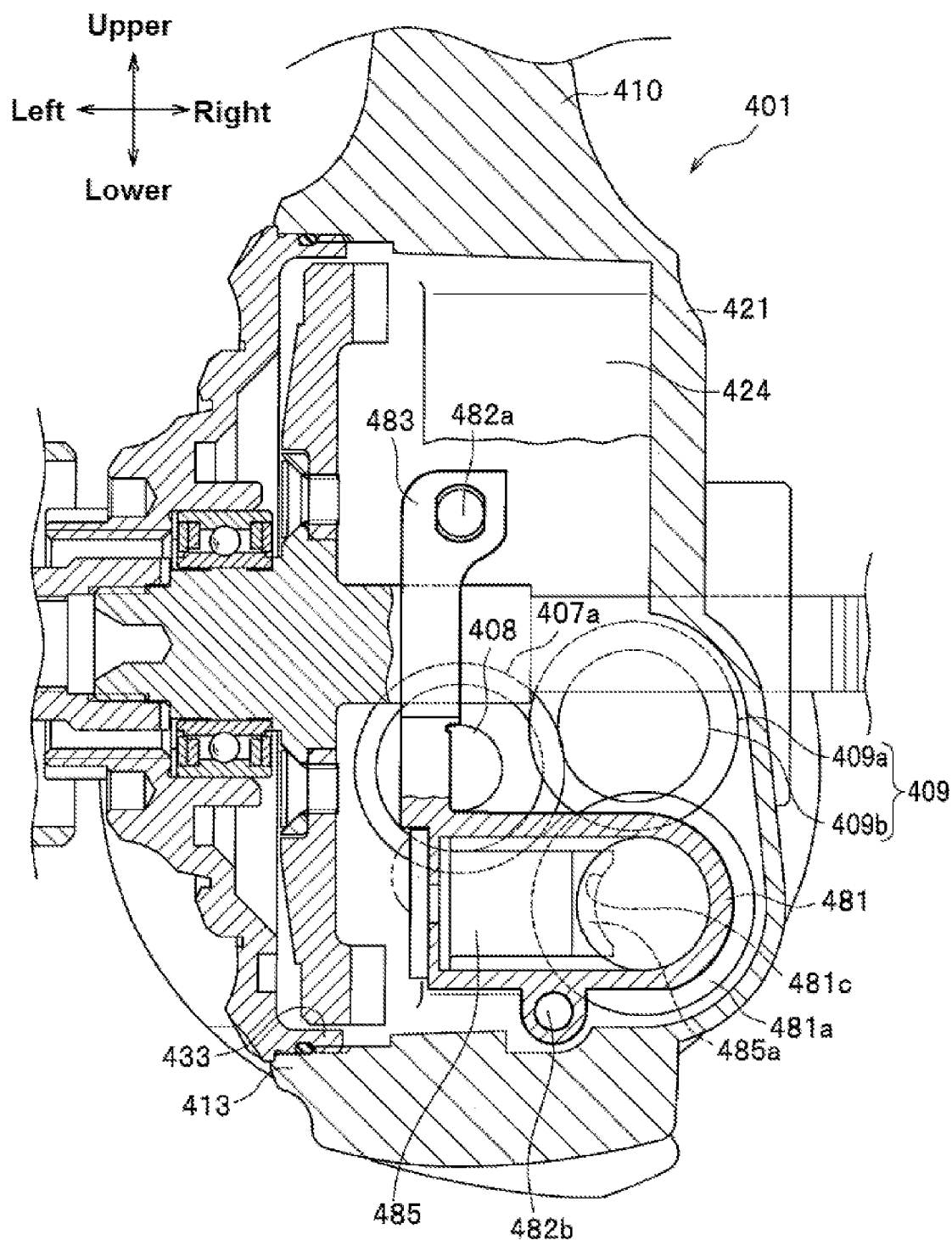
FIG. 31 is a rear cross-sectional view showing layout of the members inside the body according to the modification example of the third embodiment.

Referring to FIGS. 30 and 31, the spool reciprocating device 480 includes a worm shaft 481, a slider 483, and upper and lower guide shafts 482a, 482b. The worm shaft 481 extends in parallel with the spool shaft 408. A oscillating gear 481a is provided on a front end portion of the worm shaft 481. The oscillating gear 481a is engaged with a reduction gear 409 that serves as a reduction gear mechanism. A rear end portion 481b of the worm shaft 481 is engaged with a recess 455 provided in a protective cover 440.

The reduction gear 409 is a stepped gear including a large diameter gear 409a that meshes with a pinion gear 407a, and a small diameter gear 409b that has a smaller number of teeth than the large diameter gear 409a and meshes with the oscillating gear 481a. The reduction gear 409 rotates around a support shaft 409c that extends in parallel with the pinion gear 407a. The support shaft 409c is cantilever-supported by a support rib 424. As shown in FIG. 31, the reduction gear 409 is disposed on the upper right side of the spool shaft 408. The worm shaft 481 is disposed below the reduction gear 409 and on the lower right side of the spool shaft 408.

The large diameter gear 409a is a helical gear meshed with the pinion gear 407a. The small diameter gear 409b is a spur gear which meshes with the oscillating gear 481a. The large diameter gear 409a has substantially the same diameter as the pinion gear 407a, the small-diameter gear 409b has a smaller diameter than the oscillating gear 481a and has the number of teeth smaller than the oscillating gear 481a. Therefore, when the handle (see FIG. 23) is rotatably operated, the rotation of the pinion gear 407a is reduced by the reduction gear 409 and then transmitted to the oscillating gear 481a. Thus, the oscillating gear 481a is rotationally driven at a reduced speed.

As shown in FIG. 30, a helical cam groove 481c is formed on a circumferential surface of the worm shaft 481 along the axial direction. As shown in FIG. 31, an engaging pawl 485a of an engaging pin 485 that is retained by the slider 482 is engaged in the cam groove 481c.

As shown in FIG. 30, the slider 483 is attached to a rear end portion of the spool shaft 8 by two screws 483a and moves along upper and lower guide shafts 482a, 482b. A recess 483b recessed rearward is formed in a front surface (the surface that faces the handle shaft 405) of the slider 483. Since the handle shaft 405 is received by the recess 483b when the slider 483 is moved forward, the moving range of the slider 483 is expanded toward the front. As described above, the moving range (stroke) of the slider 483 is effectively secured while controlling the size increase of the body 410.

A rear end portion 482a1 of the upper guide shaft 482a is engaged with a recess 456 provided in the protective cover 440. A rear end portion 482b1 of the lower guide shaft 482b is engaged with a recess 457 provided in the protective cover 440.

The protective cover 440 is fastened by the screw B screwed in upper and lower screw holes 422c and fixed so as to cover a rear opening portion 415 of the body 410 and the components of the spool reciprocating device 480.

The above-described modification example of the third embodiment can also obtain the same advantageous effects as those of the third embodiment. More specifically, since the reduction gear mechanism is assembled in the reel unit 401 having the high precision and rigidity, it is possible to prevent decrease in the conversion efficiency as much as possible where the rotary motion of the handle shaft 405 is converted into the reciprocation of the spool shaft 408 in the front-rear direction. Consequently it is possible to ensure a fine power transmission efficiency. Therefore, the winding operation excellent a fish spinning reel with an excellent power transmission efficiency and winding operability can be obtained.

Further, the pair of upper and lower guide shafts 482a, 482b can stabilize the performance of the spool reciprocating device 480 so that it is possible to obtain a fishing spinning reel with excellent power transmission efficiency and winding operability.

Having described the modification to the third embodiment, the reduction gear mechanism in the invention may be configured by using a plurality of reduction gears.

Figure 32:
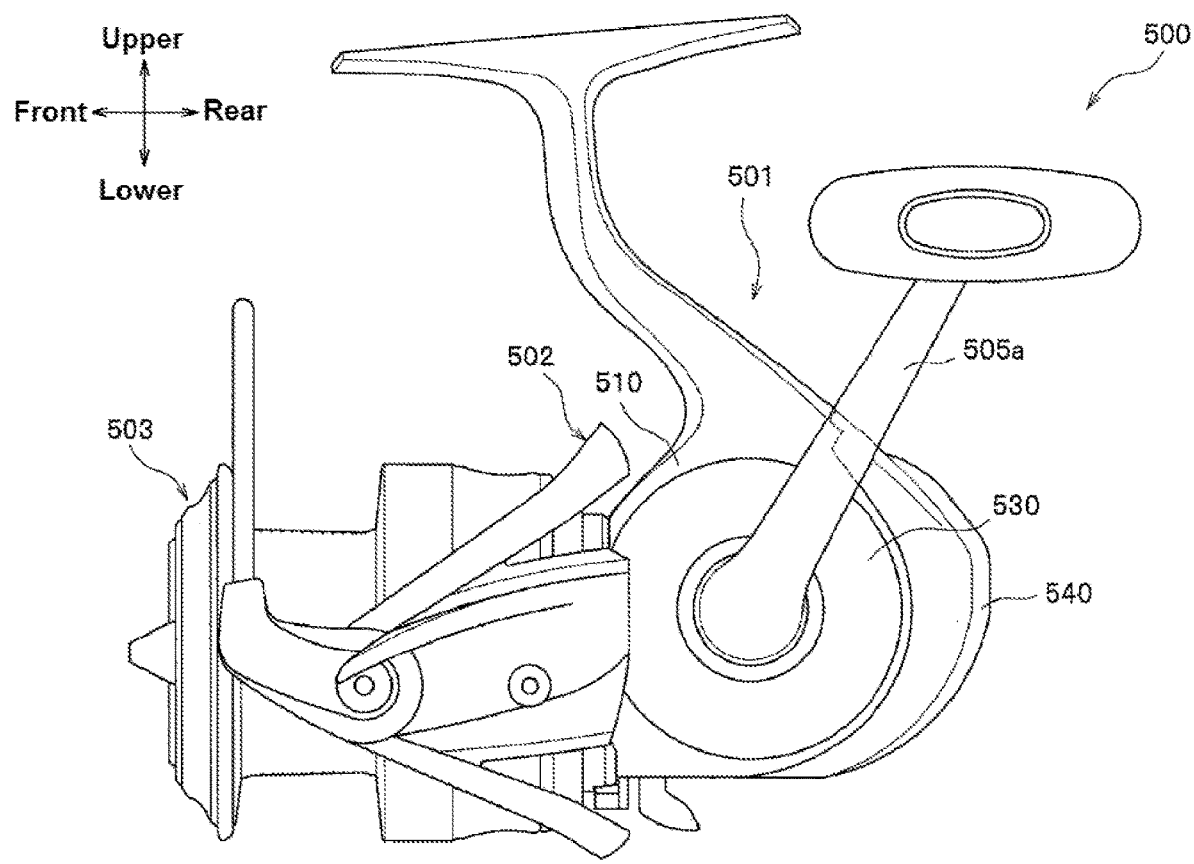
FIG. 32 is a side view of the fishing spinning reel according to a fourth embodiment of the invention to show its entire configuration.

Next, a fishing spinning reel according to the fourth embodiment will now be described. Referring to FIG. 32, a fishing spinning reel 500 may include a reel unit 501 to which a handle 505a is attached, a rotor 502 that is rotated by a winding operation of the handle 505a, and a spool 503 that reciprocates in the front-rear direction in accordance with the winding operation of the handle 505a.

Figure 33:
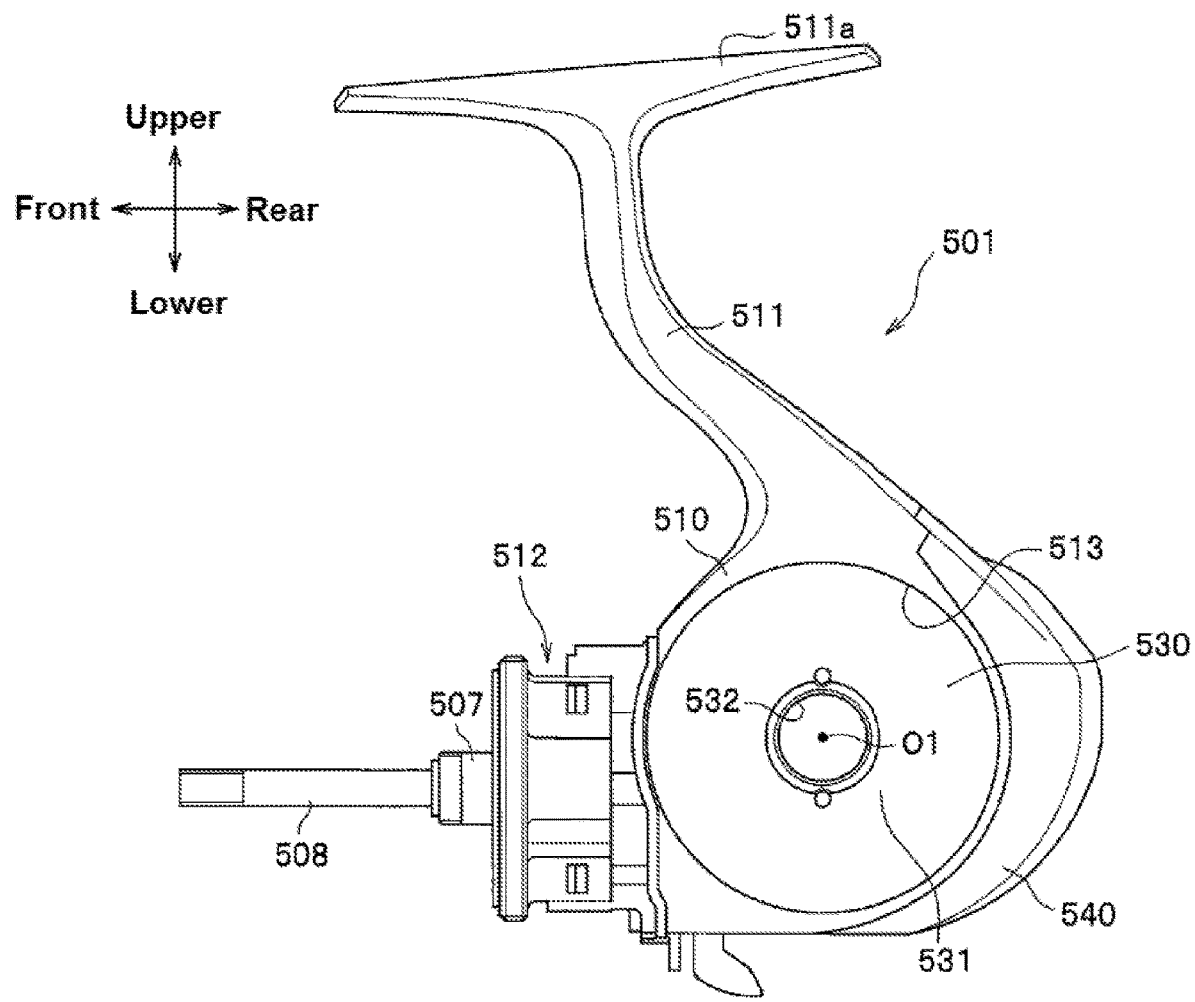
FIG. 33 is a side view of the reel unit.

As shown in FIG. 33, the reel unit 501 includes a body 510 in which a side opening portion 513 that opens toward the left side is formed; a leg portion 511 that extends upward from the top of the body 510 and has a rod attachment portion 11a at its tip end to be attached to a fishing rod (not shown); a cylindrical body front portion 512 provided in front of the body 510; a lid 530 used for closing the side opening portion 513; and a protective cover 540 attached in rear of the body 510.

A drive shaft sleeve 507 that extends in the front-rear direction and a spool shaft 508 is assembled in the body front portion 512. A front end of the drive shaft sleeve 507 and a front end of the spool shaft 508 project from the body front portion 512 toward the front. The rotor 502 is mounted on the front end of the drive shaft sleeve 507 (see FIG. 33) and the spool 503 is mounted on the front end of the spool shaft 508 (see FIG. 33).

Figure 34:
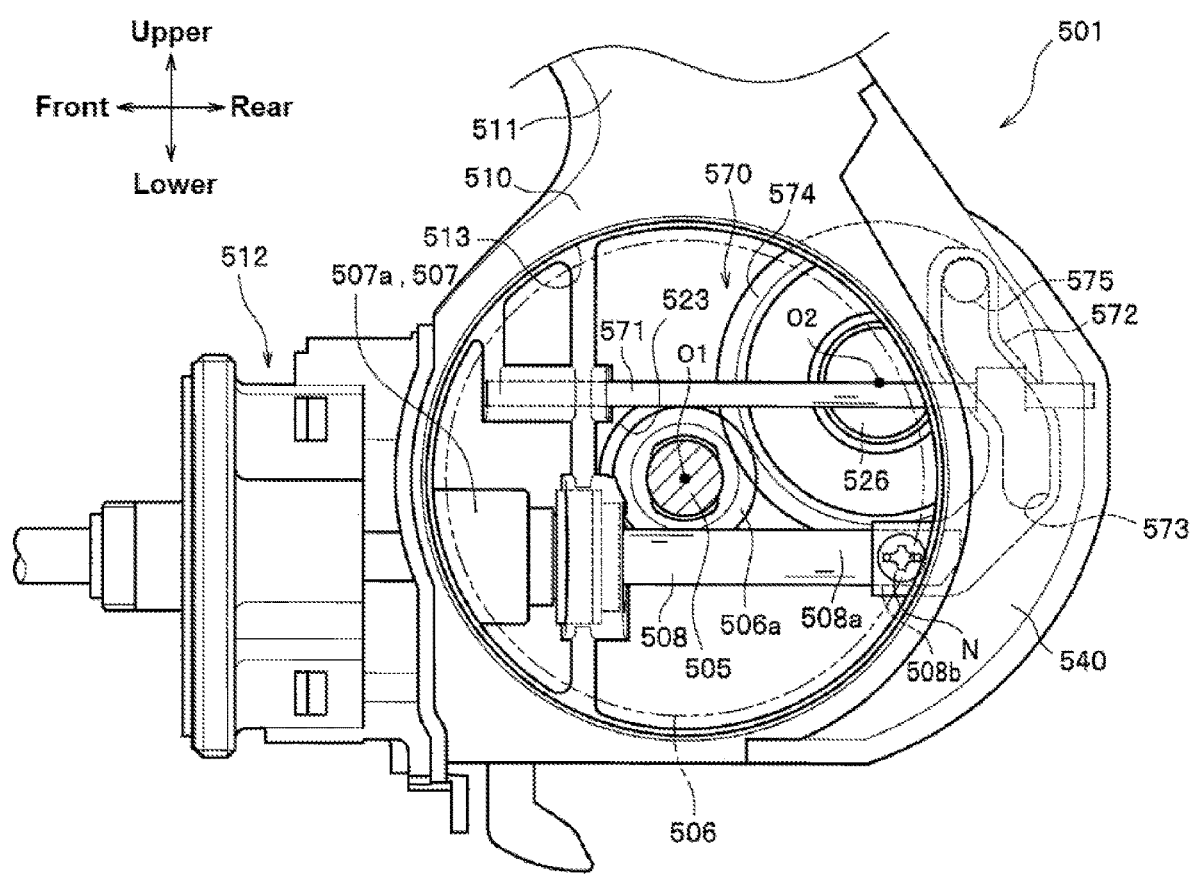
FIG. 34 is a side view of the reel unit from which the lid is removed.

Referring to FIG. 34, a rear end of the drive shaft sleeve 508 and a rear end of the spool shaft 508 is situated in the body 510. The spool shaft 508 extends rearward and projects from the rear end of the drive shaft sleeve 507, and the rear end portion 508a of the spool shaft 508 extends in the front-rear direction below the handle shaft 505.

In the body 510, a handle shaft 505 disposed rotatably relative to the body 510, a drive gear 506 and a gear 506a coupled to the handle shaft 505, and a spool reciprocation device are assembled as a configuration for driving the drive shaft sleeve 507 and the spool shaft 508 by a winding operation of the handle 505a. The reference numeral "O1" in the drawing indicates the center of rotation of the handle shaft 505. In FIG. 34, it indicates the center of a right center hole 523 in which the handle shaft 505 is supported.

Figure 35:
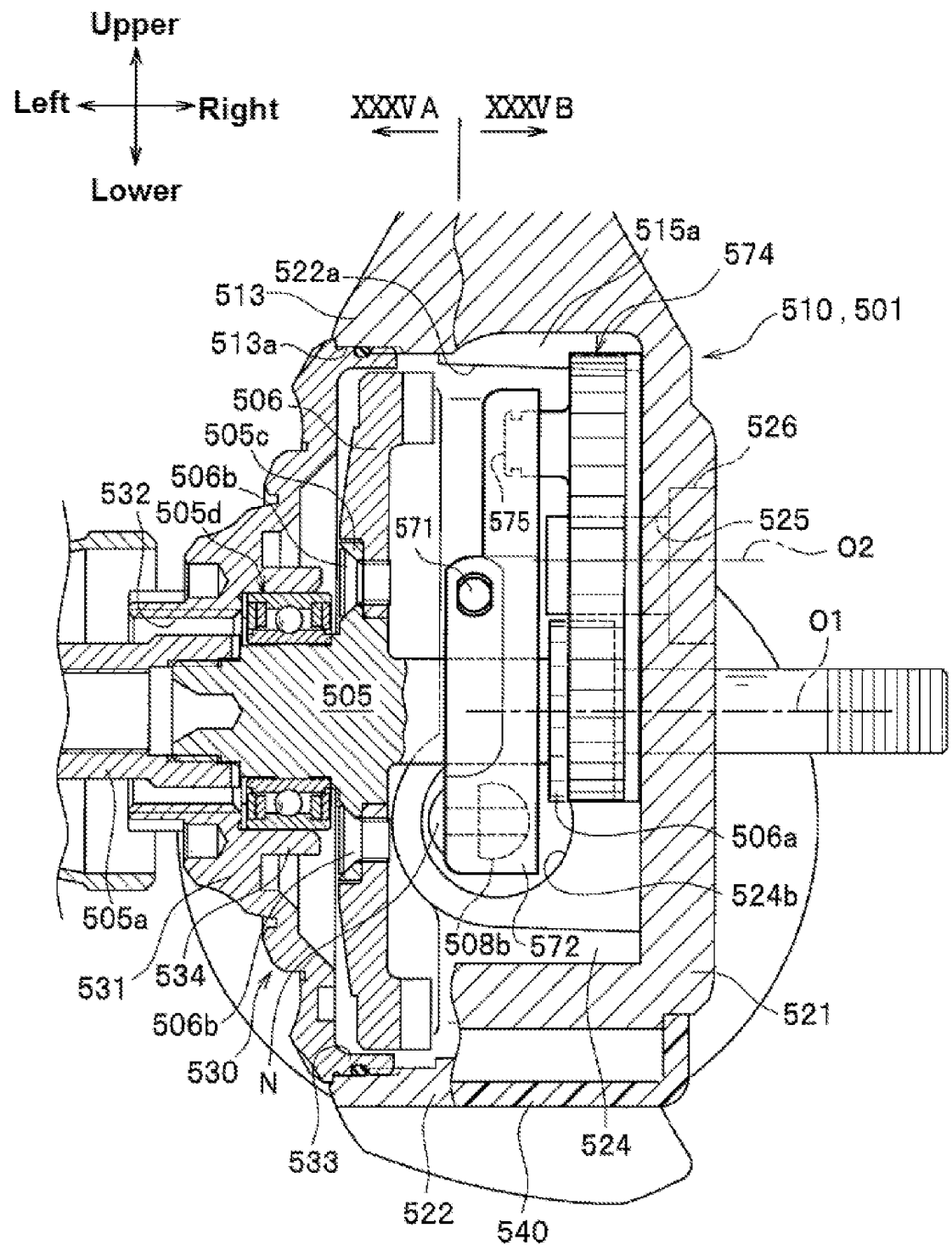
FIG. 35 is a rear sectional view showing the internal structure of the reel unit.

FIG. 35 is a view of cross sections of e reel unit 501 along the upper-lower direction and the right-left direction and viewed from the rear. More specifically, the left half of the reel unit 501 in FIG. 35 is a cross-sectional view taken along the line XXXVA-XXXVA in FIG. 37b, and the right half of the reel unit 501 is a cross-sectional view taken along the line XXXVB-XXXVB in FIG. 37b. As shown in FIG. 35, the handle shaft 505 is a stick-like member that extends in the right-left direction and penetrates the body 510 and the lid 530. In the body 510, the handle shaft 505 is integrated with the drive gear 506 and the gear 506a, and the drive gear 506 and the gear 506a rotate in conjunction with the handle shaft 505. The drive gear 506 is situated closer to the lid 530, and the gear 506a is situated closer to a right wall portion 521 of the body 510 which will be described later. A left end portion of the handle shaft 505 is threadably coupled with a connecting shaft provided on the handle 505a.

The drive gear 506 is fastened by a screw 506b to a flange 505c of the handle shaft 505, and rotates together with the handle shaft 505. As shown in FIG. 34, the drive gear 506 meshes with a pinion gear 507a formed in the rear of the drive shaft sleeve 507. Accordingly, a driving force generated by a winding operation of the handle 505a is transmitted to the pinion gear 507a (the drive shaft sleeve 507) through the handle shaft 505 and the drive gear 506, which rotates the rotor 502.

The gear 506a is a component that meshes with an interlocking gear 574 (described later) the spool reciprocating device 570, and transmits the driving force generated by the winding operation of the handle 505a to the interlocking gear 574.

The spool reciprocating device 570 includes a guide shaft 571 that extends in the front-rear direction, a slider 572 that moves along the guide shaft 571 and in which a concave guide groove 573 is formed on its right side surface, and the interlocking gear (a drive component, a component) 574 provided with an eccentric projection 575 that engages with the guide groove 573. A projecting portion 508b that projects rearwardly from the rear end portion 508a of the spool shaft 508 is unrotatably inserted in the slider 572 and fixed by a screw N to prevent the projecting portion 508b from coming off. In this manner, the slider 572 and the spool shaft 508 is integrated to each other. Accordingly a driving force generated by the winding operation of the handle 505a is transmitted to the interlocking gear 574 through the handle shaft 505 and the gear 506a, which rotates the interlocking gear 574. Further, the eccentric projection 575 of the interlocking gear 574 presses a side surface of the guide groove 573 of the slider 572 and the rotational motion is converted into a motion in the front-rear direction. Consequently the slider 572 and the spool shaft 508 (the spool 503) reciprocate in the front-rear direction.

Next, the body 510, the protective cover 540, the spool reciprocating device 570, and the lid 530 will be further described in detail.

As shown in FIG. 36 (a), the body 510 has a bottomed box shape (a cylindrical shape) that opens toward the left, and includes a disk-shaped right wall portion 521, and a cylindrical portion 522 that projects from a peripheral edge of the right wall 521 toward the left. The left end portion of the cylindrical portion 522 forms the side opening portion 513.

A right side center hole 523, a rib 524, and an insertion hole 525 are formed in an inner surface (a left side surface) of the right wall portion 521. The right center hole 523 is a hole through which the handle shaft 505 passes and is provided at the center portion of the right wall 521. The right center hole 523 is formed such that it has a larger diameter than the handle shaft 505, and a bearing (not shown) for rotatably supporting the handle shaft 505 is fitted in the right center hole 523.

The rib 524 is a reinforcing portion that protrudes from the inner surface of the right wall portion 521 for enhancing the strength of the body 510. The rib 524 extends in the upper-lower direction in front of the center of the right center hole 523. Further, the upper and lower ends of the rib 524 are formed continuous to the cylindrical portion 522. From the above, the rib 524 occupies a space which is the right side space in the body 510 (see FIG. 35) and in front of the handle shaft 5 (see FIG. 36a). Therefore unnecessary space (dead space) is not created.

Figure 36A:
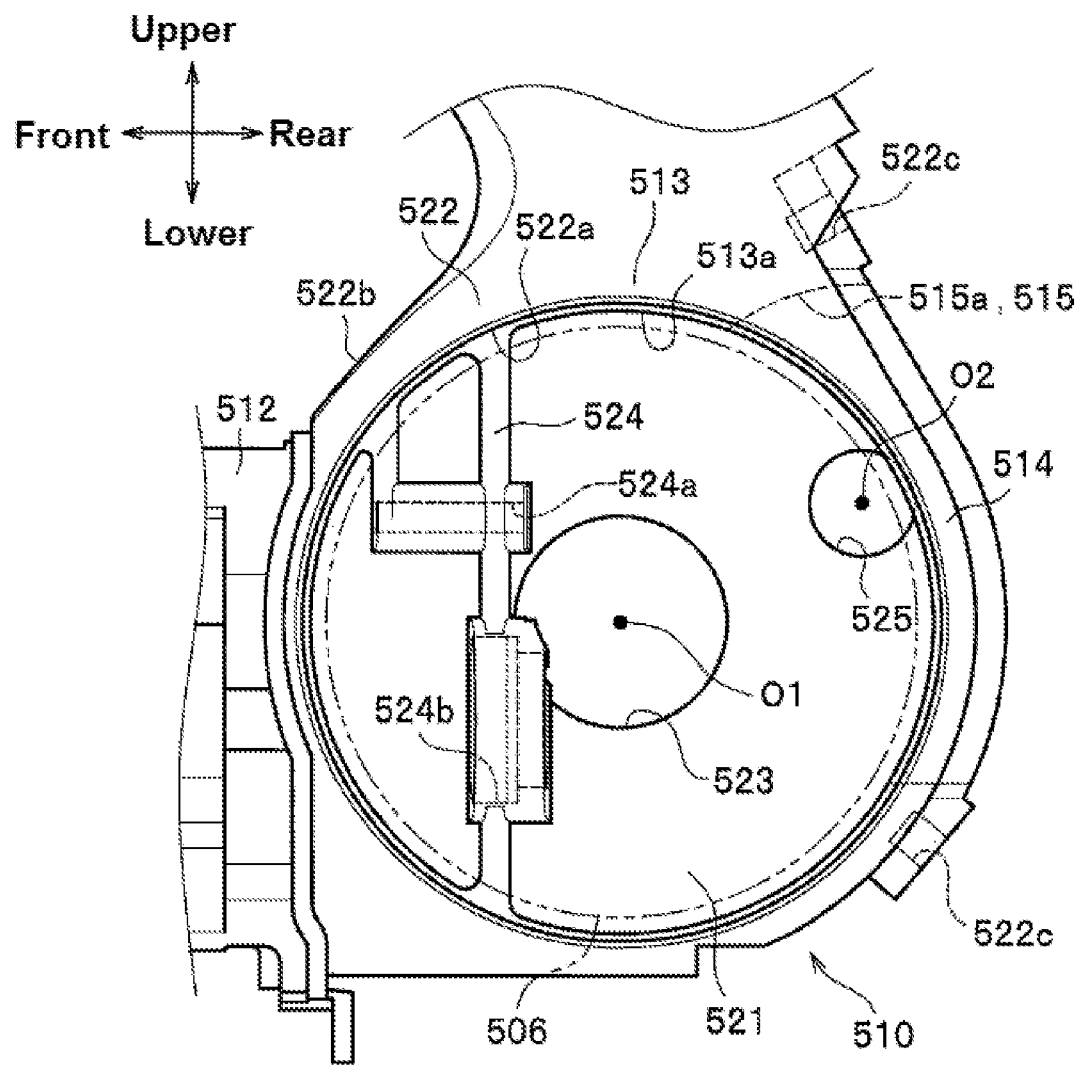
FIG. 36a is a side view of the body.

As shown in FIG. 35, the insertion hole 525 is a hole for bringing a boss portion 526 of the gear support member that supports the interlocking gear 574 from the outside of the right wall portion 521 (the right side) into the body 510. As shown in FIG. 36a, the center O2 of the insertion hole 525 of the boss portion 526 that supports the interlocking gear 574 is disposed above the rear side of the center O1 of the right center hole 523.

The cylindrical portion 522 is formed in a substantially cylindrical shape around the center O1 of the right center hole 523 for supporting the handle shaft 505. More particularly, the inner circumferential surface 522a of the cylindrical portion 522 is formed in a circular shape centering on the center O1 of the right center hole 523. An outer peripheral surface 522b of the cylindrical portion 522 is formed in a substantially circular shape centering on the center O1 of the right center hole 523. In other words, the thickness (radial thickness) of the cylindrical portion 522 is substantially uniform in the circumferential direction. Thus, the cylindrical portion 522 of the embodiment is reduced in size compared to a conventional cylindrical portion (the cylindrical portion where the female screw is formed).

The inner peripheral surface 522a of the cylindrical portion 522 corresponds to the dimension of the drive gear 506. Therefore, there is no unnecessary space (dead space) in the gap between the inner peripheral surface 522a of the cylindrical portion 522 and the drive gear 506, in other words, in the left space (see FIG. 35) in the body 510. An inner peripheral surface 513a of the left end portion (the side opening portion 513) of the cylindrical portion 522 is formed such that it has a substantially same diameter as the inner peripheral surface 522a of the cylindrical portion 522, so that even in the case of a relatively large drive gear 506, it can be easily mounted within the body 510 (the cylindrical portion 522).

Figure 36B:
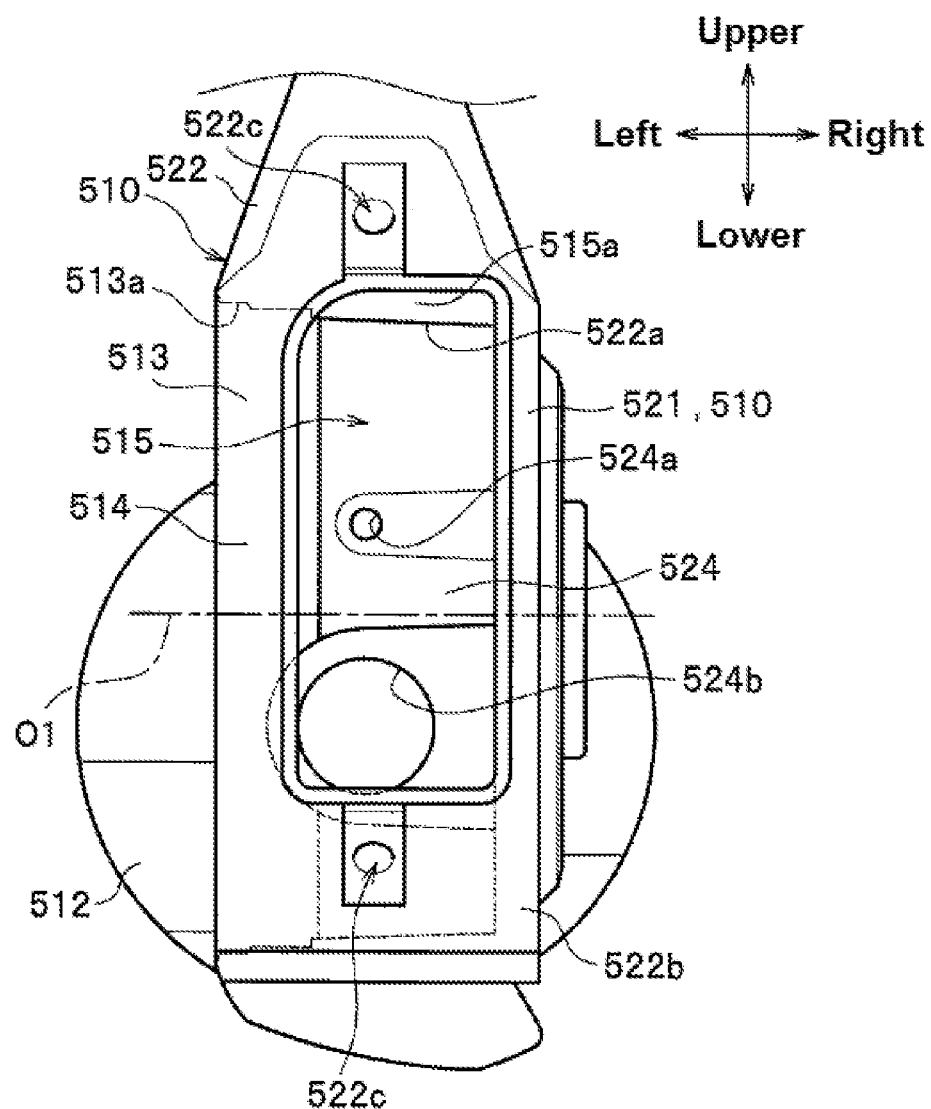
FIG. 36b is a rear view of the reel unit from which the cover member is removed.

As shown in FIG. 36b, in the rear portion of the cylindrical portion 522, two female screw holes 522c for the protective cover that are formed in the outer peripheral surface 522b of the cylindrical portion 522, and a rear opening portion 515 that penetrates through the rear portion of the cylindrical portion 522 are formed.

The rear opening portion 515 is an opening for receiving a part of a component that is assembled in the body 510 and allowing a part of the component to be protrude from (outside) the body 510. The rear opening portion 515 extends through only the central portion of the cylindrical portion 522 in the right-left direction, and the both ends of the cylindrical portion in the right-left direction are left. Therefore, the opening (aperture) of the rear opening portion 515 and the opening (aperture) of the side opening portion 513 are not continuous to each other. In other words, an arc-shaped bridge portion 514 that forms the edges of the respective apertures of the side opening portion 513 and the rear opening portion 515 extends between the side opening portion 513 and the rear opening portion 515. Therefore, according to the embodiment, the strength of the cylindrical portion 522 is improved compared to the case where the opening (aperture) of the rear opening portion 515 is continuous with the opening (aperture) of the side opening portion 513. As shown in FIG. 36a, an upper inner peripheral surface 515a of the rear opening portion 515 is inclined toward upward as it extends from the inner side to the rear side of the body 510.

As shown in FIG. 37, the protective cover 540 is fastened by the screw B that engages with the protective cover female screw hole 522c to cover the rear opening portion 515 of the body 510 (the cylindrical portion 522). A front surface of the protective cover 540 is formed in a concave shape dented toward the rear, and the housing space is formed on the front side of the protective cover 540. Therefore, it is possible to house, in the interior of the protective cover 540, a part of the component that projects toward the rear from the inside of the body 510 through the rear opening portion 515. Between the protective cover 540 and the body 510, a sealing member 550 is provided to prevent water from entering inside from a mating surface of the protective cover 540 and the body 510.

In the spool reciprocating device 570, the rotation center of the interlocking gear 574, in other words, the center O2 of the insertion hole 525 in which the boss portion 526 that supports the interlocking gear 574 is disposed is situated behind the rotation center O1 of the handle shaft 505. Therefore, the rear portion of the interlocking gear 574 protrudes from the rear opening portion 515 toward the rear and is housed within the protective cover 540.

The rotation center O2 of the interlocking gear 574 is located closer to a rod attaching portion 511a and on the upper side than the rotation center O1 of the handle shaft 505. Accordingly, the interlocking gear 574 occupies the right side space in the body 510 (see FIG. 35) and in the rear and above the handle shaft 505, which was a dead space in a conventional reel unit. Therefore there is no unnecessary space (dead space) in the embodiment.

Further, since the interlocking gear 574 is positioned on the upper side, the lower portion of the housing space formed by the body 510 and the protective cover 540 has a shape corresponding to the drive gear 506 and the slider 572. In other words, the lower portion of the housing space formed by the body 510 and the protective cover 540 does not bulge outwards as the case where the interlocking gear 574 is disposed in the lower portion, so that the size of the reel unit 501 is reduced More specifically, by placing the drive member (the interlocking gear 574) of the spool reciprocating device 570 in the upper portion of the body 510, the slider 572 can be formed in a flat shape without protruding from the portion where the rear end portion 508a of the spool shaft 508 is coupled toward the lower side. Therefore it is possible to downsize the body 501 effectively. Further, since the interlocking gear 574 is situated on the upper side and the center of gravity of the fishing spinning reel 500 is moved upward (toward the fishing rod), a user can feel that the fishing spinning reel 500 and the fishing rod are integrated and therefore it is possible to improve the operability of the fishing spinning reel 500.

Figure 37A:
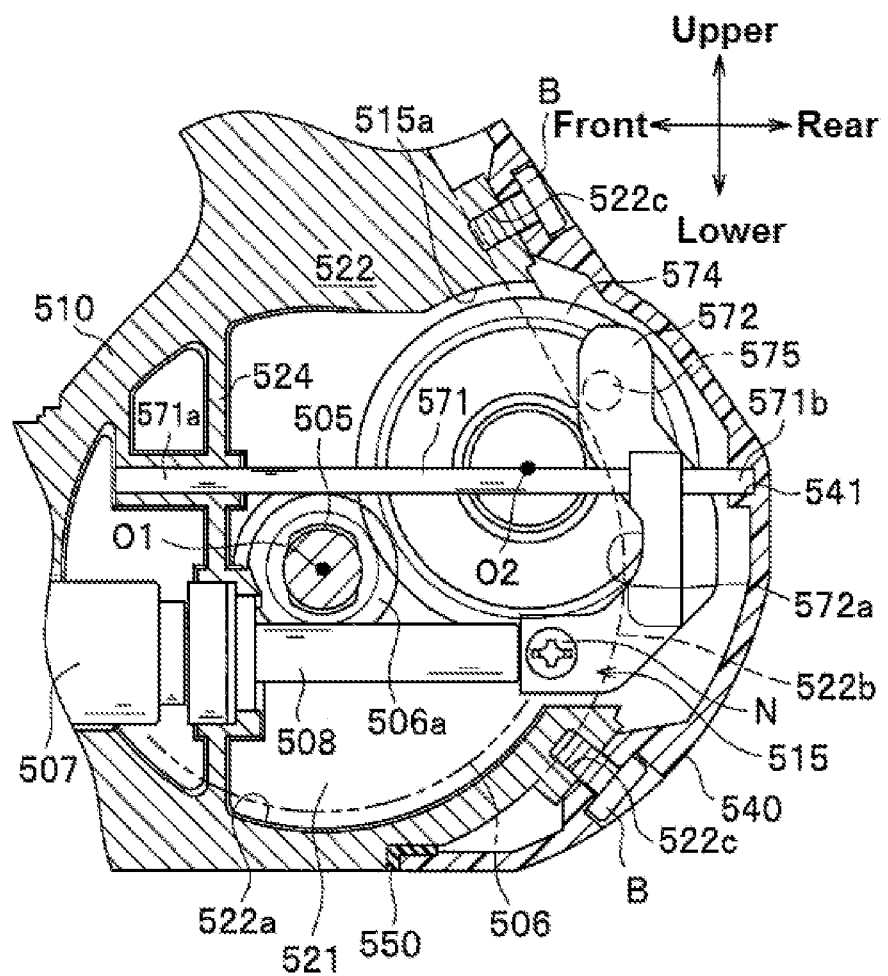
FIG. 37a is a sectional side view of the reel unit in which the slider is at the rearmost end position of the stroke.

In the spool reciprocating device 570, a front end 571a of the guide shaft 571 engages in a guide shaft support hole 524a formed in the upper portion of the rib 524, and a rear end 571b of the guide shaft 571 passes through the rear opening portion 515 and is engaged with an engaged portion 541 inside the protective cover 540. Then, as shown in FIG. 37a, when the slider 572 moves rearward along the guide shaft 571, a part of the slider 572 enters inside the protective cover 540. Therefore, the moving range of the slider 572 is not limited to the body 510, and the moving range of the slider 572 is effectively secured.

Figure 37B:
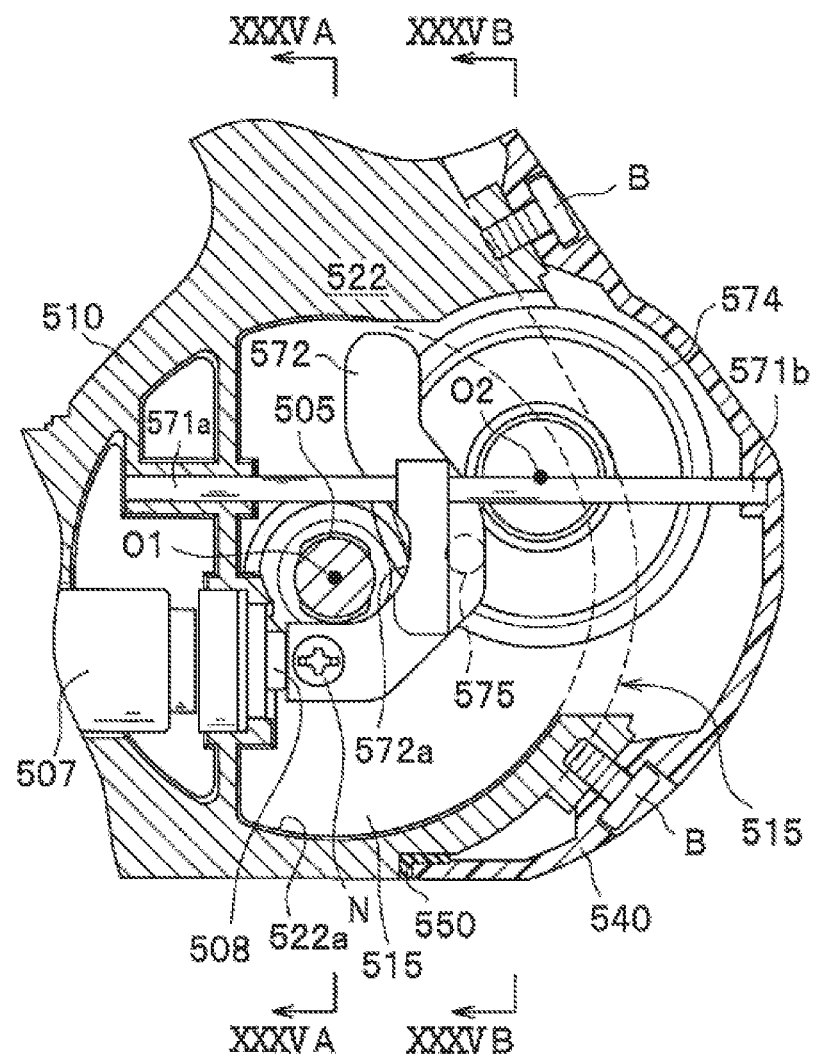
FIG. 37b is a sectional side view of the reel unit in which the slider is at the most front end position of the stroke.

A recess 572a recessed rearward is formed in a front surface (the surface that faces the handle shaft 505) of the slider 572. As shown in FIG. 37b, since the handle shaft 505 is received by the recess 572a when the slider 572 is moved forward, the moving range of the slider 572 is expanded toward the front.

As shown in FIG. 35, the lid 530 includes a lid portion 531 for closing the side opening portion 513 of the body 510, and a cylindrical cylinder portion 533 that projects from the inner surface (the right surface) of the lid portion 531 toward the right and is inserted into the side opening portion 513.

Figure 38A:
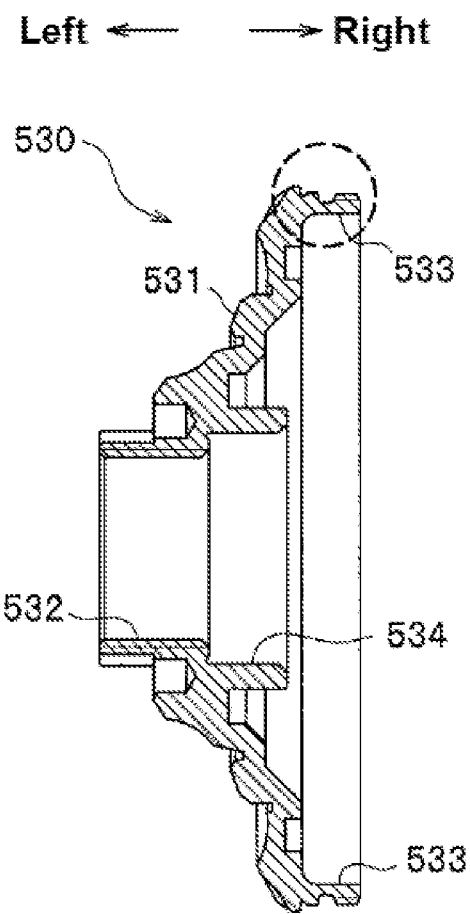
FIG. 38a is a transverse sectional view of the lid.
Figure 38B:
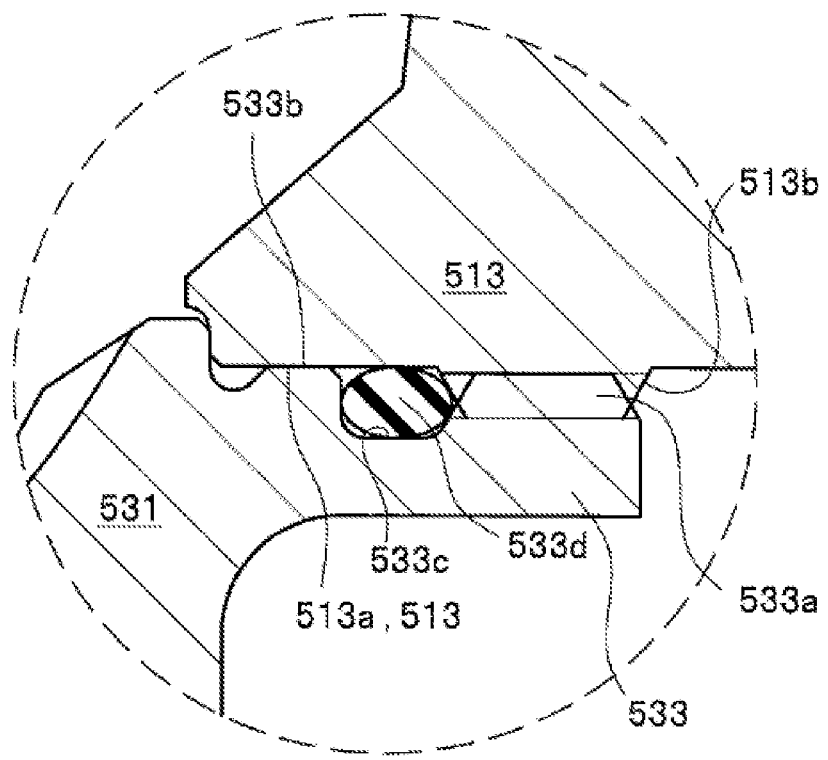

As shown in FIG. 33, the lid portion 531 has a circular shape as viewed from the side, and has a shape corresponds to the shape of the side opening portion 513. In the central portion of the lid portion 531, a cylindrical portion 532 which the handle 505a penetrates is formed. As shown in FIG. 38a, the lid portion 531 protrudes more to the left compared to the outer peripheral edge, and the cross-section of the lid portion 531 has a substantially mountain shape. Moreover at the central portion of the inner surface (right surface) of the lid portion 531, a cylindrical handle shaft support portion 534 is formed. A hearing 505d (see FIG. 35) for rotatably supporting the handle shaft 505 is fitted in the handle shaft support portion 534. Therefore, when the handle 505a is operated, the load acts on the handle shaft support portion 534.

A male screw 533a, a housing recess 533c, and an abutting surface 533b are formed on the outer peripheral surface of the cylindrical portion 533 in the stated order from the tip end side (the left end side) to the butt end side (the right end side).

The male screw 533a is screwed in a female screw 513b of the side opening portion 513 to threadably fix the lid 530 to the body 510. In other words, the reel unit 501 has a monocoque body in which the lid 530 and the body 510 are integrated as the lid 530 that supports the handle shaft 505 is screwed into the body 510.

The abutting surface (abutting portion) 533b abuts the inner peripheral surface 513a of the side opening portion 513 for adjusting the center of the lid 530 relative to the side opening portion 513 at the time of threadably mounting the lid 530 on the side opening portion 513. In this manner, the center of the right center hole 523 (see FIG. 36a) of the body 510 for supporting the right side of the handle shaft 505 corresponds to the center of the handle shaft support portion 534 of the lid 530 for supporting the left side of the handle shaft 505, and consequently the concentricity, is achieved. Thus, the handle shaft 505 is supported such that it extends in the right-left direction with respect to the reel unit 501, and the rotation of the handle shaft 505 becomes smooth.

Here, at the time of winding operation of the handle 505a, a load centering on the central axis O1 acts in the radially outward direction on the lid 534 that supports the handle shaft 505. In a conventional configuration, the lid is fixed to the body by a plurality of screws so that a load on the lid concentrates on the portions of the body where the female screws are situated and the female screws tend to be deformed. On the other hand, according to this embodiment, the entire circumference of the cylindrical portion 533 is supported by the circular side opening portion 513 via the male screw 533a and the abutting surface 533b. Therefore, the load acting on the cover member 530 is uniformly distributed over the entire circumference of the side opening portion 513, and therefore the side opening portion 513 is hardly deformed.

The housing recess 533c is a recess formed between the male screw 533a and the abutting surface 533b, and an O-ring 533d is fitted as a sealing material on the outer periphery of the housing recess 533c. Therefore, water is prevented from entering inside from between the cylindrical portion 533 and the side opening portion 513.

As described above, according to the aspect of the embodiment, the side opening portion 513 on which the lid 530 is threadably mounted is hardly deformed. Accordingly, it is possible to prevent the lid 530 threadably mounted on the side opening portion 513 from being loosed and therefore the mounting strength of the lid 530 is improved. Moreover, the strength of the body 510 with which the lid 530 is integrated by threadably fastened thereto is further improved. Further, at the side opening portion of a conventional body, the female screw in which a screw is engaged is formed as described above. However, according to the embodiment, such a female screw for the screw is not formed at the side opening portion 513 (the cylindrical portion 522). Therefore, it is possible to reduce the thickness of the body 510 (the cylindrical portion 522) and the body 510 is downsized. Further, since the interlocking gear (the drive member) 574 is disposed above the housing space that is formed by the body 510 and the protective cover 540, a dead space is minimized. In this way, the reel unit 501 is downsized.

Moreover, according to another aspect of the embodiment, it is possible to receive at least a portion of the components from the rear opening portion 515 and place in the rear space inside the body 510. Thus, it is possible to use a desired sized interlocking gear 574 without being limited to the size of the space within the body 510.

Figure 39:
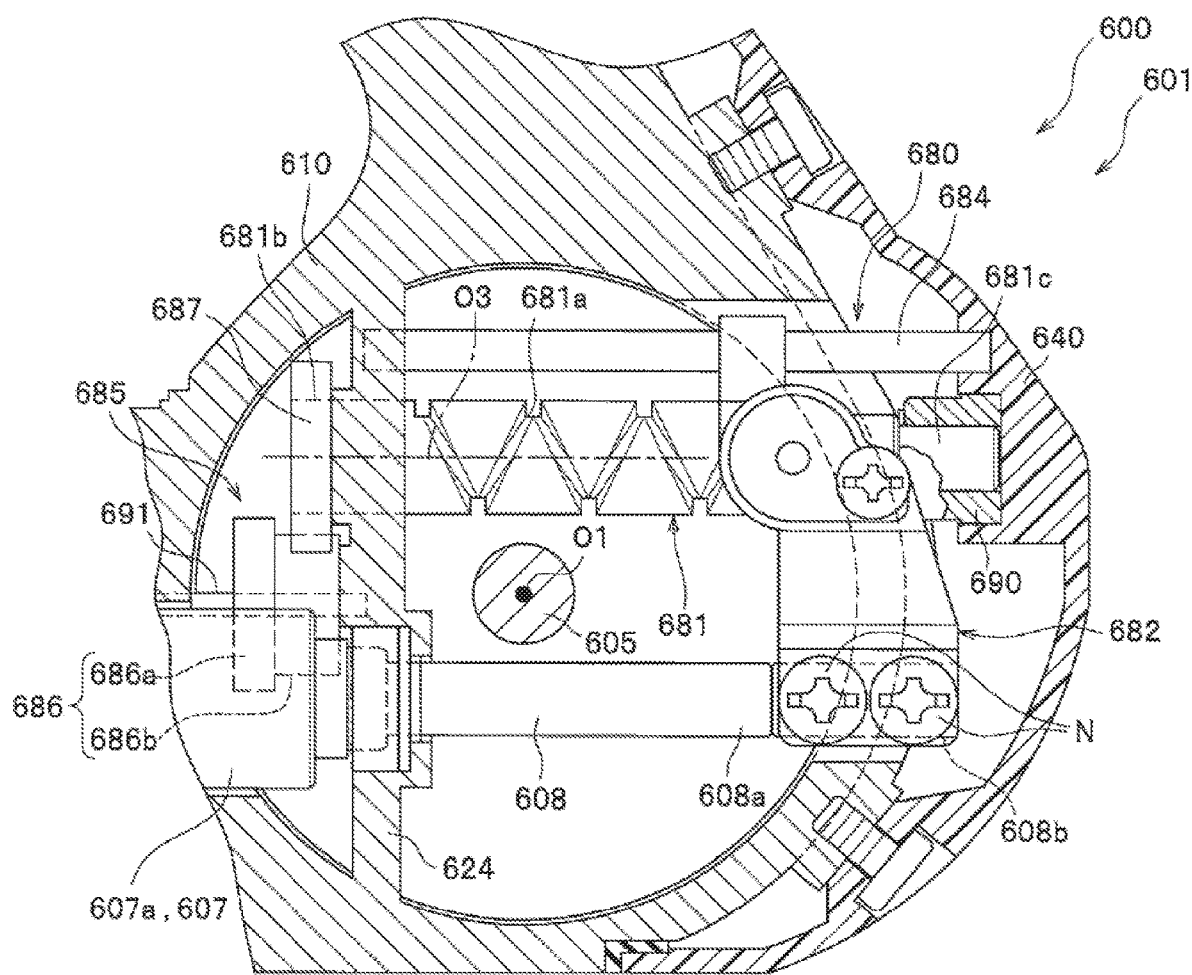
FIG. 39 is a sectional side view of a reel unit according to a modification example of the fourth embodiment.
Figure 40:
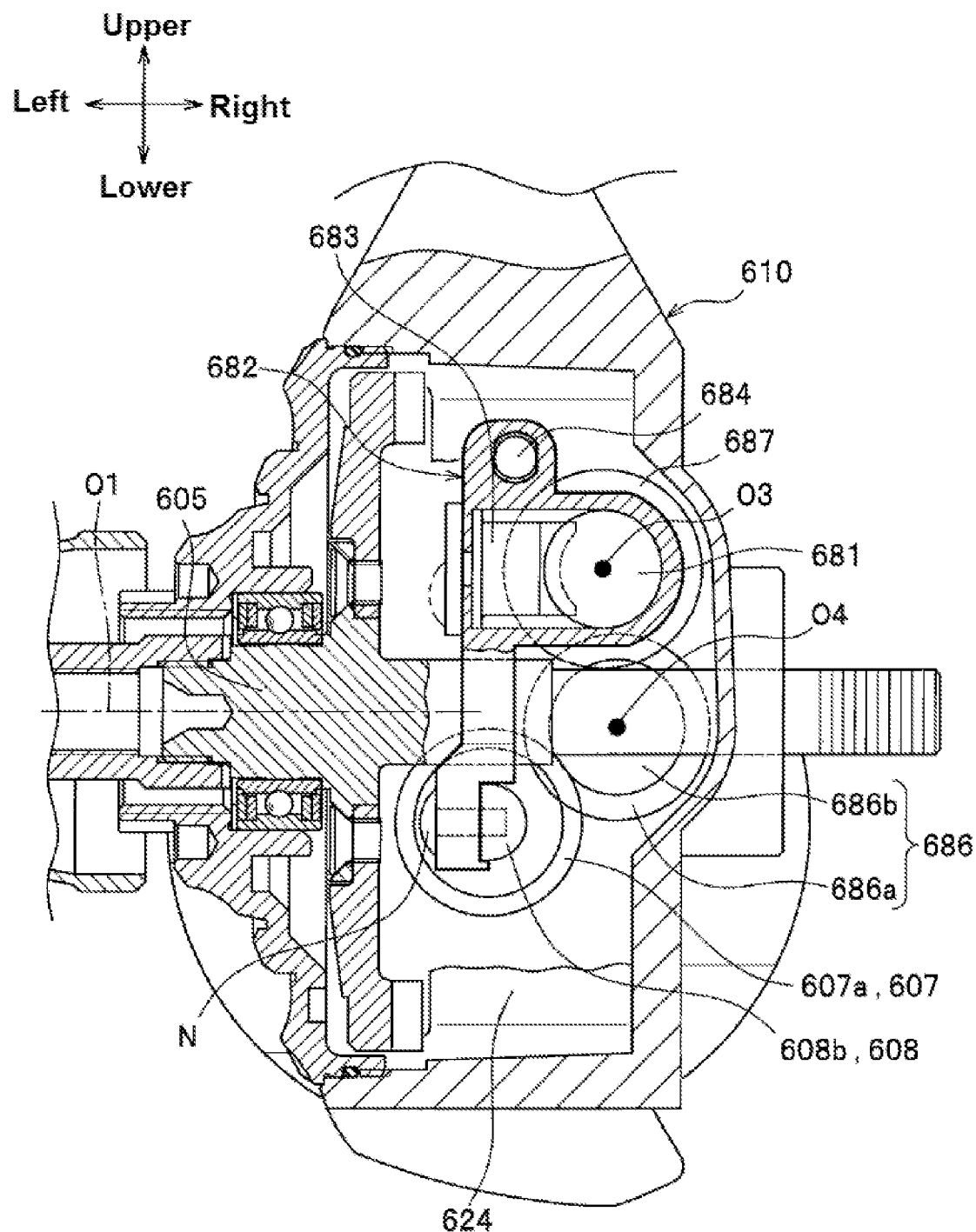
FIG. 40 is a rear sectional view showing the internal structure of the reel unit according to the modification example.

The spool reciprocating device 570 in the fourth embodiment is a gear oscillating type that uses the gear 506a and the interlocking gear 574. Alternatively it may use a worm shaft instead. A modification example in which a spool reciprocating device 680 using the worm shaft will be described with reference to FIGS. 39 and 40.

The spool reciprocating device 680 is a modification of the fourth embodiment. The spool reciprocating device 680 includes a worm shaft (drive member) 681 that extends parallel to the spool shaft 608, a slider 682 that rotatably supports an engaging member 683 (see FIG. 40) that engages with the worm shaft 681, a guide shaft 684 for guiding the slider 682 in the front-rear direction, and a reduction gear mechanism 685 interposed between the worm shaft 681 and the pinion gear 607a.

The worm shaft 681 has a columnar shape member having a helical groove 681a is formed on its outer peripheral surface. A front end 681b of the worm shaft 681 is supported by a rib 624, and a rear end 681c is supported by a collar 690 provided in a protective cover 640. The reference numeral "O3" in the drawing indicates the center of rotation of the worm shaft (the drive member) 681. Further, the front end 681b of the worm shaft 681 penetrates the rib 624 and protrudes from the rib 624 toward the front.

The worm shaft 681 extends in the front-rear direction above the handle shaft 605, the rotation center O3 of the worm shaft 681 is situated above the rotation center O1 of the handle shaft 605. In other words, the worm shaft 681 occupies a space which is the right side space in the body 610 and above the handle shaft 605. Therefore unnecessary space (dead space) is not created. Therefore, the lower housing space formed by the body 610 and the protective cover 640 can have a shape corresponding to the drive gear (not shown) and the slider 682, and thereby it is possible to reduce the size of the reel unit 601. Further, the worm shaft 681 is situated on the upper side so that the center of gravity of the fishing spinning reel 600 moves to the upper side (the fishing rod side), thereby the operability of the fishing spinning reel 600 can be improved.

A projecting portion 608b that projects from the rear end 608a of the spool shaft 608 toward the rear is fasted to the bottom portion of the slider 682 by a screw N. The engaging member 683 enters into the helical groove 681a of the worm shaft 681 and engages with the groove surface of the helical groove 681a. Therefore, when the worm shaft 681 is rotated, the engaging member 683 is pushed toward the front or rear, and the slider 682 and the spool shaft 608 that is coupled with the slider 682 reciprocate in the front-rear direction.

The reduction gear mechanism 685 includes a rotatable stepped gear 686 that is bridged between the rib 624 in the body 610 and the front portion of the rib 624, and an oscillating gear 678 that is unrotatably mounted to the front end portion 681b of the worm shaft 681. The stepped gear 686 includes a large diameter gear 686a that meshes with a pinion gear 607a formed in the rear portion of the drive shaft sleeve 607, and a small diameter gear 686b that meshes with the oscillating gear 687, and the large diameter gear and the small diameter gear are integrated to each other. With this reduction gear mechanism 685, the reciprocating motion of the spool shaft 608 in the front-rear direction relative to the winding operation of the handle 605a is relatively slow, and the interval between the fishing lines wound around the spool 603 becomes small. Therefore, the density of the fishing line wound around the spool 603 is increased (the interval becomes smaller), and the wound amount of the fishing line is increased.

According to the above modification example, the lower side of the housing space becomes small as the worm shaft (the drive member) 681 is disposed in the upper side of the housing space that is formed by the body 610 and the protective cover 640, and thereby the size of the reel unit 601 can be reduced.

Figure 41:
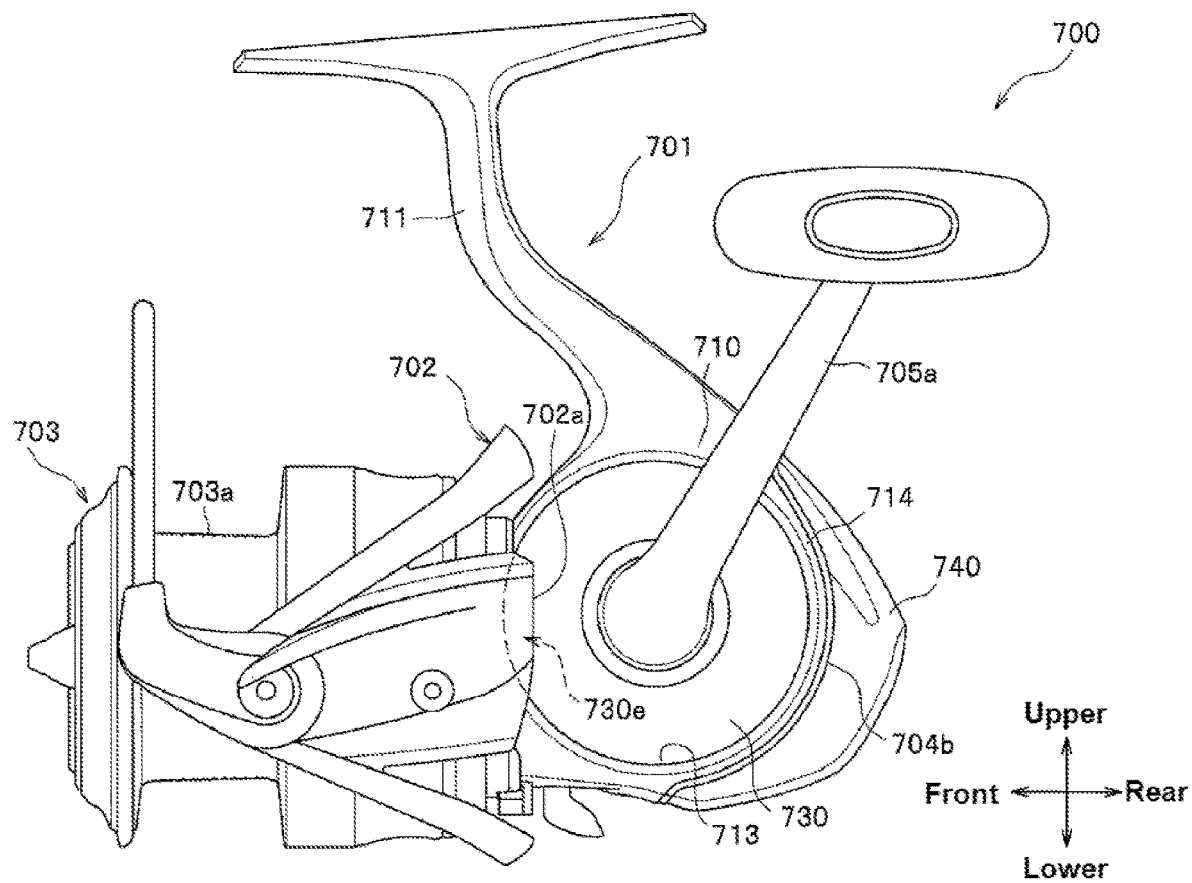
FIG. 41 is a side view of a fishing spinning reel according to a fifth embodiment of the invention to show its entire configuration.

Next, the fifth embodiment will now be described. As shown in FIG. 41, a fishing spinning reel 700 includes a reel unit 701, a rotor 702 rotatably disposed in front of the reel unit 701, and a spool 703 provided so as to be movable in the front-rear direction in synchronization with the rotation of the rotor 702.

Figure 42:
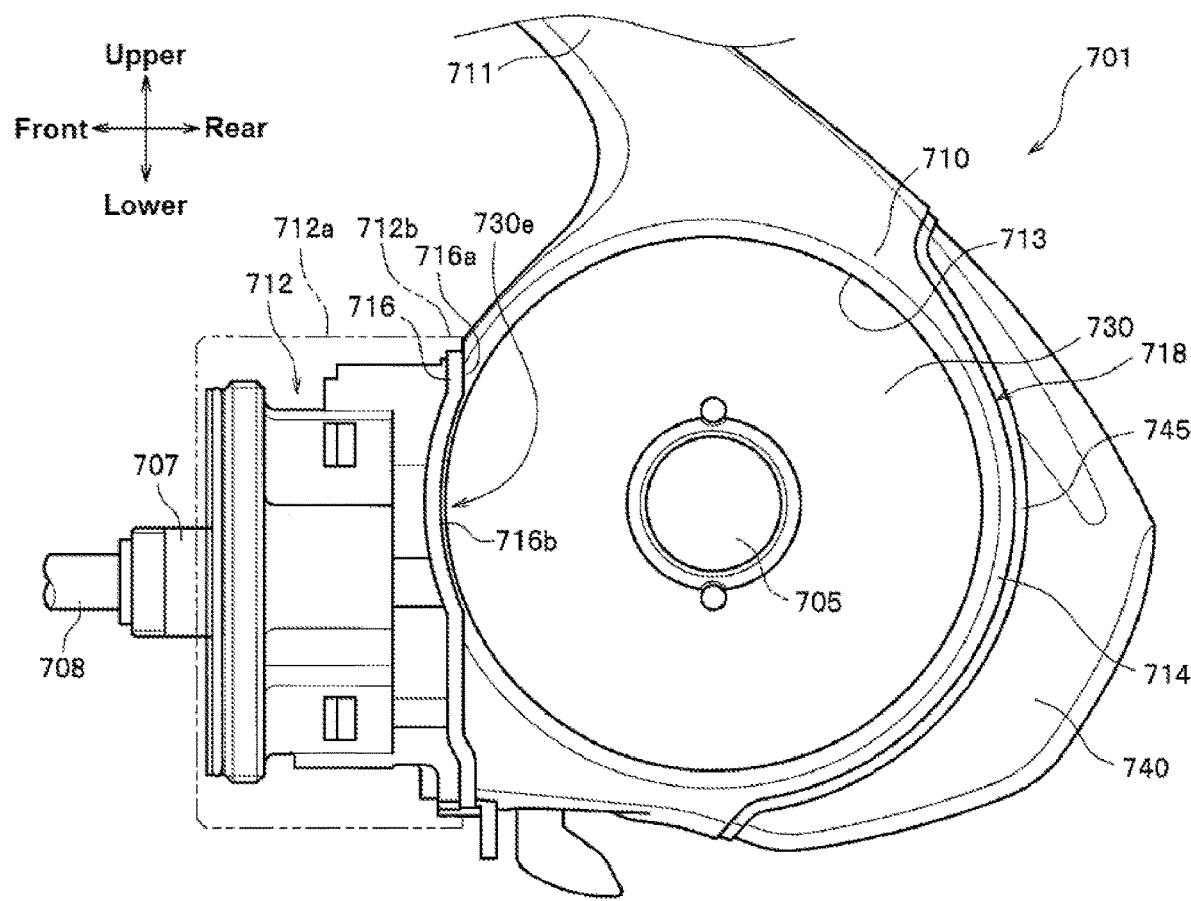
FIG. 42 is a side view of the reel unit.

As shown in FIG. 42, the reel unit 701 includes a body 710 whose shape is a substantially circle as viewed from the side, and a lid 730 for closing a side opening portion 713 formed in the left side portion of the body 710. The side opening portion 713 and the lid 730 are formed in circular shapes as viewed from the side. A leg portion 711 (see FIG. 41) that is to be attached to a fishing rod (not shown) is integrally formed on top of the body 710. A cylindrical body front portion 712 is provided in a front portion of the body 710. A protective cover 740 is mounted in a rear portion of the body 710 with a sealing member 745 interposed therebetween. The protective cover 740 is made of synthetic resin. In FIGS. 41 and 42, a side shape of the lid 730 is simplistically illustrated.

Figure 43:
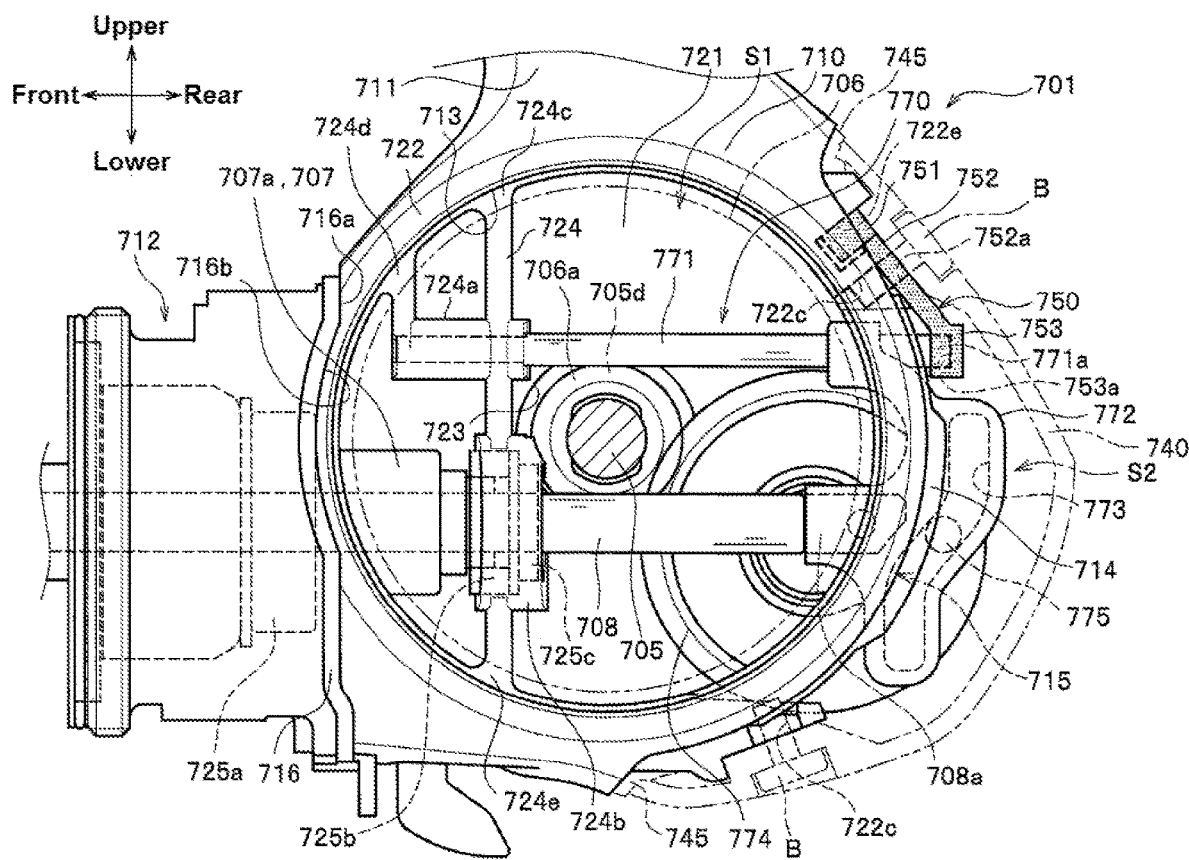
FIG. 43 is a side view of the reel unit from which the lid and the protective cover are removed.

As shown in FIG. 43, in the body 710, formed is the housing space S1 that is enclosed by a bottomed substantially cylindrical wall (an inner peripheral surface 722a of a cylindrical portion 722 which will be described later) and has the side opening portion 713 as an opening. A rear portion of a drive shaft sleeve 707, a rear portion of a spool shaft 708 where is inserted into the drive shaft sleeve 707, and a spool reciprocating device 770 that cause the spool shaft 708 (see the spool 703 in FIG. 41) to reciprocate in the front-rear direction are disposed in the housing space S1. The drive shaft sleeve 707 and the spool shaft 708 project from the body front portion 712 toward the front. The spool shaft 708 is disposed below the handle shaft 705. A pinion gear 707a is formed at a rear of the drive shaft sleeve 707. A rear portion of the spool shaft 708 extends rearward from the rear end of the pinion gear 707a (the drive shaft sleeve 707).

The spool reciprocating device 770 is an oscillating-gear type. The spool reciprocating device 770 includes a guide shaft 771 that extends in the front-rear direction, a slider 772 that moves along the guide shaft 771 and in which a concave guide groove 773 is formed on its right side surface, and the interlocking gear 774 provided with an eccentric projection 775 that engages with the guide groove 773. At the rear end of the spool shaft 708, a connecting portion 708a that protrudes rearward and is connected with the slider 772 is provided so that the spool shaft 708 and the slider 772 are integrated together. A rear end portion 771a of the guide shaft 771 is supported by the rear portion of the body 710 through a rear support member 750. In other words, the rear end portion 771a of the guide shaft 771 is supported to the body 710 without being supported by the protective cover 740. Details of the rear support member 750 will be described later.

Figure 45:
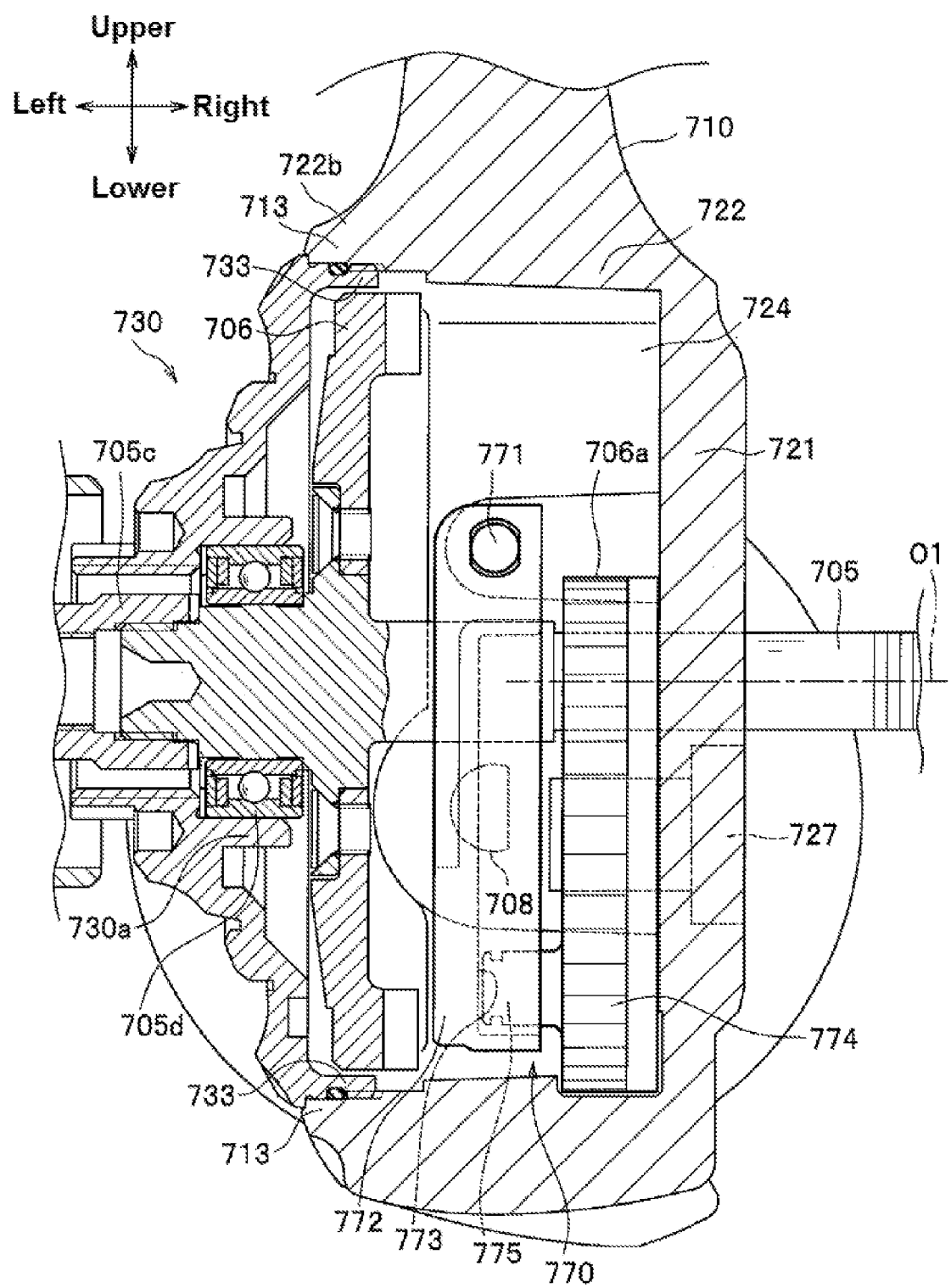
FIG. 45 is a rear cross-sectional view showing layout of the members inside the body.

As shown in FIG. 45, a handle shaft 705 that extends in the right-left direction is provided in the body 710. The handle shaft 705 is rotatably supported by the lid 730 and the body 710 through left and right bearings 705d (only the left bearing 305b is shown in FIG. 45, as for the right bearing 705d, see FIG. 43). The drive gear 706 and the gear 706a (see FIG. 43) are fixed to the handle shaft 705. A handle 705a (see FIG. 41) is coupled to a left end of the handle shaft 705 through a connecting shaft 705c.

The drive gear 706 is fixed to the left side of the handle shaft 705. The front side of the drive gear 706 is meshed with the pinion gear 707a. The gear 706a is fixed to the right side of the handle shaft 705. The rear side of the gear 706a is meshed with the interlocking gear 774 (see FIG. 43). Accordingly when a winding operation of the handle 705a is performed, a driving force generated by the winding operation is transmitted to the drive shaft sleeve 7 through the handle shaft 705, the drive gear 706, and the pinion gear 707a, which rotates the rotor 702 (see FIG. 41) together with the drive shaft sleeve 707. At the same time, the spool 703 (see FIG. 1) reciprocates in the front-rear direction through the spool shaft 708 and the spool reciprocating device 770. Consequently a fishing line is uniformly wound around a winding body 703a (see FIG. 41) of the spool 703 through a fishing line guide portion (not shown) of the rotor 702.

Figure 44A:
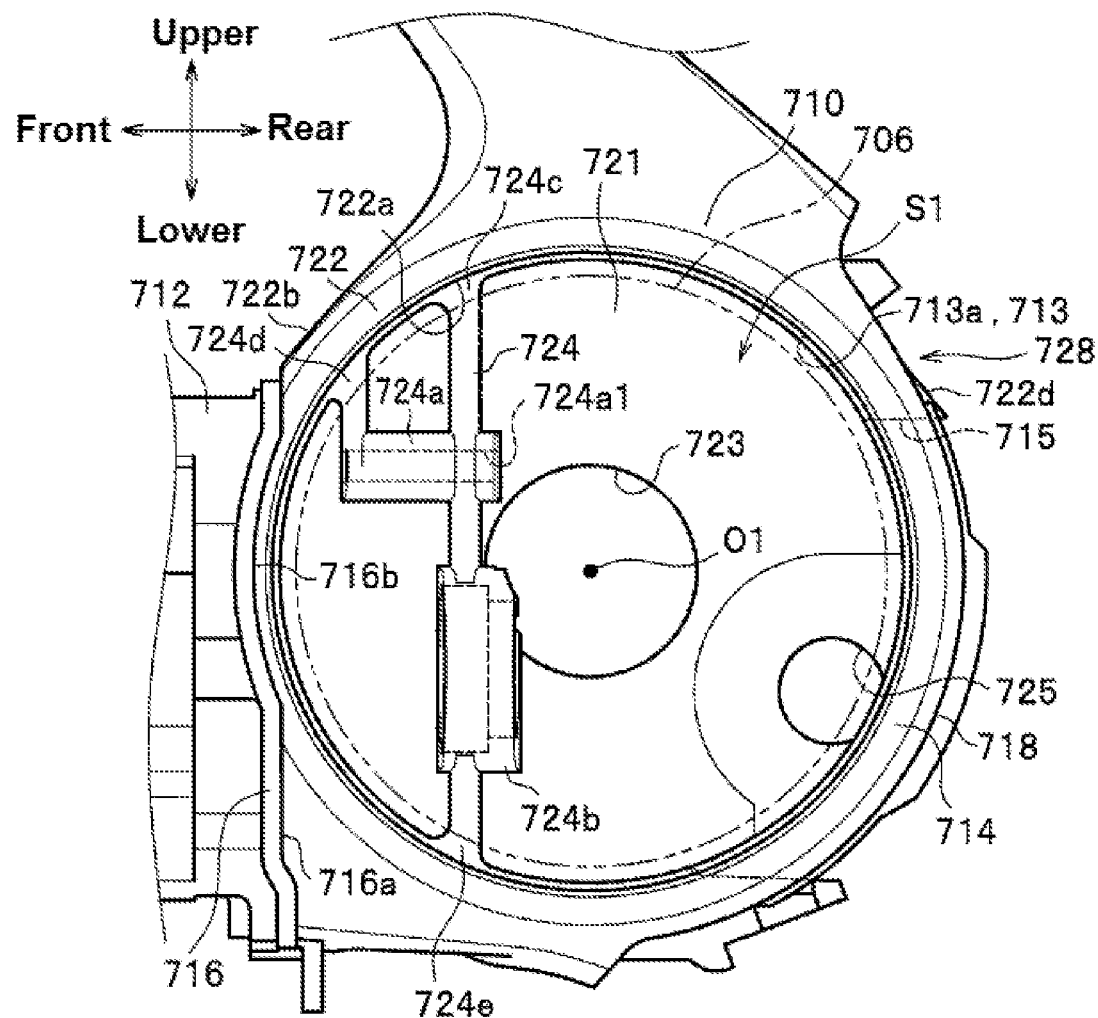
FIG. 44a is a side view showing the internal structure inside the side opening portion.

The structure of each portion will now be described in detail. As shown in FIGS. 44a and 45, the body 710 has a bottomed-box shape (cylindrical shape) that includes a peripheral wall at the bottom portion and opens toward the left side. The body 710 includes a circular disk shaped right wall portion 721, a cylindrical portion 722 that extends toward the left from the peripheral edge of the right wall portion 721. The left end portion of the cylindrical portion 722 forms the side opening portion 713.

As shown in FIG. 44a, a right side center hole 723, a support rib 724, and an insertion hole 725 are formed in an inner surface (a left side surface) of the right wall portion 721. The right center hole 723 (that serves as a support portion) is a hole through which the right end portion of the handle shaft 705 passes and is provided at the center portion of the right wall 721. The bearing 705d (see FIG. 43) is disposed in the right center hole 723 as a handle shaft bearing that rotatably supports the handle shaft 705. The right bearing 705d is mounted from the right side of the body 710 in the right center hole 723.

As shown in FIGS. 43 and 44a, the support rib 724 is integrally formed with the right wall portion 721 and protrudes therefrom, and disposed in the housing space S1. The support rib 724 is situated in front of the right center hole 723 and extends in the upper-lower direction. Upper end portions 724c, 724d and lower end portion 724e of the support rib 724 are coupled to the inner peripheral surface 722a of the cylindrical portion 21. In this way, the support rib 724 is also provided integrally with the cylindrical portion 722. The support rib 724 enhances the strength of the right wall portion 721 and the cylindrical portion 722. In the support rib 724, a cylindrical upper support portion 724a and a lower support portion 724b are integrally formed. A guide shaft supporting hole 724a1 for supporting the front end portion of the guide shaft 771 (see FIG. 43) is formed in the upper support portion 724a.

As shown in FIG. 43, a rear bearing (ball bearing) 725b is supported via a collar 725c in the lower support portion 724b. More specifically, the rear side of the pinion gear 707a (the rear of the drive shaft sleeve 707) is supported by the body 710 via the rear bearing 725b and the support rib 724, A rear portion of the spool shaft 708 penetrates to the rear side of the lower support portion 724b through the collar 725c.

The spool shaft 708 does not contact with the inner periphery of the pinion gear 707a with a small gap interposed therebetween. However the spool shaft 708 is supported slidably in the front-rear direction by a support portion (not shown) formed in the inner periphery of the pinion gear 707a on the front side and by the collar 725c that is supported by the lower support portion 724b of the body 710.

The upper support portion 724a and the lower support portion 724b are situated within the side opening portion 713. As shown in FIG. 43, the lower support portion 724b is disposed so as to overlap at least a portion of the right bearing 705d as viewed from the axial direction of the handle shaft 705. In this way, it is possible to reduce the inner space of the body 710 (the side opening portion 713). The rear bearing 725b may be disposed so as to overlap at least a portion of the right bearing 705d as viewed from the axial direction of the handle shaft 705.

As shown in FIG. 44a, the insertion hole 725 is formed on the rear side and below the right center hole 723, A boss (see FIG. 45) of a gear support member 727 that rotatably supports the interlocking gear 774 passes through the insertion hole 725. Thus, the interlocking gear 774 is arranged rotatably in the rear portion of the body 710.

As shown in FIG. 44a, the cylindrical portion 722 has a substantially cylindrical shape originating at the center O1 of the right center hole 723 where the right bearing 705d that supports the handle shaft 705 is fitted therein. More specifically an inner peripheral surface 722a of the cylindrical portion 722 is formed in a circular shape centering on the center O1 of the right center hole 723, and corresponds to the size of the drive gear 706. In other words, the inner peripheral surface 722a is a surface concentric with the outer peripheral surface of the handle shaft 705.

The outer peripheral surface 722b of the cylindrical portion 722 is formed in a substantially circular shape about the center O1 of the right center hole 723, and the thickness (radial thickness) of the cylindrical portion 722 is substantially uniform in the circumferential direction. Therefore the cylindrical portion 722 is downsized compared to a conventional cylindrical portion (the cylindrical portion having a rectangular cylindrical shape as viewed from the side), and there is no unnecessary space between the inner peripheral surface 722a of the cylindrical portion 722 and the drive gear 706.

An inner peripheral surface 713a of the left end portion (the side opening portion 713) of the cylindrical portion 722 is formed such that it has a substantially same diameter as the inner peripheral surface 722a of the cylindrical portion 722, so that even in the case of a relatively large drive gear 706, it can be easily mounted within the cylindrical portion 722. As shown in FIGS. 43, 44a, and 45, the inner diameter of the side opening portion 713 (the inner peripheral surface 713a) is larger than the outer diameter of the drive gear 706 (shown by the two-dot chain line in the drawing). In other words, the drive gear 706 is formed such that it has a diameter as large as the inner diameter of the side opening portion 713. The handle shaft 705, the drive gear 706, and the gear 706a are inserted into the housing space S1 through the side opening portion 713 are assembled to the body 710.

Figure 46A:
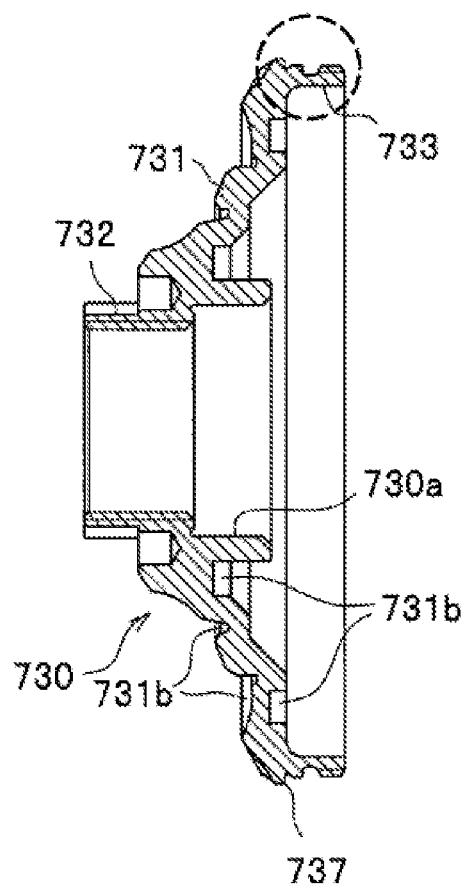
FIG. 46a is a transverse sectional view of the lid.
Figure 46B:
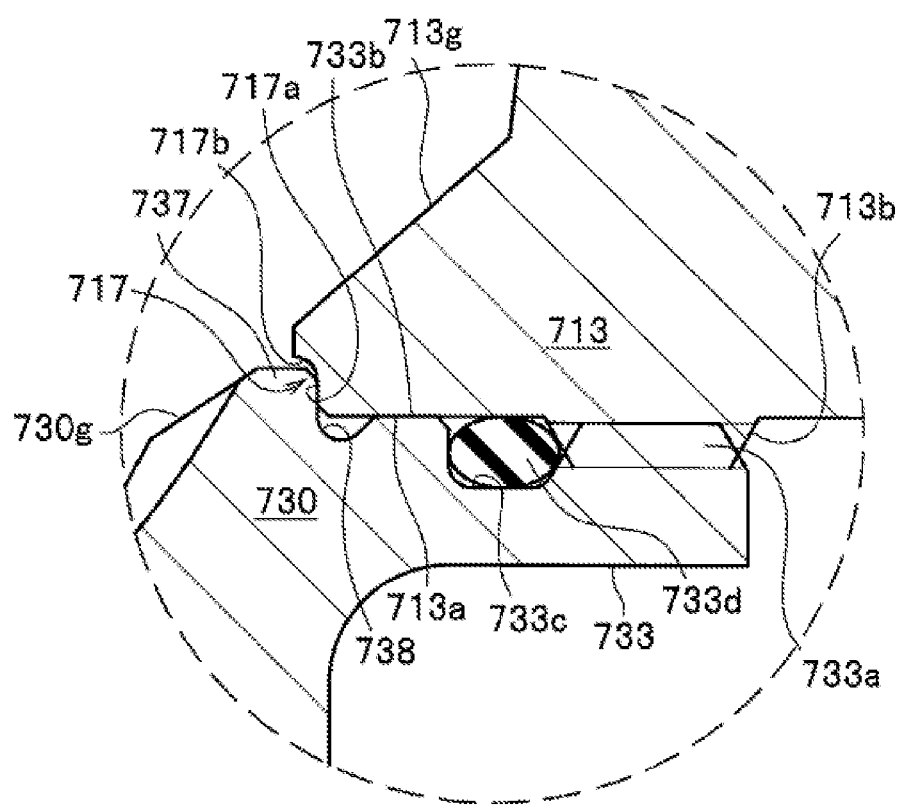
FIG. 46b is an enlarged sectional view showing the engagement state between the side opening portion in the body and a peripheral edge of the lid.

As shown in FIG. 46b, a female screw 713b is formed on the inner side of the inner peripheral surface 713a of the side opening portion 713. On the peripheral edge of the opening of the side opening portions 713, a fitting receiving portion 717 that has a concave shape in cross section is formed over the circumferential direction. The fitting receiving portion 717 includes a bottom surface 717a, and a rising portion 717b that rises from the bottom surface 717a and has a curved surface shape in cross section.

Figure 44B:
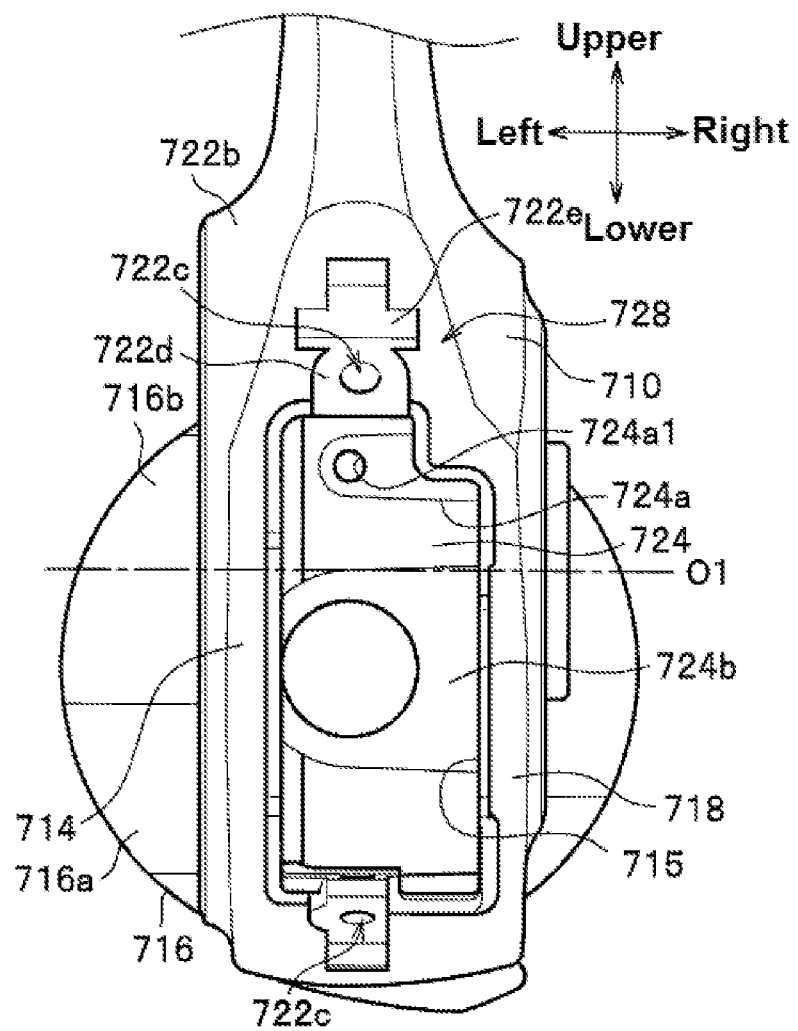
FIG. 44b is a rear view of the body from which the protective cover is removed.

As shown in FIG. 44b, a rear support member mounting portion 728 and a rear opening portion 715 are formed in the rear portion of the cylindrical portion 722. Screw holes 722c in which screws B for mounting the protective cover 740 are screwed are formed on upper and lower edges of the rear opening portion 715. The rear support member mounting portion 728 is portion where a rear support member 750 (see FIG. 43) is mounted. The rear support member mounting portion 728 includes a mounting seat 722d and an engaging recess 722e, A mounting surface of the mounting seat 722d is inclined toward the rear and downward along the circumferential direction of the cylindrical portion 722. As shown in FIG. 44b, an upper screw hole 722c is formed at a substantially central portion of the mounting seat 722d. The engaging recess 722e is a hole formed on the upper side of the mounting seat 722d. As shown in FIG. 43, the engaging recess 722e is recessed toward the front and downward along the axis of the screw hole 722c.

As shown in FIGS. 43, 44a, and 44b, the rear opening portion 715 penetrates the rear portion of the cylindrical portion 722 and communicates with the housing space S1 and an external space. The rear opening portion 715 is an opening for receiving a part of the component that is assembled in the body 710 and allowing a part of the component to be protrude from (outside) the body 710 toward the rear. The rear opening portion 715 penetrates only the central portion of the cylindrical portion 722 in the right-left direction so as to prevent the opening (aperture) of the rear opening portion 715 and the opening (aperture) of the side opening portion 713 from being connected to each other. Accordingly, an arc-shaped bridge portion 714 that forms the edges of the respective apertures of the side opening portion 713 and the rear opening portion 15 extends between the side opening portion 713 and the rear opening portion 715. Therefore, as compared with the case where the opening (aperture) of the rear opening portion 715 is continuous with the opening (aperture) of the side opening portion 713, the strength of the cylindrical portion 722 is improved.

As shown in FIG. 43, a portion of the interlocking gear 774 of the spool reciprocating device 770, a portion of the slider 772 when it is in the rearmost end position in its stroke, and a rear end portion 771a of the guide shaft 771 protrude rearward from the rear of the body 710 through the rear opening portion 715.

In other words, the rear opening portion 715 is sized and shaped such that it allows these members to be inserted and arranged therethrough. Since these members project toward the rear from the body 710 through the rear opening portion 715, the housing space S1 is formed into a compact size.

As shown in FIG. 44b, a cover mounting portion 718 is formed around the rear opening portion 715. The protective cover 740 is mounted on the cover mounting portion 718 with a sealing member 745 (see FIG. 48a) interposed therebetween. The protective cover 740 is fastened by the screws B that engage with the upper and lower screw holes 722c respectively to cover the rear opening portion 715 of the body 710 (the cylindrical portion 722).

The front surface of the protective cover 740 is recessed toward the rear. In other words, the protective cover 40 has a bottomed cylindrical shape that opens toward the front, and a housing space S2 is formed on the front surface side of the protective cover 40. A portion of the interlocking gear 774 and a portion of the slider 772 that project from the rear of the body 710 through the rear opening portion 715 are accommodated in the housing space S2. The rear opening portion 715 also serves as an assembly hole for assembling the spool shaft 708 and the components of the spool reciprocating device 770.

Figure 47A:
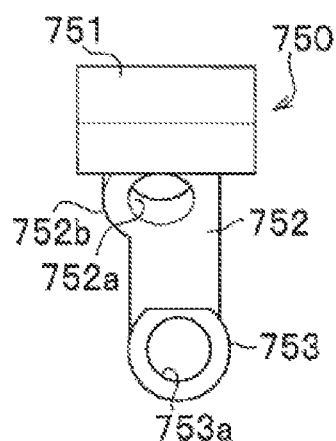
FIGS. 47a to 47h illustrate a rear support member.
Figure 47B:
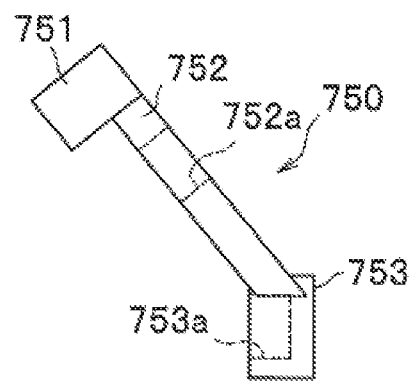
Figure 47C:
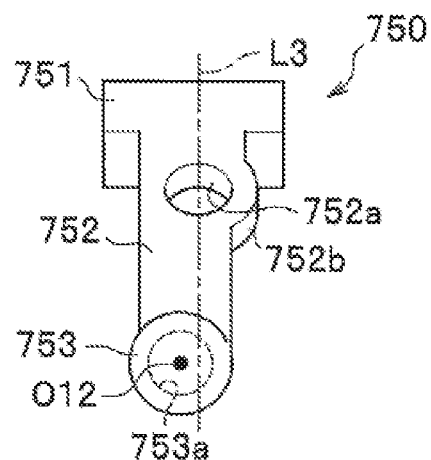
Figure 47D:
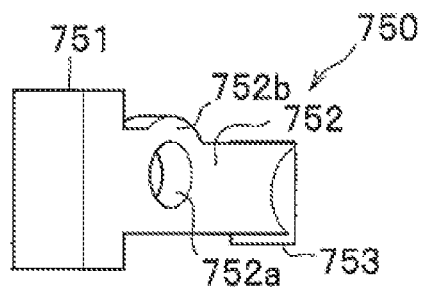
Figure 47E:
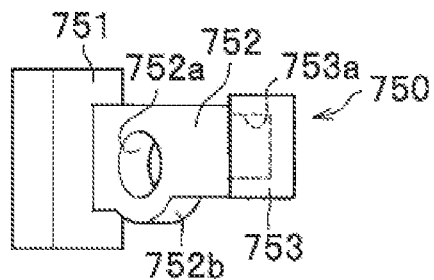
Figure 47F:
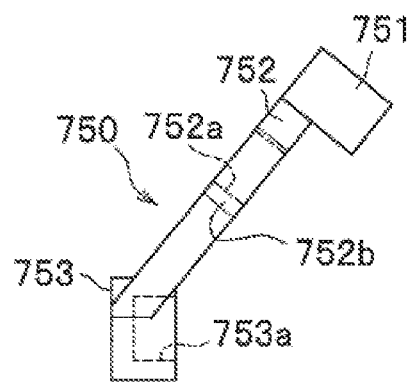
Figure 47G:
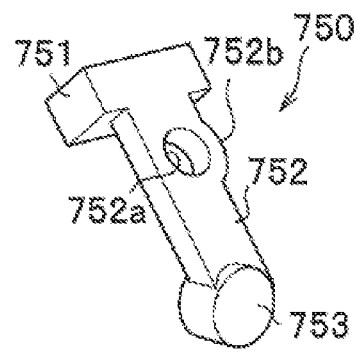
Figure 47H:
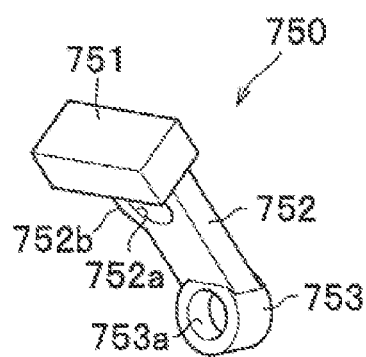
Figure 48A:
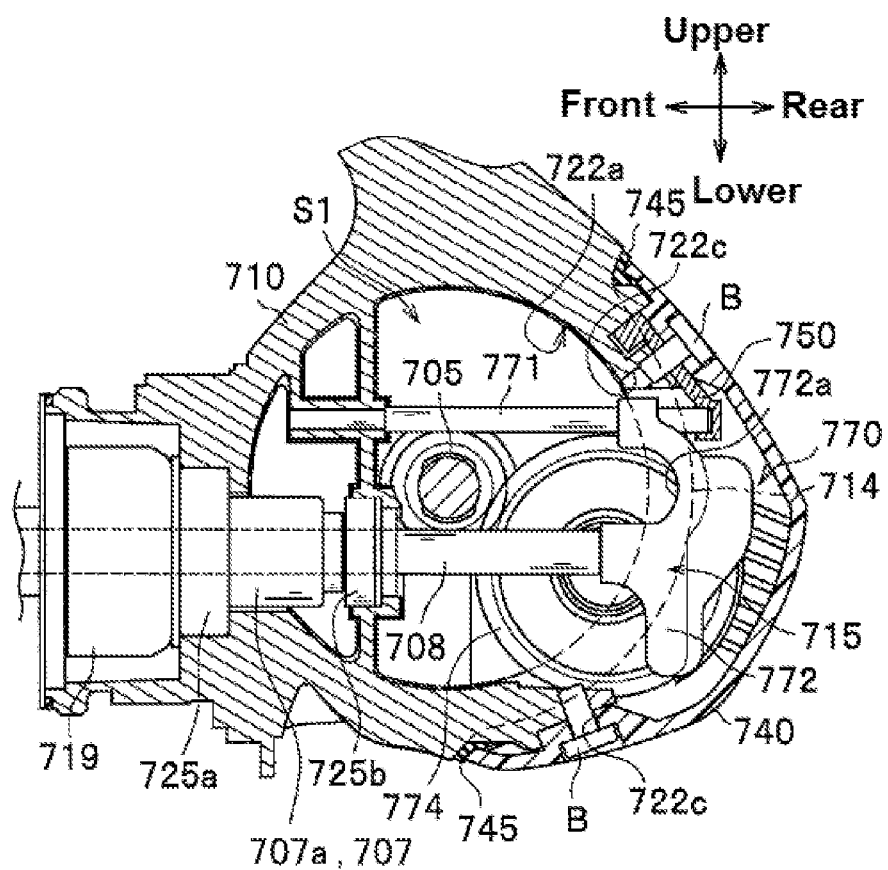
FIG. 48a is a sectional side view of the reel unit in which the slider is at the rearmost end position of a stroke.

Referring to FIGS. 43 and 48a, the rear end portion 771a of the guide shaft 771 that has a stick-like shape protrudes from the rear of the body 710 through the rear opening portion 715 and is supported by the rear support member 750. The rear support member 750 is made of metal. Referring to FIGS. 47a through 47g, the rear support member 750 includes an engaging portion 751, a mounting portion 752 that is formed continuously with the engaging portion 751, and a support portion 753 that is formed continuously with the mounting portion 752.

The engaging portion 751 has a rectangular parallelepiped shape, and it is inserted into and engaged in the engaging recess 722e of the rear support member mounting portion 728. The mounting portion 752 has a plate shape and it is mounted on the mounting seat 722d of the rear support member mounting portion 728. A through hole 752a is formed at a position corresponding to the screw hole 722c of the mounting seat 722d in the mounting portion 752. Beside the screw hole 722c in the mounting portion 752, an arcuate edge 752b along the circumferential direction of the screw hole 722c is formed so as to bulge therefrom. The screw B that fasten the protective cover 740 is inserted in the screw hole 722c. The mounting portion 752 is fixed to the rear portion (the mounting seat 722d) of the body 710 together with the protective cover 740 by tightening the screw B.

The support portion 753 has a bottomed cylindrical shape and includes a support space 753a that opens toward the front. As shown in FIG. 43, the rear end portion 771a of the guide shaft 771 is inserted in the support space 753a and engaged therewith. Thus, the rear end portion 771a of the guide shaft 771 is fixed directly to the body 710 via the rear support member 750 without the protective cover 740 interposed.

As shown in FIG. 47c, a center O12 of the support portion 753 is slightly closer to the left with reference to a reference line L3 (a reference line passing the center of the body 710) that penetrates the center of the insertion hole 752a of the mounting portion 752 as viewed from the rear. Therefore, as shown in FIG. 45, the slider 772 is moved along the guide shaft 771 by utilizing the space formed by the drive gear 706 without interfering with the gear 706a and the interlocking gear 774.

As shown in FIGS. 42 and 43, the bridge portion 714 has a circular arc shape that spans from the upper to the lower portion of the body 710 along the side opening portion 713 (the lid 730). The profile of the bridge portion 714 is substantially a circle concentric with the side opening portion 713 (the lid 730). As shown in FIG. 43, the bridge portion 714 forms a part of the opening edge portion of the side opening portion 713. The bridge portion 714 described above has a circular shape concentric with the side opening portion 713, however it is not limited thereto. The circular shape of the bridge portion 314 may be decentered toward the front or the rear relative to the center of the side opening portion 713 (the center of the handle shaft 705). Alternatively, the bridge portion 714 may be formed in a profile that has a linear portion in a side view.

Further, in the space formed by the body 10 and the protective cover 40 (the housing space S1 and the housing space S2), components of the spool reciprocating device 770 are arranged as follows. As shown in FIG. 43, the interlocking gear 774 is brought from the outside and the rear direction through the rear opening portion 715 and assembled to the body 710. In the assembled state, a portion (rear area) of the interlocking gear 774 protrudes from the rear opening portion 715 toward the rear and is housed within the protective cover 740. The interlocking gear 774 moves in conjunction with the slider 772 via the eccentric projection 775 and serves as a conversion driving member that converts the rotation of the handle shaft 705 into reciprocation of the spool shaft 708 in the front-rear direction.

The guide shaft 771 is disposed above the handle shaft 705 on a side opposite to the spool shaft 708 with reference to the handle shaft 705. As described above, the rear end portion 771a of the guide shaft 771 extends through the rear opening portion 715, and is supported by the rear portion of the body 710 (the mounting seat 722d) via the rear support member 750. Therefore, as shown in FIG. 48a, a portion of the slider 72 enters into the protective cover 740 when it moves toward the rear, and the moving range of the slider 2 is effectively secured.

Figure 48B:
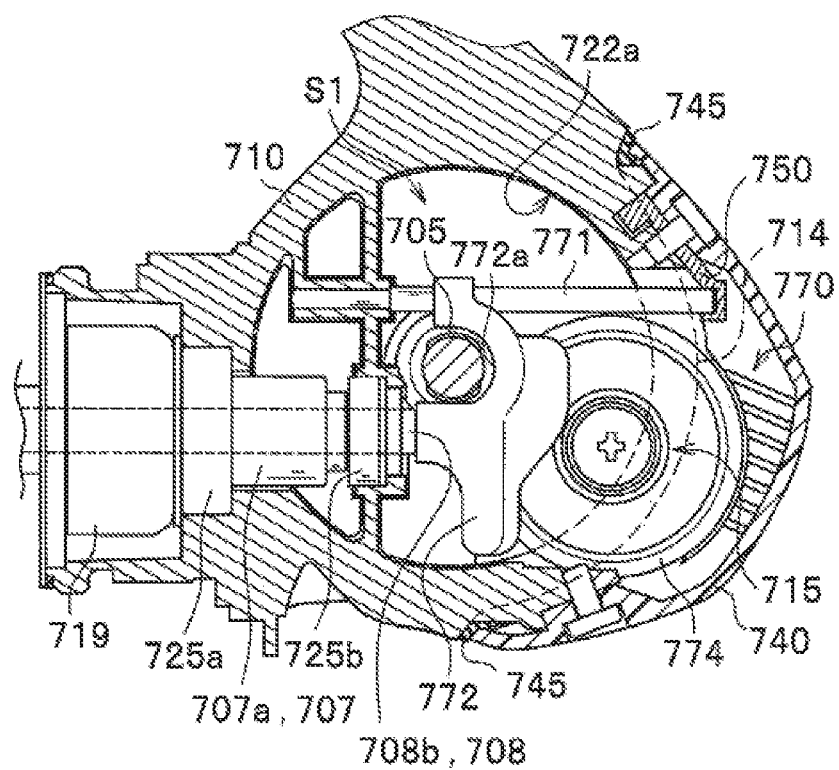
FIG. 48b is a sectional side view of the reel unit in which the slider is at the most front end position of the stroke.

A recess 772a recessed rearward is formed in the front surface (surface that faces the handle shaft 705) of the slider 772. As shown in FIG. 48b, since the handle shaft 705 is received by the recess 772a when the slider 772 is moved forward, the moving range of the slider 772 is expanded toward the front. As described above, the moving range (stroke) of the slider 772 is effectively secured while controlling the size increase of the body 710.

The lid 730 will now be described in detail. As shown in FIG. 42, the lid 730 is mounted on the side opening portion 713 to close the side opening portion 713 in a liquid tight manner. The lid 730 also serves to support the left end of the handle shaft 705. As shown in FIG. 46a, the lid 730 has a substantially mountain shape, and includes a peripheral wall portion 731, a cylindrical portion 732 formed in the central portion of the peripheral wall portion 731, and a cylindrical insertion portion 733 on the outer peripheral edge of the peripheral wall portion 731. The handle shaft 705 is supported at the center of the lid 730 (see FIG. 45).

Lightweight portions 731b are formed in the outer side surface (the left side surface) and the inner peripheral surface (the right side surface) of the peripheral wall portion 731 (see FIG. 46a). In this way, the weight of the lid 730 is reduced. The cylindrical portion 732 has a right side portion where its diameter is increased in a stepped manner and the bearing 705d (see FIG. 45) is housed in this enlarged diameter portion 730a. The lid 430 supports the left end of the handle shaft 705 through the bearing 705d.

The insertion portion 733 extends toward the side opening portion 713 to be inserted into the side opening portion 713. As shown in FIG. 46b, a male screw 733a is formed in an outer peripheral portion of a tip end (right end) of the insertion portion 733. The male screw 733a is threadably engagable with the female screw 713b of the side opening portion 713. Thus, it is possible to fix the lid 730 to the side opening portion 713 by screwing the lid itself; and therefore it is easy to perform attachment of the lid 730.

In the outer peripheral portion of the insertion portion 733 on the side closer to the butt end than the male screw 733a, a cylindrical contact surface (contact portion) 733b that contacts the inner peripheral surface (abutting portion) 713a of the side opening portion 713. The abutting surface 733b abuts the inner peripheral surface 713a of the side opening portion 713 in the circumferential direction when the lid 730 is mounted on the side opening portion 713 by screwing. Accordingly, the concentricity between the side opening portion 713 and the lid 730 is achieved Consequently, a gap is hardly formed between the side opening portion 713 and the lid 730 without increasing the machining accuracy. Further, since the center of the body 710 corresponds to the center of the lid 730, tilting of the handle shaft 705 is prevented. Therefore the rotation operability and meshing performance of the handle 705a are stabilized and improved. The abutting surface 733b may be configured to partially abut the inner peripheral surface 713a of the side opening portion 713 and only some portions of the abutting surface 733b may abut the inner peripheral surface 713a at intervals in the circumferential direction.

On the outer peripheral surface of the insertion portion 733, a housing recess 733c is formed between the male screw portion 733a and the abutting surface 733b. An O-ring 733d is fitted as a sealing material in the housing recess 733c.

In the outer peripheral edge portion of the lid 730, provided is a flange-shaped fitting portion 737 that extends circumferentially outward. The fitting portion 737 contacts the bottom surface 717a with a small gap between the rising portion 717b of the fitting receiving portion 717 of the side opening portion 713 (although there is the gap in the example shown in the drawing, full contact fitting is alternatively possible) to be spigot fitted in the fitting receiving portion 717. This spigot fitting curbs the amount of projection of the fitting portion 737 in the lateral direction. Thus, when the fishing line is loosened by reel operation or the like, the loosened fishing line is not easily caught on the outer peripheral edge of the lid 30. Further, the spigot fitting prevents dust and water from penetrating. Therefore, it is possible to prevent sea water, water, sand in the water, foreign substances and the like from entering inside. That is, it is possible to prevent a fishing line, seawater, foreign substances and the like from entering inside by the spigot fitted portion.

As shown in FIG. 46b, the outer surface 730g of the outer peripheral edge of the lid 730 and an outer surface 713g of the outer peripheral edge portion of the side opening portion 713 are configured as inclined surfaces that are substantially continues to each other with the fitting portion 737 (the fitting receiving portion 717) interposed therebetween. This structure makes a unwound fishing line less likely to be caught thereon.

As shown in FIG. 46b, a small diameter portion 738 that has a curved concave shape as viewed in cross section is formed between the fitting portion 737 and the abutting surface 733b. A lubricant such as grease or oil is applied on the small diameter portion 738. Therefore, smooth attachment of the lid 730 is possible with the lubricant, and the sealing performance between the inner peripheral surface 713a of the side opening portion 713 and the lid 730 is enhanced. Note that lubricant such as grease or oil may also be applied on the fitting receiving portion 717 and the fitting portion 737.

As described above, in this embodiment, the reel unit employs a monocoque body such that the lid 730 having the support portion for the handle shaft 705 is mounted on the side opening portion 713 of the body 710 by screwing to form a single body.

As shown in FIGS. 42 and 43, a flange portion 716 formed in a thin plate shape is provided at the boundary between the body 710 and the body front portion 712. As shown in FIG. 42, a concave portion 716b is formed in a left side portion of the flange portion 716. The concave portion 716b is recessed toward the front along the profile of a front end portion 730e of the lid 730. Since the concave portion 716b is provided, the front end portion 730e of the lid 730 is situated on front side compared to an upper rear surface 716a of the flange portion 716. As shown in FIG. 41, the front end portion 730e of the lid 730 is situated in front of a rearmost end portion 702a of the rotor 702 in the positional relationship between the rotor 702 and the lid 730. Further, as shown in FIG. 42, the front end portion 730e of the lid 730 is situated in front of a rear end portion 712b of a bottomed cylindrical cover 712a in the positional relationship between the lid 730 and the bottomed cylindrical cover 712a that covers the body front portion 712. By placing the front end portion 730e of the lid 730 in such a positional relationship, it is possible to increase the diameter of the lid 730 while reducing the dimension of the body 710 in the front-rear direction. The concave portion 716b serves as a clearance portion when the lid 730 is mounted.

As shown in FIGS. 42 and 43, a front bearing (ball bearing) 725a that supports the front side of the pinion gear 707a (see FIG. 43) (the front portion of the drive shaft sleeve 707) is disposed on the inner side of the body front portion 712. The drive shaft sleeve 707 extends toward the spool 703 (see FIG. 41), and the rotor 704 is attached at the tip end of the drive shaft sleeve.

According to the above embodiment, the rear support member 750 for supporting the guide shaft 771 which is a component of the spool reciprocating device 770, and the protective cover 740 for covering the rear portion of the body 710 are formed from separate members. Therefore, it is possible to select a shape and material specific to the function required for each so that there is a freedom of design. Moreover it is possible to stabilize the performance of the spool reciprocating device 770.

Further, it is possible to use the components with desired sizes by utilizing the rear opening portion 715, and to accommodate the components by the protective cover 740. Therefore it is possible to obtain a design freedom and to stabilize the performance of the spool reciprocating device 770.

Further, since the lid 730 itself is threadably fixed to the side opening portion 713 with a uniform fastening force over the circumferential direction, it is possible to sufficiently secure the affixing strength of the lid 730. This arrangement can increases the strength of the reel unit 701. Since the strength of the reel unit 701 is increased, it is possible to stabilize the performance of the spool reciprocating device 770. Moreover, the accuracy to support the handle shaft 705 is also improved and the improved accuracy is maintained. Moreover, the side opening portion 713 of the body 710 is reinforced by the lid 730 screwed therein, and the strength and rigidity of the body 710 itself are enhanced. Accordingly, it is possible to employ the drive gear 706 that has a large diameter as the drive gear 706 supported on the handle shaft 705. Furthermore, a plurality of screws for fastening the lid 730 to the body 710 can be made unnecessary. In this way, it is possible to reduce the number of components and improve ease of assembling and disassembling of the reel. In addition, it is also possible to prevent breakage of the screws.

Because the rear support member 750 is made of metal and the protective cover 740 is made of synthetic resin, a design freedom can be obtained and it is possible to stabilize the performance of the spool reciprocating device 770.

Next, a modification example of the fifth embodiment of the fishing spinning reel will now be described with reference to FIGS. 49 and 52, A difference between the modification example and the fifth embodiment is that a rear end portion 881b of a worm shaft 881 in the spool reciprocating device 880, and rear end portion 882a1, 882b1 of two upper and lower guide shafts 882a, 882b are supported by a rear support member 850. In FIGS. 52b to 52f, bottomed recesses 855 to 857 are shown by the broken lines.

Figure 49:
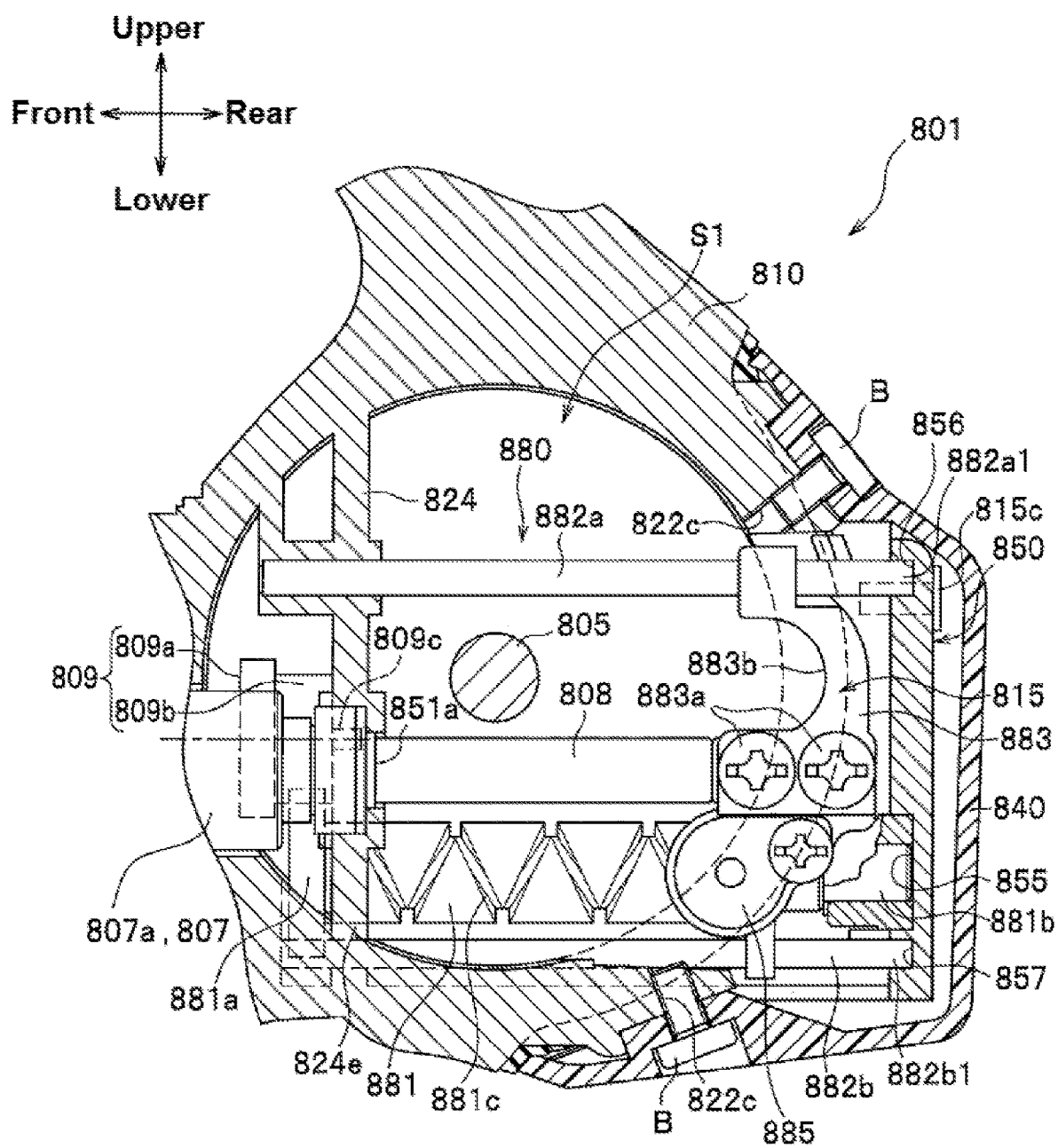
FIG. 49 is a sectional side view of a fishing spinning reel according to a modification example of the fifth embodiment to show its major components.

Referring to FIG. 49, the spool reciprocating device 880 is a worm shaft type and includes the worm shaft 881, a slider 883, and the upper and lower guide shafts 882a, 882b. The worm shaft 881 extends in parallel with the spool shaft 808. An oscillating gear 881a is provided on a front end portion of the worm shaft 881. The oscillating gear 881a is engaged with a reduction gear 809 that serves as a reduction gear mechanism. The rear end portion 881b of the worm shaft 881 is supported by the rear portion of the body 810 through the rear support member 850.

Figure 50:
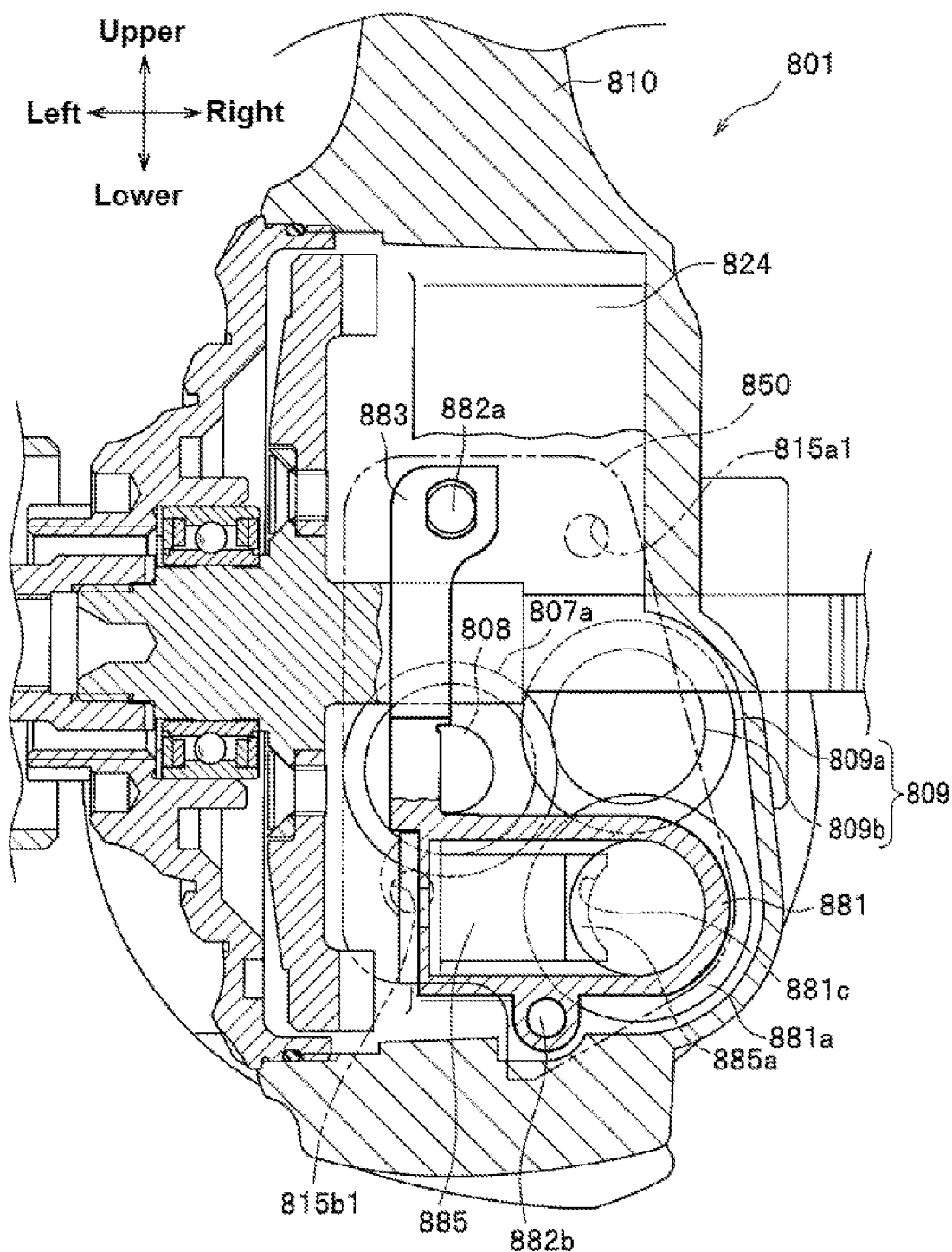
FIG. 50 is a rear cross-sectional view showing layout of the members inside the body.

The reduction gear 809 is a stepped gear including a large diameter gear 809a that meshes with a pinion gear 807a, and a small diameter gear 809b that has a smaller number of teeth than the large diameter gear 809a and meshes with the oscillating gear 881a. The reduction gear 809 rotates around a support shaft 809c that extends parallel to the pinion gear 807a. The support shaft 809c is cantilever-supported by a support rib 824. As shown in FIG. 50, the reduction gear 809 is disposed on the upper right sick of the spool shaft 808. The worm shaft 881 is disposed below the reduction gear 809 and on the lower right side of the spool shaft 808.

The large diameter gear 809a is a helical gear meshed with the pinion gear 807a. The small diameter gear 809b is a spur gear which meshes with the oscillating gear 881a. The large diameter gear 809a has substantially the same diameter as the pinion gear 807a, the small-diameter gear 809b has a smaller diameter than the oscillating gear 881a and has the number of teeth smaller than the oscillating gear 881a. Therefore, when the handle (see FIG. 41) is rotatably operated, the rotation of the pinion gear 807a is reduced by the reduction gear 809 and then transmitted to the oscillating gear 881a. Thus, the oscillating gear 881 is rotationally driven at a reduced speed.

As shown in FIG. 49, the worm shaft 881 has a spiral cam groove 881c formed in the outer circumferential surface thereof along the axial direction, and an engaging pawl 885a (see FIG. 50) of an engaging pin 885 that is retained by the slider 882 is engaged in the cam groove 881c. The rear end portion 881b of the worm shaft 881 is inserted into a worm shaft engaging hole 855 of the rear support member 850 and is engaged therein.

The slider 883 is attached to a rear end portion of the spool shaft 808 by two screws 883a and moves along the upper and lower guide shafts 882a, 882b. A recess 883b recessed rearward is formed in a front surface (the surface that faces the handle shaft 805) of the slider 883. Since the handle shaft 805 is received by the recess 883b when the slider 883 is moved forward, the moving range of the slider 883 is expanded toward the front. As described above, the moving range (stroke) of the slider 883 is effectively secured while controlling the size increase of the body 810.

The rear end portion 882a1 of the upper guide shaft 882a and the rear end portion 882b1 of the lower guide shaft 882b are both supported by the rear support member 850. The rear end portion 882a1 of the upper guide shaft 882a is inserted into an upper engaging hole 856 of the rear support member 850 and engaged therein. The rear end portion 882b1 of the lower guide shaft 882b is inserted into a lower engaging hole 857 of the rear support member 850 and engaged therein.

Figure 51:
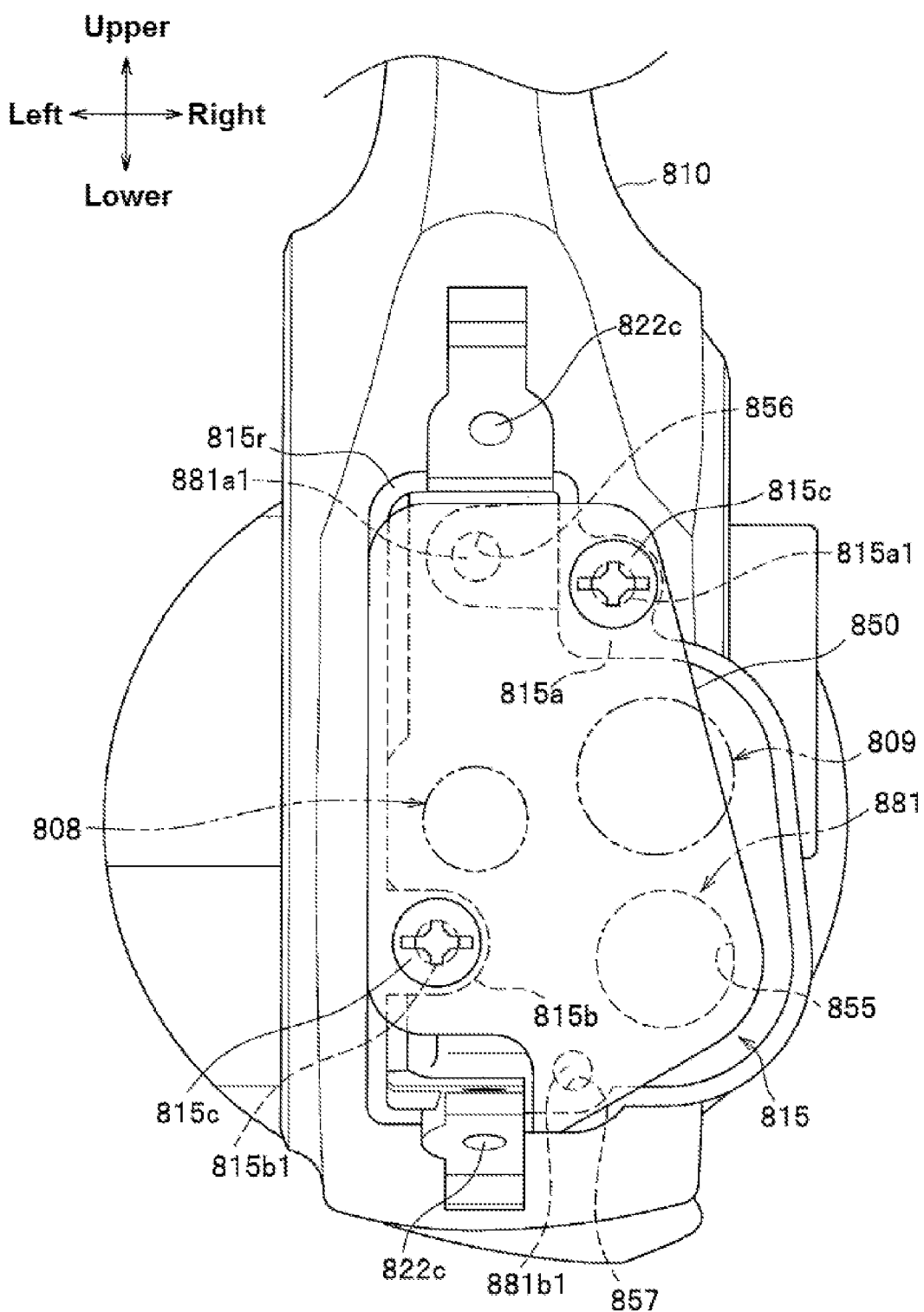
FIG. 51 is a rear view of the reel unit from which the lid and the protective cover are removed.

The rear support member 850 is made of metal. As shown in FIG. 51, the rear support member 850 is attached so as to partially cover the rear opening portion 815 of the body 810. In this modification example, the rear portion of the body 810 is designed in a vertical shape, and the rear opening portion 815 opens in the substantially vertical plane. The lower right portion of the rear opening portion 815 is bulged toward the right as viewed from the rear so as to correspond to the layout of the reduction gear 809 and the worm shaft 881. A rib 815r is formed in the peripheral edge portion of the rear opening portion 815. Thus, the rear opening portion 815 is surrounded by the rib 815r.

Figure 52A:
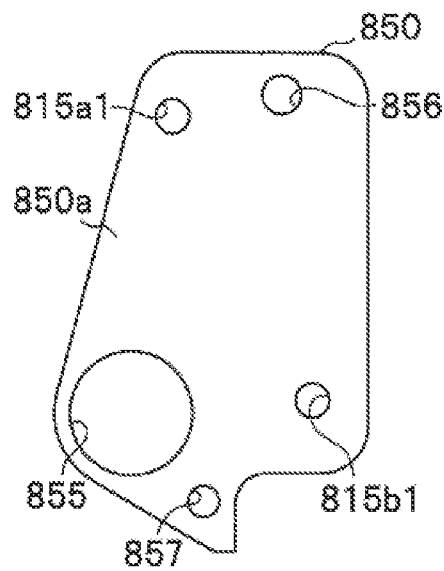
FIGS. 52a to 52h illustrate a rear support member applied to the modification example of the fifth embodiment.
Figure 52B:
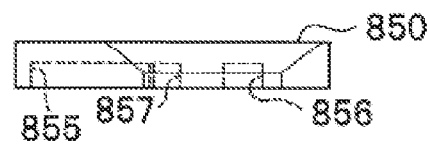
Figure 52C:
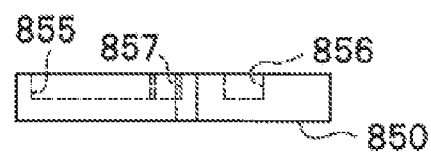
Figure 52D:
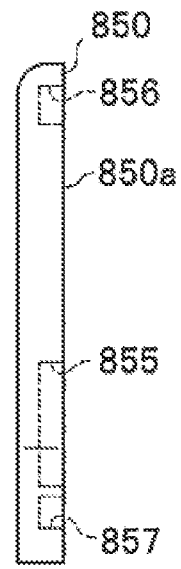
Figure 52E:
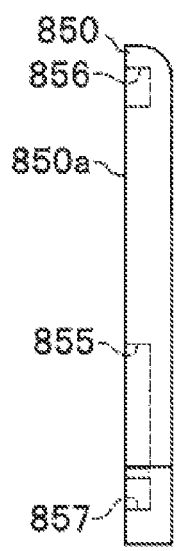
Figure 52F:
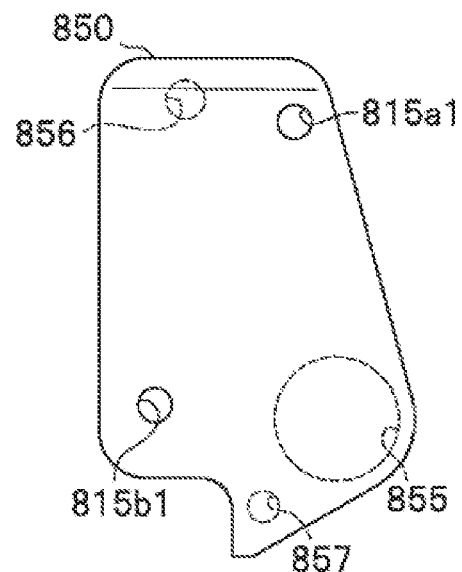
Figure 52G:
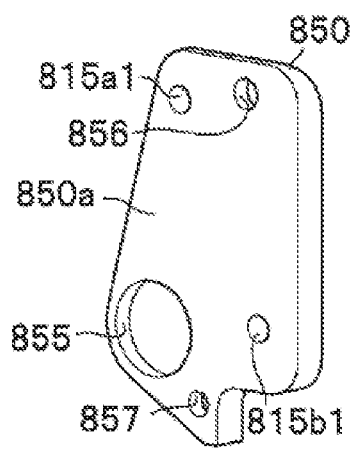
Figure 52H:
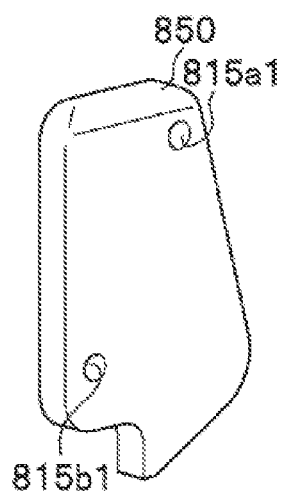

As shown in FIGS. 52a to 52h, the lower right portion of the rear support member 850 extends toward the right along the profile of the rear opening portion 815. As shown in FIG. 52a, the worm shaft engaging hole 855, the upper engaging hole 856, and the lower engaging hole 857 are formed in the front surface 850a of the rear support member 850. The worm shaft engaging hole 855, the upper engaging hole 856, and the lower engaging hole 857 are formed in bottomed cylindrical shapes that correspond to the worm shaft 881, the guide shaft 882a, and the guide shaft 882b respectively.

Screw holes 815a1, 815b1 are formed in the upper and lower portions of the rear support member 850. The rear support member 850 provides the screw holes 815a1, 815b1 through which fixing screws 815c, 815c (see FIG. 51) are inserted. Then, the fixing screws 815c, 815c are screwed into the screw holes formed in the bosses 815a, 815b of the rear opening portion 815, and in this way the rear support member 850 is fixed to the rear of the body 810.

The protective cover 840 is fastened by the screws B screwed in upper and lower screw holes 822c and fixed so as to cover the rear opening portion 815 of the body 810 and the rear support member 850.

According to the above modification example, the rear support member 850 for supporting the worm shaft 881 and the guide shafts 882a, 882b which are the components of the spool reciprocating device 880, and the protective cover 840 for covering the rear portion of the body 810 are formed by separate members, so that it is possible to select an appropriate shape and material specific to the respective functions required. Therefore, it is possible to select a shape and material specific to the function required for the rear support member 850 and the protective cover 840 respectively so that there is a freedom of design. Moreover it is possible to stabilize the performance of the spool reciprocating device 880.

Moreover since the worm shaft 881 and the guide shafts 882a, 882b can be maintained in parallel to each other with a high accuracy, it is possible to stabilize the performance of the spool reciprocating device 880.

Although the rear support members 750, 850 are made of metal in the above examples, it is not limited thereto. Alternatively they may be made of synthetic resin. Although the protective covers 740, 840 are made of a synthetic resin in the above examples, it is not limited thereto. Alternatively they may be made of metal.

The rear support member 750 of the fifth embodiment and the rear support member 850 of the modification example have a structure in which it supports the rear end portion 771a, 871a of the guide shaft 771, 871 in the protective cover 740, 840, in other words, they support the rear end portion outside the rear opening portion 715, 815. Alternatively, it may be configured to support the rear end portion in the inner side of the rear opening portion 715, 815 or in the housing space S1.

LIST OF REFERENCE NUMBERS 100, 300, 500, 700 fishing spinning reel
1, 101, 101A to 101C, 301, 401, 600, 701 reel unit
6, 306, 506, 706 drive gear
6a, 306a, 506a, 706a gear
7, 307, 507, 607, 707 drive shaft sleeve
8, 308, 408, 508, 608, 708, 808 spool shaft
10, 110, 110A to 110D, 310, 410, 510, 610, 710, 810 body
13, 113, 113A to 113C, 313, 513, 713 side opening portion
14, 314, 514, 714 bridge portion
15, 315, 415, 515, 715, 815 rear opening portion
21, 322, 522, 722 cylindrical portion
22, 321, 521, 721 right wall portion
24, 324, 424, 524, 624 rib (support rib)
26, 61, 727 gear support member
30, 130, 130A to 130D, 330, 430, 530, 730 lid
40, 340, 440, 540, 640, 740, 840 protective cover (cover member)
50, 350, 550, 745 sealing member 70, 370, 480, 570, 680, 770, 880 spool reciprocating device
180, 180A to 180C metal member
750, 850 rear support member
S1 housing space
S2 housing space

What is claimed is:

1. A fishing spinning reel, comprising:
a reel unit; and
a rotor rotatably supported by the reel unit, wherein
the reel unit includes:
a body having a side opening portion and in which a spool reciprocating device is housed and supported;
a lid closing the side opening portion; and
a cover member mounted on a rear portion of the body,
wherein a handle shaft is rotatably supported by the body and the lid,
in the rear portion of the body, a rear opening portion for receiving at least a part of a component of the spool reciprocating device and disposing the component on a rear side is formed, and
the cover member covers the rear opening portion and the component, and
wherein the body has a bridge portion extending between the side opening portion and the rear opening portion and forms edges of apertures of the side opening portion and the rear opening portion.

2. The fishing spinning reel of claim 1, wherein
the side opening portion and the lid are formed in circular shapes.

3. The fishing spinning reel of claim 2, wherein
a female screw portion is provided in the side opening portion,
a male screw portion is provided in the lid, and
the lid is detachably fastened to the side opening portion by screwing.

4. The fishing spinning reel of claim 2, wherein the lid has an abutting portion abutting an inner peripheral surface of the side opening portion to obtain the concentricity between the side opening portion and the lid.

5. The fishing spinning reel of claim 2, wherein at least a part of an outer peripheral edge portion of the lid is situated in front of a rear most surface of the rotor.

6. The fishing spinning reel of claim 5, wherein
the reel unit includes a body front portion disposed in front of the body, the body front portion includes a flange closing the rear opening portion of the rotor, and
the flange has a concave portion that corresponds to the side opening portion.

7. The fishing spinning reel of claim 1, further comprising:
a spool shaft supported by the reel unit slidably in a front-rear direction, a rear portion of the spool shaft situated inside the body,
wherein, the spool reciprocating device includes a slider moving in the front-rear direction together with the spool shaft in conjunction with rotation of the handle shaft, and a guide shaft slidably guiding the slider in the front-rear direction,
the side opening portion and the lid are formed in circular shapes,
the rear portion of the spool shaft is disposed on an upper side and the guide shaft is disposed on a lower side with reference to the handle shaft, and
a concave portion receiving at least a part of the handle shaft is formed in a portion of the slider that faces the handle shaft.

8. The fishing spinning reel of claim 1, further comprising:
a gear support member separately formed from the reel unit and supporting a gear of the spool reciprocating device,
wherein the gear support member is mountable on a mounting portion provided on an inner side portion or an outer side portion of the reel unit.

9. The fishing spinning reel of claim 8, wherein the gear is mounted on the reel unit through the rear opening portion.

10. The fishing spinning reel of claim 8, wherein the gear support member is inserted together with the gear into the reel unit through the rear opening portion and mounted on a mounting portion provided on an inner side portion of the reel unit.

11. The fishing spinning reel of claim 8, wherein
the spool reciprocating device includes:
an interlocking gear meshing and rotating with a gear provided on the handle shaft; and
a slider mounted on a rear end portion of a spool shaft and engaged with an eccentric protrusion provided eccentrically from a rotation center of the interlocking gear,
wherein the gear is the interlocking gear.

12. The fishing spinning reel of claim 1 wherein the side opening portion and the lid are formed in circular shapes, and
the fishing spinning reel further comprising:
a female screw portion provided on an inner peripheral portion of the side opening portion:
a male screw portion provided on an outer peripheral portion of the lid and engaged with the female screw portion;
a fitting receiving portion provided on a peripheral edge of the opening of the side opening portion; and
a fitting portion provided on an outer peripheral edge of the lid and spigot fitted in the fitting receiving portion.

13. The fishing spinning reel of claim 1, further comprising:
an attachment member attached to an opening portion provided in the reel unit; and
an annular sealing member disposed between the opening portion and the attachment member,
wherein a projecting portion that bites the sealing member is provided on at least one of a peripheral edge of the opening portion or a peripheral edge of the attachment member.

14. The fishing spinning reel of claim 13, wherein a restricting portion restricting the sealing member from moving relative to the opening portion and the attachment member is provided on at least one selected from a group consisting of the opening portion, the attachment member, and the sealing member.

15. The fishing spinning reel of claim 13, wherein
the opening portion is the rear opening portion, and
the attachment member is the cover member.

16. The fishing spinning reel of claim 13, wherein
the opening portion is the side opening portion, and
the attachment member is the lid.

17. The fishing spinning reel of claim 1, wherein
the lid is fastened to the body by threadably mounting the lid itself on the side opening portion,
the spool reciprocating device includes:
a slider coupled to a rear portion of a spool shaft; and
a driving member with which the slider is engaged and rotated by rotation of the handle shaft to cause the slider to reciprocate in a front-rear direction, wherein a rotation center of the driving member is disposed closer to a rod attaching portion of the body than a rotation center of the handle shaft.

18. The fishing spinning reel of claim 1, further comprising:
a rear support member formed separately from the cover member and mounted on the body to support a rear portion of a stick-like member of the spool reciprocating device.

19. The fishing spinning reel of claim 18, wherein the rear support member is made of metal and the cover member is made of synthetic resin.

20. The fishing spinning reel of claim 1, wherein
the body and the lid have threaded portions formed circumferentially to be fitted to the side opening portion and threadably engaged to each other,
the lid is fastened to the body by threadably mounting the lid itself on the side opening portion,
an annular insert-molded metal member is provided on at least one of the side opening portion or the lid, and
the threaded portion is formed on the metal member.

21. The fishing spinning reel of claim 1, wherein
the lid is made of metal,
the body and the side opening portion have threaded portions formed circumferentially to be fitted in the side opening portion and threadably engaged to each other, and
the lid is fastened to the body by threadably mounting the lid itself on the side opening portion.

22. The fishing spinning reel of claim 1, wherein a reduction gear mechanism transmitting rotation of the handle shaft to the spool reciprocating device at a reduced speed is disposed between the handle shaft and the spool reciprocating device.

23. The fishing spinning reel of claim 22, wherein
the spool reciprocating device includes a slider attached on a rear portion of the spool shaft,
the slider is supported by guide shafts extending in a front-rear direction of the body, and
the guide shafts are disposed on an upper side and a lower side of the handle shaft respectively as a pair.

* * * * *